(12) United States Patent
Treyz et al.

(10) Patent No.: US 8,041,612 B1
(45) Date of Patent: Oct. 18, 2011

(54) ON-LINE VIDEO AND IMAGE SYSTEM

(75) Inventors: G. Victor Treyz, Larchmont, NY (US); Susan M. Treyz, Larchmont, NY (US)

(73) Assignee: LG Electronics, Inc., Seoul (KR)

( * ) Notice: Subject to any disclaimer, the term of this patent is extended or adjusted under 35 U.S.C. 154(b) by 901 days.

(21) Appl. No.: 11/827,748

(22) Filed: Jul. 13, 2007

Related U.S. Application Data

(63) Continuation of application No. 09/365,651, filed on Aug. 2, 1999, now Pat. No. 7,343,320.

(51) Int. Cl.
*G06Q 30/00* (2006.01)

(52) U.S. Cl. ........................ 705/27.1; 705/26.1; 705/903

(58) Field of Classification Search .................... 364/900
See application file for complete search history.

(56) References Cited

U.S. PATENT DOCUMENTS

| 5,453,926 | A |   | 9/1995  | Stroschin et al. |         |
|-----------|---|---|---------|------------------|---------|
| 5,666,215 | A | * | 9/1997  | Fredlund et al.  | 358/487 |
| 5,689,349 | A |   | 11/1997 | Plettinck et al. |         |
| 5,768,483 | A |   | 6/1998  | Maniwa et al.    |         |
| 5,870,771 | A |   | 2/1999  | Oberg            |         |
| 6,008,836 | A |   | 12/1999 | Bruck et al.     |         |
| 6,133,985 | A |   | 10/2000 | Garfinkle et al. |         |
| 6,154,600 | A | * | 11/2000 | Newman et al.    | 386/4   |
| 6,167,806 | B1 |  | 1/2001  | Chretinat et al. |         |
| 6,181,883 | B1 |  | 1/2001  | Oswal            |         |
| 6,201,546 | B1 |  | 3/2001  | Bodor et al.     |         |
| 6,320,600 | B1 | * | 11/2001 | Smith et al.    | 715/723 |
| 6,330,068 | B1 |  | 12/2001 | Matsuyama        |         |
| 6,349,194 | B1 |  | 2/2002  | Nozaki et al.    |         |
| 6,567,177 | B2 |  | 5/2003  | Matsuyama        |         |
| 6,791,708 | B1 |  | 9/2004  | Yamamoto         |         |
| 6,800,167 | B1 |  | 10/2004 | Frazer           |         |
| 6,908,238 | B2 |  | 6/2005  | Ashizaki         |         |

(Continued)

FOREIGN PATENT DOCUMENTS

JP 2001147975 A2 5/2001

(Continued)

OTHER PUBLICATIONS

"Edit Video Over the Web" (Miastkowski, Stan, PC World Online. San Francisco: Jul. 2, 1999. p. 1).*

(Continued)

*Primary Examiner* — Jeffrey A Smith
*Assistant Examiner* — Courtney Stopp
(74) *Attorney, Agent, or Firm* — Birch, Stewart, Kolasch & Birch, LLP

(57) ABSTRACT

A system is provided that allows a photographer to take images for a customer and provide those images to order servicing equipment with which the images are placed on-line for the customer to view. The customer may place orders for the images and products and services related to the images. The order servicing equipment may credit the photographer when the customer orders images, products, or services. Images may be manipulated before images, products, or services are ordered. Images may be taken using film-based cameras or digital image acquisition equipment. Image presentation options may be selected. Content may be appended to the images. Web sites and digital albums may be created using the images. The photographer may check the status of assignments that have been submitted to the order servicing equipment and may check on account status. Different rights levels may be established for different parties. Loyalty rewards may be awarded for frequent use of the system.

15 Claims, 43 Drawing Sheets

| ENTITY | TYPICAL MAXIMUM RIGHTS | TYPICAL WEDDING SCENARIO | TYPICAL COMMERCIAL CUSTOMER SCENARIO | TYPICAL SCHOOL PHOTOS SCENARIO | TYPICAL NOVELTY PORTRAIT SCENARIO |
|---|---|---|---|---|---|
| CUSTOMER | 1,2,3,4,5,6 | 1,2,3,4 | 1,4 | 1,2 | 1,2,3,5 |
| PHOTO-GRAPHER | 1,3,4,5,6,7 | 1,3,4,5,6,7 | 1,3,4,5,6,7,8 | 1,3,4,5,6,7 | 1,3,4,5,6,7 |
| MEDIA CONSUL-TANT | 1,3,4,5,6 | 1,3,4,5,6 | N/A | N/A | N/A |
| VISITOR | 1,2,3,4 | 1,2,3 | N/A | 1,2 | 1,2 |
| ORDER SERVICING EQUIPMENT OPERATOR | 1,2,3,4,5,6,7,8 | 8 | 8 | 8 | 8 |

— 616

1. VIEW IMAGES
2. ORDER IMAGE-BASED PRODUCTS OR SERVICES
3. APPEND CONTENT TO IMAGE-BASED PRODUCTS OR SERVICES
4. DOWNLOAD IMAGES
5. EDIT IMAGE ATTRIBUTES AND CONTENT
6. SELECT IMAGE PRESENTATION OPTIONS
7. SELECT WHICH IMAGES ARE PRESENTED TO CUSTOMER
8. SET RIGHTS LEVELS

U.S. PATENT DOCUMENTS

| | | | |
|---|---|---|---|
| 6,950,198 | B1 | 9/2005 | Berarducci et al. |
| 7,069,451 | B1 * | 6/2006 | Ginter et al. ............... 705/51 |
| 2001/0027454 | A1 | 10/2001 | Tsue |
| 2003/0025933 | A1 | 2/2003 | Kimura et al. |
| 2005/0264832 | A1 | 12/2005 | Baum et al. |

FOREIGN PATENT DOCUMENTS

| | | |
|---|---|---|
| JP | 0200124990 A2 | 9/2001 |
| JP | 2001243365 A2 | 9/2001 |
| JP | 2002183524 A2 | 6/2002 |
| JP | 2004139406 A2 | 5/2004 |
| JP | 2004139502 A2 | 5/2004 |
| KR | 2001025759 | 4/2001 |
| KR | 2001044683 | 6/2001 |
| KR | 2002043935 | 6/2002 |
| WO | WO 98/15130 A1 | 4/1998 |
| WO | WO 00/36516 A1 | 6/2000 |
| WO | WO 0036516 A1 * | 6/2000 |

OTHER PUBLICATIONS

The fujifilm.net website of Fuji Photo Film U.S.A., Inc. The homepage for this website is located at http://www.fujifilm.net../index.html. Selected pages from the website as printed from the Internet on Aug. 1, 1999.

The website for the Kodak PhotoNet online service. The site map for this site is located at http://kodak58.photonet.com/1S_site_map.htm. Selected pages from this website as printed from the Internet on Aug. 1, 1999. The "Main Help Menu" page was printed as a text file. "Kodak ProRewards Program" located at http://www.kodak.com/US/en/professional/yourBusiness/proRewards/proRewards.stml and printed from the Internet on Aug. 1, 1999.

"Kodak Portraits & More Events Software" located at http://www.kodak.com/global/en/professional/products/software/pcEvent/index.shtml and linked pages, selected pages from this website location as printed from the Internet on Aug. 1, 1999.

Dialog® File 610, 00208185 20000306066B4455, Leading E-Commerce Companies Turn to ImageX.com for Online Procurement of Printed Materials, Business Wire, Monday, Mar. 6, 2000.

Dialog® File 610, 00057675 19990610161B0024, ImageX.com Appoints Garrett Gruener to Board fo Directors; Entrepreneur Brings Expertise in information Technology, Business Wire, Thursday, Jun. 10, 1999.

Dialog® File 610, 00029064 1999104B0021, Fine Arts Graphics Joins E-Commerce Leader; Acquisition by ImageX.com Gives Customers Access to Latest Online Print Technology, Business Wire, Wednesday, Apr. 14, 1999.

Dialog® File 610, 00029058, 1999104B0016, ImageX.com Acquires National Printing Company; Acquisition Gives E-Commerce Company Access to Top US Businesses, Business Wire, Wednesday, Apr. 14, 1999.

Dialog® File 810, 0941136 BW0015, ImageX Concur: E-Commerce Tools Driving Productivity Gains; ImageX.com and Concur Partner to Provide Integrated Online Printing Services to Corporate Customers, Nov. 18, 1998.

Dialog® File 16, 06295601 Supplier No. 54477753, ImageX.com Forms Alliance with Silicon Valley Bank's eSOURCE' Alliance will Automate Print-Ordering Processes for Silicon Valley Bank Clients, Business Wire, p. 0022 Apr. 27, 1999.

From Dialog Classic Web, file 20: Telepix Imaging provides unique digital imaging products and services for London drugs photo finishing needs, Canada Newswire, Sep. 16, 1998.

Jahnke, Kodak stays in the digital picture, Aug. 8, 1999, from www.cnn.com.

Melissa A. Weisman, Internet wedding albums reach far-flung relatives, The Patriot Ledger, Oct. 21, 1998.

Menefee, Kodak's new small office/home zoom digital camera, Newsbytes News Network, Sep. 5, 1997.

From Internet archive Waybackmachine, histories of Internet revisions for: various online film developers.

Tomaiuolo, When image is everything: finding and using graphics from the web, Searcher, v10 n1, p. 10 (10), Jan. 2002 (From Dialog Classic file 570).

From Dialog Classic Web™, file 648, President & CEO of Seattle Filmwork, Inc., Feb. 26, 1996, Wall Street Corp. Reporter.

Arar, Get the picture, however you want it, Jun. 24, 1999, from CNN.com.

* cited by examiner

SET UP NEW ACCOUNT

266

PHOTOGRAPHER NAME  268
ADDRESS
270
272
TELEPONE
E-MAIL  274
FAX  276

SCROLL

CREDIT CARD NUMBER  278
EXPIRATION DATE  280
BANK NAME
BANK ACCOUNT NUMBER  282
284

266  DO YOU WISH TO SET UP
AN ACCOUNT WITH US ?  ☐ YES  ☒ NO 288  290
286  HOME  SUBMIT  CANCEL

FIG. 14

|  | START | CLOSING | REVENUES |
|---|---|---|---|
| ASSIGNMENT | DATE | DATE | TO DATE |
| WASHINGTON HIGH SCHOOL | 5/2/99 | 6/2/99 | $2890 |
| SMITH WEDDING | 5/3/99 | 6/3/99 | $5400 |
| STEVENSON WEDDING | 5/5/99 | 6/5/99 | $ 645 |
| NEW CITY HIGH SCHOOL | 5/7/99 | 6/7/99 | $ 295 |

MORE

| ENTITY | TYPICAL MAXIMUM RIGHTS | TYPICAL WEDDING SCENARIO | TYPICAL COMMERCIAL CUSTOMER SCENARIO | TYPICAL SCHOOL PHOTOS SCENARIO | TYPICAL NOVELTY PORTRAIT SCENARIO |
|---|---|---|---|---|---|
| CUSTOMER | 1,2,3,4,5,6 | 1,2,3,4 | 1,4 | 1,2 | 1,2,3,5 |
| PHOTO-GRAPHER | 1,3,4,5,6,7 | 1,3,4,5,6,7 | 1,3,4,5,6,7,8 | 1,3,4,5,6,7 | 1,3,4,5,6,7 |
| MEDIA CONSUL-TANT | 1,3,4,5,6,7 | 1,3,4,5,6 | N/A | N/A | N/A |
| VISITOR | 1,2,3,4 | 1,2,3 | N/A | 1,2 | 1,2 |
| ORDER SERVICING EQUIPMENT OPERATOR | 1,2,3,4,5,6,7,8 | 8 | 8 | 8 | 8 |

616

1. VIEW IMAGES
2. ORDER IMAGE-BASED PRODUCTS OR SERVICES
3. APPEND CONTENT TO IMAGE-BASED PRODUCTS OR SERVICES
4. DOWNLOAD IMAGES
5. EDIT IMAGE ATTRIBUTES AND CONTENT
6. SELECT IMAGE PRESENTATION OPTIONS
7. SELECT WHICH IMAGES ARE PRESENTED TO CUSTOMER
8. SET RIGHTS LEVELS

FIG. 40

ON-LINE VIDEO AND IMAGE SYSTEM

This application is a continuation of patent application Ser. No. 09/365,651, filed Aug. 2, 1999 now U.S. Pat. No. 7,343,320, which is hereby incorporated by reference herein in its entirety.

BACKGROUND OF THE INVENTION

This invention relates to photography, and more particularly, to creating, processing, selling, and distributing image-based products and services to customers.

Digital image technology is being used to offer various on-line photographic services. For example, services are available that allow consumers who have their film developed to receive on-line access to their images. Consumers with access to the Internet may order reprints by clicking on various on-screen prompts. Services based on digital images are offered. For example, consumers may download images for printing in their home. Digital images can also be placed in on-line photo albums or sent to friends and relatives using e-mail.

Some mail-order photo labs allow consumers to receive their images on a floppy diskette or a compact disk when they are developed.

Digital imaging technology is being used by professional photographers. Digital cameras are available that allow fairly high-quality images to be taken digitally. By attaching a monitor to the camera, photographers can display images to allow clients to decide immediately whether they find a particular image acceptable. Because digital images may be printed as soon as they have been acquired, novelty photographs such as a child posing with Santa or other subject for which immediate results are desirable are possible.

Digital image acquisition systems are available that allow images to be cropped on-screen after they have been acquired. However, such systems are generally self-contained and do not allow images to be manipulated over the Internet.

Stock photographers have used the Internet to promote their image portfolios to potential buyers, but have generally not used the Internet to sell images.

It is therefore an object of the present invention to provide techniques for creating, processing, selling, distributing, and otherwise using image-based products and services.

SUMMARY OF THE INVENTION

This and other objects of the invention are accomplished in accordance with the principle of the present invention by providing a system in which a customer may view images taken by a photographer and may order products or services related to the images. The photographer may take images for the customer using a film-based camera or using digital image acquisition equipment. The photographer may collect customer information such as the customer's e-mail address or mailing address manually or electronically. For example, the photographer or customer may enter the customer information into a portable computer or handheld computing device on which an application for image acquisition and customer information collection is implemented.

Images may be made available to the customer using order servicing equipment. The order servicing equipment may contain an order servicing computer, film development equipment, image digitizing equipment, printing equipment, packaging and mailing equipment, and other equipment. The photographer may provide images to the order servicing equipment manually or electronically. For example, the photographer may mail film to the order servicing equipment for developing by the operator of the order servicing equipment. If desired, order servicing equipment may be configured to provide the photographer with an opportunity to upload digital images to the order servicing equipment.

The photographer may mail the customer information to the order servicing equipment. If desired, the order servicing equipment may be configured to provide the photographer with an opportunity to upload the customer information to the order servicing equipment.

The customer may view images by viewing proofs or by viewing the images on-line. The customer may be notified when the images are available to be viewed. For example, the customer may be notified by e-mail when the images are available for viewing on-line. The customer may be provided with an opportunity to view images on-line by, for example, providing the customer with an opportunity to view the images on a web page. The web page may be password controlled. The customer may select the password when the images are taken or may be notified of the password in the e-mail notifying the customer that the images are available.

The customer and other suitable parties may be provided with an opportunity to place an order for image-related products or services. For example, the order servicing equipment may be used to provide a web page that may be used to place orders on-line.

The order servicing equipment may fulfill the order. For example, the order servicing equipment may be used to print images, package images, and mail images to the customer. The order servicing equipment may also be used to create image-based products and services, package the products or services, and mail the products and services to the customer. If desired, orders for images and other image-based products and services may be fulfilled using a fulfillment facility that is separate from the order servicing equipment.

When a customer places an order, some of the revenues from the order may be distributed to the photographer. For example, an account may be established for the photographer at the order servicing equipment. When a customer places an order, the photographer may automatically receive a credit in the account. If the photographer has an account at an independent financial institution, the photographer may be credited by using the order servicing equipment to electronically transfer the photographer's share of the revenues into that account. If desired, the system may credit the photographer by having a check issued.

The order servicing equipment may be used to provide the photographer with an on-line opportunity to create new assignments and to submit images and customer information for those assignments. The photographer may specify the type of assignment that is being created (e.g., wedding, school photos, commercial, etc.). The photographer may also specify a name for the assignment. Customer information and images for the assignment may be provided to the order servicing equipment on-line. The order servicing equipment may be used to provide the photographer with an opportunity to check assignment status information electronically. For example, the photographer may be allowed to access a web page containing status information. The photographer can also view account information using a web page or other suitable arrangement. The image-based products and services that are offered to the customer may by tied to the type of assignment involved. For example, a customer viewing sports team images may be presented with an opportunity to order sporting equipment and other sports-related products.

The photographer, customer or other party may manipulate images. For example, the customer may use an on-line editing application to crop images or to change image attributes such as color balance, contrast, etc. The photographer, customer, or other party may also manipulate images to remove red-eye, to change hair color, or to change the background of the images. For example, the customer may manipulate images by selecting desired backgrounds from backgrounds containing, for example, images of actors, cartoon characters, characters in costume, magazine cover templates, etc.

The photographer or other appropriate party may select which images are presented to the customer. For example, the photographer may submit film to the order servicing equipment for developing. The images may be digitized at the order servicing equipment. The photographer may review the images on-line and may select a subset of the images to make available for the customer to view on-line.

The photographer, customer, or other suitable party may select image presentation options. For example, if the images taken by the photographer are for a wedding, the order servicing equipment may provide the customer with an on-line opportunity to order a wedding album. The photographer, customer, or other party, may select the album cover type (leather, plastic, etc.), page weight, cover and page color, etc.

The photographer, customer, or other party may append content to the images. Videos may be created and content may be appended to the videos. The videos and images may be integrated into, for example, web pages or digital albums containing both still images and video.

The photographer, customer, and other parties may not have the same rights to manipulate images, select images for presentation to the customer, append content, purchase products or services, view images, etc. The system may accommodate different rights levels for different parties. For example, the photographer may be allowed to edit images on-line, whereas friends of the customer may not be allowed to edit images on-line.

The photographer or other party may be awarded loyalty reward points for frequent use of the system. A web page or other interface may be used to provide the photographer with an opportunity to check on current loyalty reward account status information, to redeem reward points, or to earn referral bonuses, etc.

Further features of the invention, its nature and various advantages will be more apparent from the accompanying drawings and the following detailed description of the preferred embodiments.

BRIEF DESCRIPTION OF THE DRAWINGS

FIG. 14 shows an illustrative web page that may be used to set up a photographer account in accordance with the present invention.

FIG. 16 shows an illustrative web page that may be used to provide a photographer with an opportunity to review revenues in accordance with the present invention.

FIG. 21 shows an illustrative web page that may be used to provide a photographer with an opportunity to enter customer information for a commercial assignment in accordance with the present invention.

FIG. 40 is a table illustrating how different rights may be assigned to various parties under different scenarios in accordance with the present invention. The lower portion of FIG. 40 contains a key for the numbers in the table.

DETAILED DESCRIPTION OF THE PREFERRED EMBODIMENTS

Figure 1:
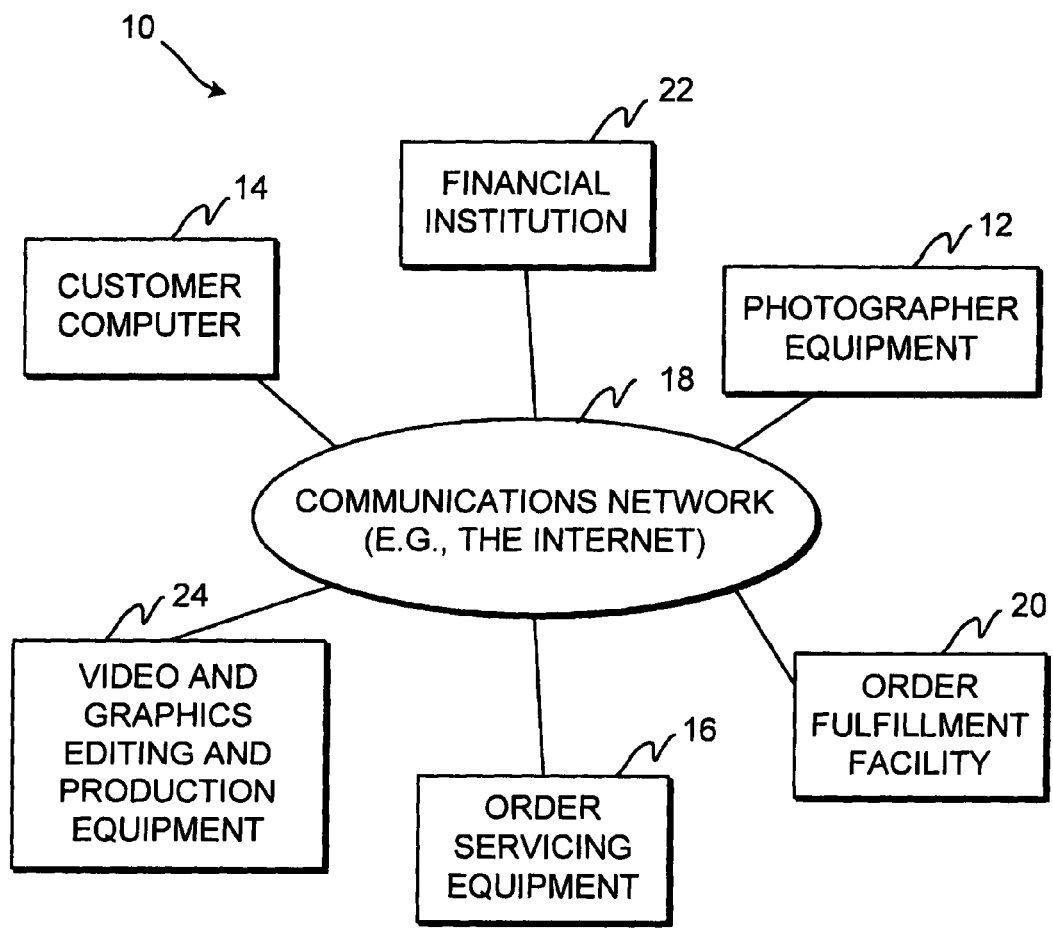
FIG. 1 is a schematic diagram of an illustrative system in accordance with the present invention.

A system 10 in accordance with the present invention is shown in FIG. 1. A photographer at photographer equipment 12 and a customer at customer equipment 14 may be electronically connected to order servicing equipment 16 by communications network 18 or other suitable communications paths. If desired, communications network 18 may be the Internet or may be based on the Internet. Communications network 18 may also be based on dial-up modem connections, private networks, local-area networks, wide-area networks, telephone networks, satellite or cable links, fiber optic links, radio-frequency links, infrared or other free-space links, etc. Although shown as a common communications network in FIG. 1, the various communications paths used by system 10 may be separate from each other if desired, so long as the relevant parties may communicate.

The arrangement of FIG. 1 allows a photographer to take images that are to be sold to the customer and to have those images made available to the customer for on-line purchasing using order servicing equipment 16. For example, the photographer may take school photographs for a high school. After taking images of the students, the photographer may provide the images to order servicing equipment 16. At order servicing equipment 16, the images are placed on-line, so that the students may use computers (e.g., customer computers such as customer computer 14 of FIG. 1) to order image-based products and services. For example, the students may purchase enlargements, tee shirts, mugs, digital images, web site services, electronic greeting cards, etc.

Electronic products or services may be provided to the customer or other suitable recipients over communications network 18. Tangible items such as enlargements may be shipped to customers from order servicing equipment 16 or from order fulfillment facility 20.

In the school photo example, students are in effect the customers of both the photographer and the order servicing operator. System 10 may be used to automatically credit the proceeds of the students' orders to the photographer. System 10 may also be used to credit the order servicing equipment operator. Funds that are collected from the students by order servicing equipment 16 may be transferred to the account of the photographer at financial institution 22 via communications network 18. If desired, an account may be maintained for the photographer at order servicing equipment 16. The photographer may be credited by crediting this account. The photographer may also be credited using a check or other such financial instrument.

Additional parties such as graphics designers, video production specialists, or other image manipulation or generation professionals (hereinafter sometimes referred to generically as "media consultants" may use video and graphics editing and production equipment 24 to facilitate the creation and delivery of services based on the photographer's images. For example, a web designer may use equipment 24 to create a custom web site for the customer. Order servicing equipment 16 may be used to distribute some of the proceeds of the customer's orders to the account of the web designer or to otherwise credit the web designer.

Figure 2:
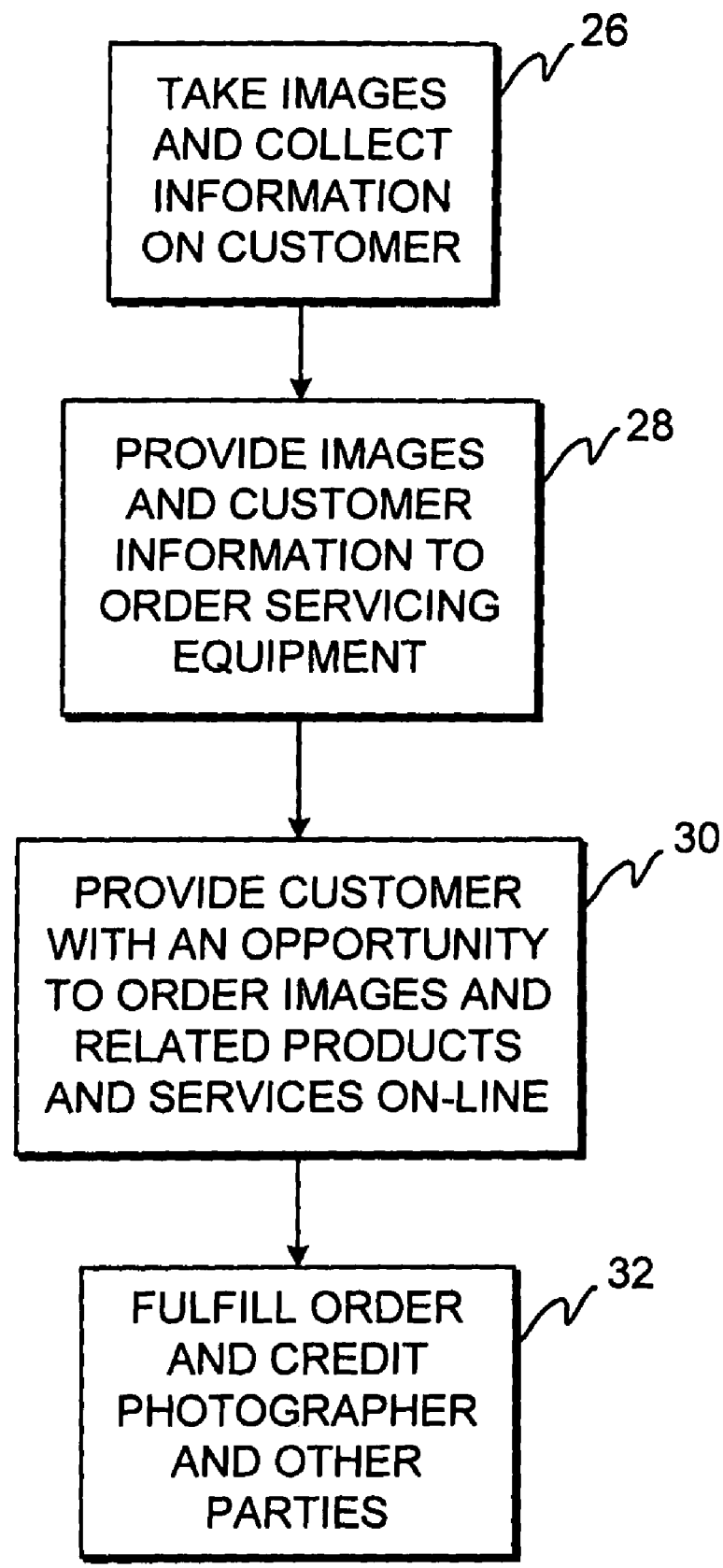
FIG. 2 is a flow chart of illustrative steps involved in making images and related products and services available to customers for ordering in accordance with the present invention.

Illustrative steps involved in providing image-based products and services to customers with system 10 are shown in FIG. 2. At step 26, the photographer may take images and collect information on a customer or customers. The images may be taken digitally or on film. The photographer may take images for any suitable event or project. For example, images may be taken at a wedding or other celebration. If desired, there may be more than one customer at an event. For example, a birthday party may be held in celebration of the birthdays of two or more people. Each person may be an individual customer.

Images may be taken in public locations such as in a shopping mall, amusement park, airport, or other public location as a novelty item (e.g., images of people taking a harbor cruise or an amusement park ride, images of people with Santa, a cartoon character, or a movie character, or images at any other suitable portrait opportunity). Images may be taken in a dedicated studio. For example, images may be taken at a studio where the customer is provided with costumes to dress up (e.g., as a wild west cowboy, etc.).

Images may be taken for a private or public institution such as a corporation, firm, governmental body, club, association, or the like. For example, images may be taken for a school, athletic team, cheerleading group, dance club, music club, religious group, military organization, etc.

Images may be taken for commercial clients. For example, images may be taken of products for a catalog or of architecture, landscapes, people, or other subjects. Assignments may involve taking images of a function such as an awards dinner, or of a sporting event, news event, or the like.

The information collected by the photographer depends on the type of project or event involved. For example, if the images are school photographs and customers are students, the information that is collected may include each student's name, class, telephone number, home address, and e-mail address, etc. If the images are wedding photographs, the photographer may collect information on the names of the bride and groom, telephone numbers, home and e-mail addresses, etc. If the images are product shots for a commercial assignment, the information that is collected may include the corporate name of the customer, information on the appropriate contact person at the customer's location, telephone, fax, corporate and e-mail address information, etc. If the images are novelty portraits, the information collected may include the information on the subject of the photograph and the names of friends or family who might want to purchase products and services based on that portrait. Information on friends, family and other people interested in the project in addition to the customer may be collected for any suitable project.

If desired, information on multiple customers may be collected during the same assignment. For example, when school photographs are taken, the photographer may collect information on multiple student customers. Because customer information may be collected centrally and images may be made available for viewing centrally, using system 10 provides an efficient way in which to reach many customers at once.

After the images have been taken and the information collected on the customer, the images and customer information may be provided to order servicing equipment 16 (FIG. 1) at step 28. The images and customer information may be provided to order servicing equipment 16 electronically or by delivery. For example, the images may be provided by hand delivering or mailing exposed film to order servicing equipment 16 or by transmitting digital images over communications network 18. Digital images may taken digitally or may be created by digitizing film developed by the photographer. The photographer may develop film with photographer equipment 12 or by using a lab separate from photographer equipment 12 and order servicing equipment 16. Customer information may be provided to order servicing equipment 16 by delivering a completed form or diskette to order servicing equipment 16 or by transmitting customer information from photographer equipment 12 to order servicing equipment 16 via communications network 18.

At step 30, order servicing equipment 16 may be used to provide the customer with an opportunity to place on-line orders for image-based products and services (e.g., images, tee shirts, wedding albums, web pages, trading cards with images of school athletes etc.). For example, order servicing equipment 16 may place school photographs on a web site and may notify the students whose photographs are available. Students may browse the web site to determine if the images are of interest. Students may then place orders for desired images and image-based products over the Internet.

If desired, additional parties such as video production specialists and web designers or other graphics artists may participate in the creation and modification of the image-based products and services using video and graphics editing and production equipment. System 10 may also allow customers and photographers to edit images and add content for the products and services on-line.

At step 32, order servicing equipment 16 and order fulfillment facility 20 may be used to fulfill the customer's order. For example, the customer's order may be for five 8×10 enlargements and a tee-shirt both based on a particular school photograph. After the customer selects the desired image at step 30, order servicing equipment 16 may print the five enlargements and mail them to the customer. Order servicing equipment 16 may also provide a digital copy of the photograph to order fulfillment facility 20, which may place the photograph on a tee-shirt or other item and may mail the tee-shirt to the customer.

Step 32 also involves crediting the appropriate parties with revenue derived from the sale of the image-based products and services. For example, the photographer's account (whether an account maintained at order servicing equipment 16 or an independent financial institution) may be credited to reflect the photographer's participation in the project. If work was contributed by a media consultant, the media consultant may be provided with a portion of the revenues. Order servicing equipment 16 may credit the revenues to the photographer and other parties. Part of the revenues may be retained by the operator of order servicing equipment 16 as reimbursement for services in connection with providing the image-based products and services. The crediting of the photographer and other parties involved in the order may involve electronic transfers between financial institutions such as financial institution 22 of FIG. 1 and may involve the crediting of accounts maintained, for example, by the operator at order servicing equipment 16. If desired, the photographer may be credited by issuing a check or otherwise directly paying the photographer.

Figure 3:
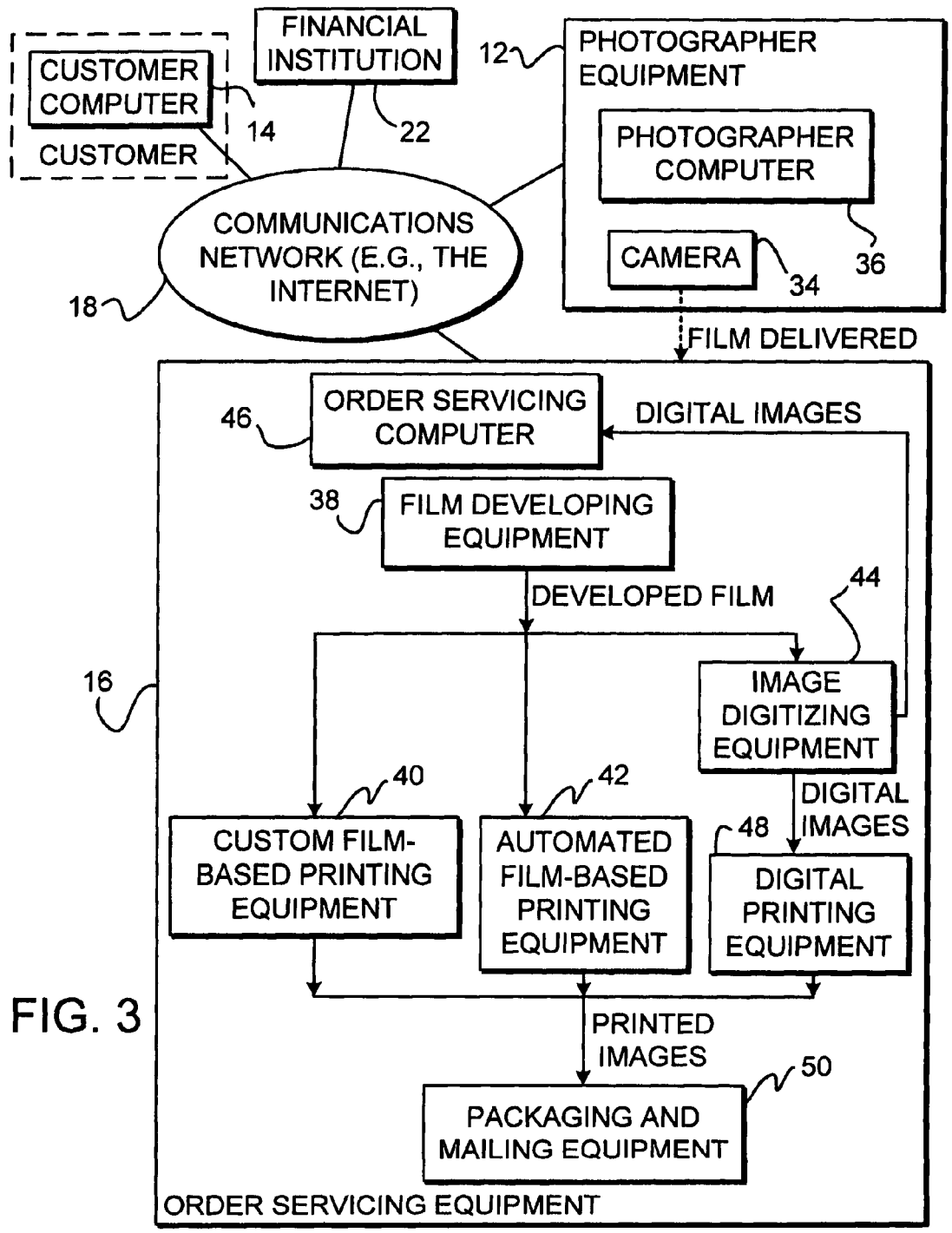
FIG. 3 is a schematic diagram of a system in which film may be delivered from photographer equipment to order servicing equipment in accordance with the present invention.

As shown in FIG. 3, photographer equipment 12 may include a film-based camera 34 and a photographer computer 36. The photographer may take images on film and have the film delivered to order servicing equipment 16. The film may be developed using film developing equipment 38 at order servicing equipment 16. Film developing equipment 38 may be based on any suitable equipment for developing film, such as an automated processor or processors capable of handling C-41, E-6, and traditional black and white films. Film developing equipment 38 may be highly automated, which saves labor costs, but increases the cost and complexity of the equipment. Film developing equipment 38 may also be less automated, which may reduce the cost of equipment 38, but which may also make the process of operating equipment 38 more labor-intensive.

Order servicing equipment 16 may include custom film-based printing equipment 40 that allows personnel at order servicing equipment 16 to print custom enlargements or create other image-based products using developed film from film development equipment 38. Order servicing equipment 16 may also include automated film-based printing equipment 42. Automated film-based printing equipment 42 may be any suitable print processing machine. Images on developed film may be digitized using image digitizing equipment 44. Digital images may be provided to order servicing computer 46 so that they may be accessed by customers via communications network 18. Digital images may also be provided to digital printing equipment 48 for printing. Printed images from custom film-based printing equipment 40, automated film-based printing equipment 34, and digital printing equipment 48 may be packaged and mailed to customers and other recipients using packaging and mailing equipment 50.

Figure 4:
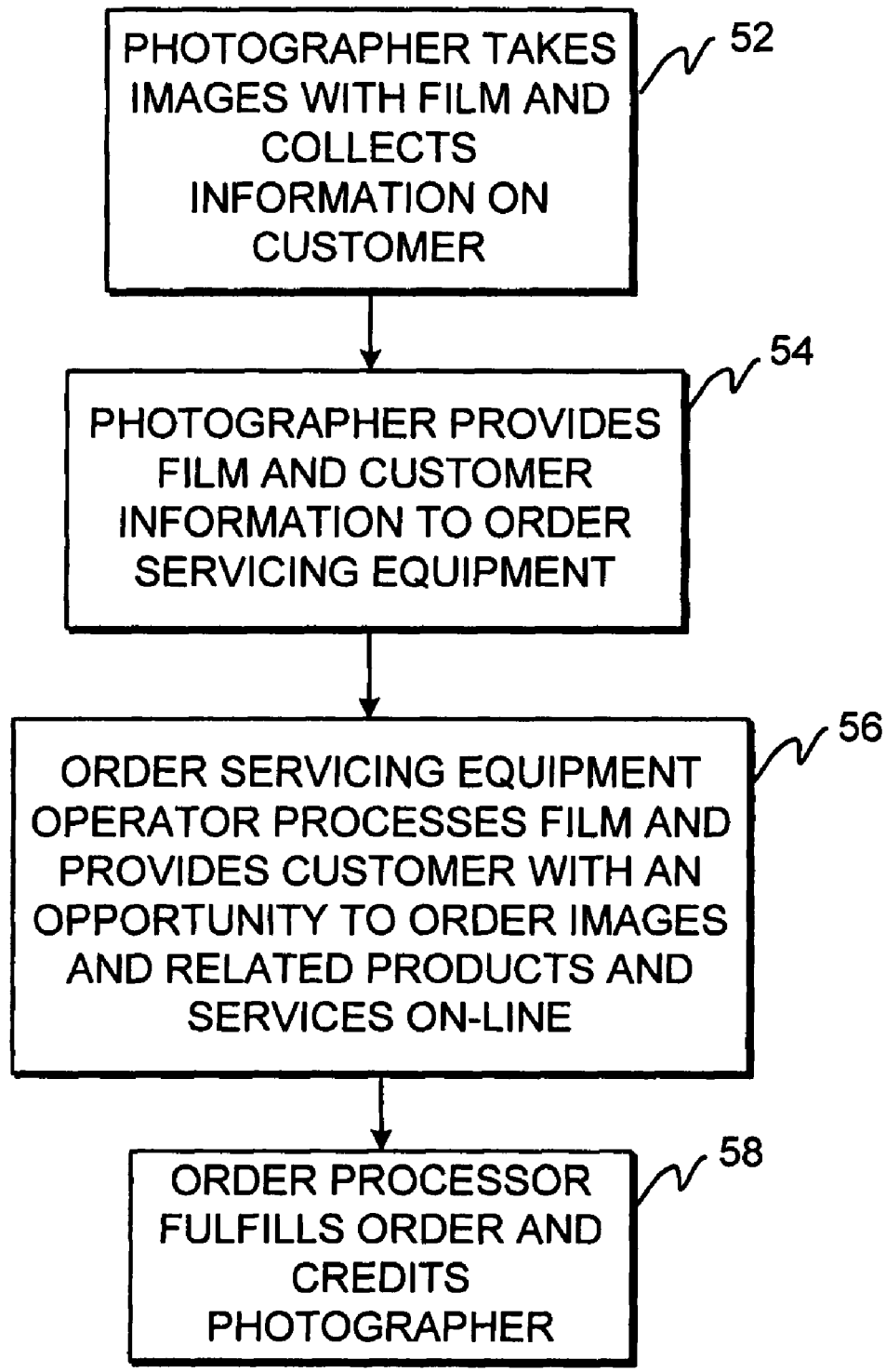
FIG. 4 is a flow chart of illustrative steps involved in taking images with film and making those images and related products and services available to customers for ordering in accordance with the present invention.

Illustrative steps involved in using a system such that of FIG. 3 are shown in FIG. 4. At step 52, the photographer takes images with a film-based camera and collects information on the customer. For example, the photographer may take school photographs with a 35 millimeter or medium format camera. Student information may be collected by having each student fill out a form. Information from the forms may be entered into photographer computer 36 or may be entered into a computer at another suitable location. If desired, a notebook computer or handheld computer device may be used by the student or assistants of the photographer to enter such information directly at the photographic location. If desired, student information may be provided in the form of a list maintained by the school.

At step 54, the photographer delivers the film and the customer information to the order servicing equipment 16. Film may be hand delivered or mailed. If the customer information has been provided to photographer computer 36, the customer information may be provided to order servicing computer 46 electronically using communications network 18. If the customer information is on printed forms, the customer information may be mailed to order servicing equipment 16 and entered into order servicing computer 46 or other suitable computer at order servicing equipment 16.

At step 56, the order servicing equipment operator may process the film and provide the customer with an opportunity to order images and related products and services on-line. The opportunity to order image-based products and services may be provided, for example, by digitizing the images and placing them on a web page at which the customer may select various products or services, provide information on the intended recipients of the purchased products and services, provide credit card information, arrange for shipping, etc.

At step 58, the system fulfills the order by shipping the requested image-based products to the customer and by providing the customer with access to the image-based services. The system also credits the photographer (e.g., by transferring funds into the photographers account).

Figure 5:
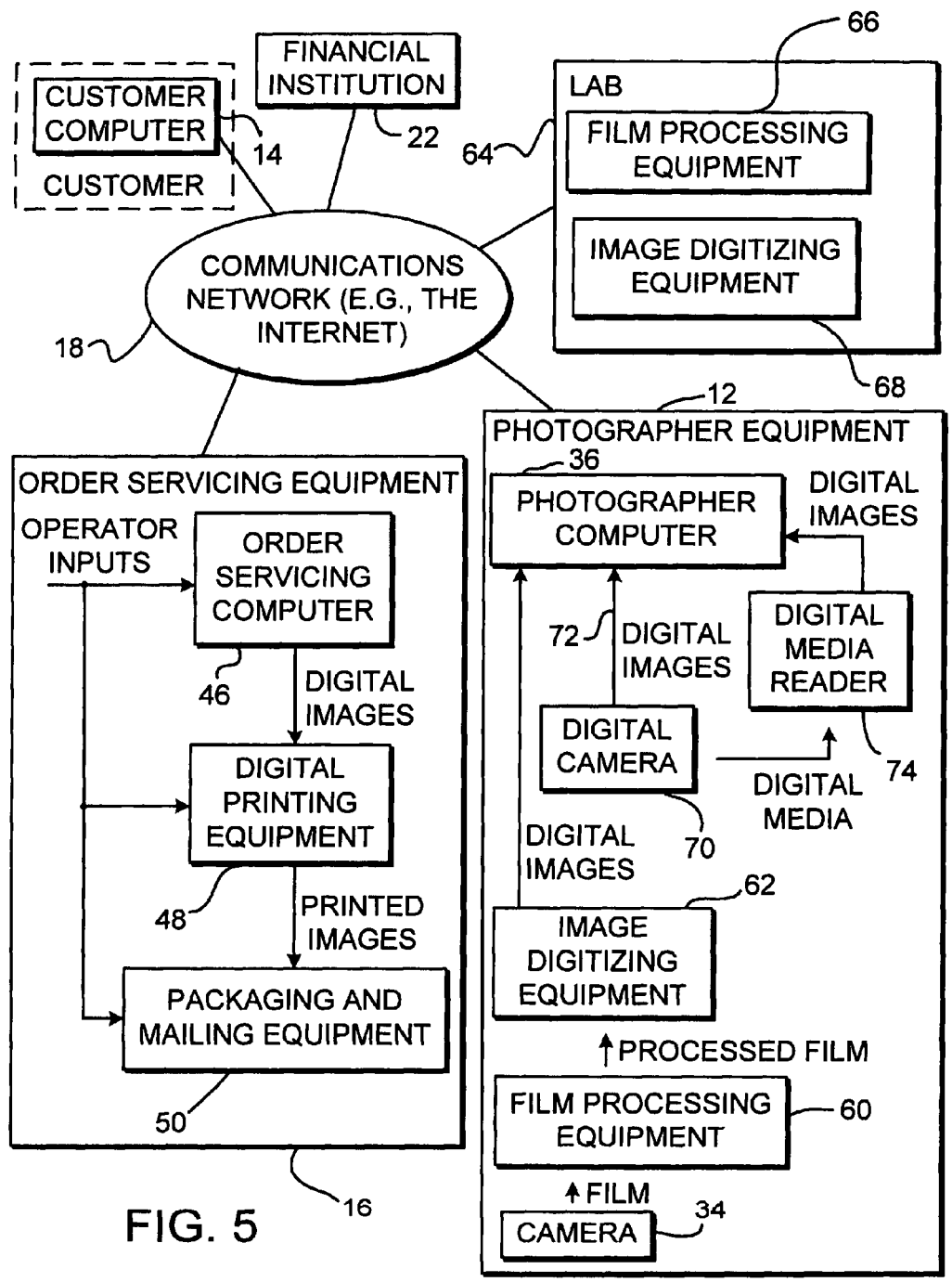
FIG. 5 is a schematic diagram of a system in which digital images may be provided from photographer equipment to order servicing equipment in accordance with the present invention.

If desired, the photographer may provide digital images to order servicing equipment 16. As shown in FIG. 5, photographer equipment 12 may include film processing equipment 60 for developing film from camera 34. Processed film from film processing equipment 60 may be provided to image digitizing equipment 62, which may be used by the photographer to digitize the images on the developed film. Image digitizing equipment 62 may provide corresponding digital images to photographer computer 36 for transmission to order servicing computer 46 of order servicing equipment 16.

If desired, the photographer may have the film developed by a lab such as lab 64. Lab 64 may have film processing equipment 66 for developing film and image digitizing equipment 68 for digitizing images from the film after it has been developed. Digital images from lab 64 may be provided to photographer computer 36 by transmitting them over communications network 18 or by delivering a digital storage media such as a photo compact disc (photo CD), diskette or other suitable storage media to the photographer who may transmit the images to order servicing equipment 16 over communications network 18 using photographer computer 36 or who may deliver the digital storage media to order servicing equipment 16. If desired, digital images from lab 64 may be provided directly to order servicing equipment 16.

Another way in which the photographer may provide digital images to order servicing equipment 16 is by using digital camera 70 to take digital images. The photographer may transfer digital images from digital camera 70 to photographer computer 36 over communications link 72, which may be a suitable wireless link such as an infrared or radio-frequency link or a suitable wired link such as an IEEE-1394 communications link or other link formed from wire, cable, fiber optics, etc. A removable digital storage media such as a memory card, floppy diskette or the like may be used to transfer digital images from digital camera 70 to a digital media reader 74 that is attached to photographer computer 36 or is a part of photographer computer 36.

Order servicing equipment 16 may receive the digital images over communications network 18 and may store them in order servicing computer 46. All of the digital images or a selected group of the digital images may be made available for viewing and ordering by the customer. The images may be printed by digital printing equipment 48, which may be, for example, a color inkjet printer, dye sublimation printer, laser printer, or other suitable printer. Printed images and image-related products may be mailed to customers using packaging and mailing equipment 50. Packaging and mailing equipment may be automated to reduce labor costs or may involve manual labor to reduce equipment costs. The operator of order servicing equipment 16 may control the operation of the order servicing equipment 16. For example, in the system of FIG. 5 the operator at order servicing equipment 16 may control order servicing equipment 46 (e.g., to select which photographs are displayed to the customer), may control the image printing equipment (e.g., to adjust printer settings), and may control packaging and mailing equipment 50 (e.g., to adjust how packages are packaged and mailed). The operator may use more than one person to operate order servicing equipment 16.

Figure 6:
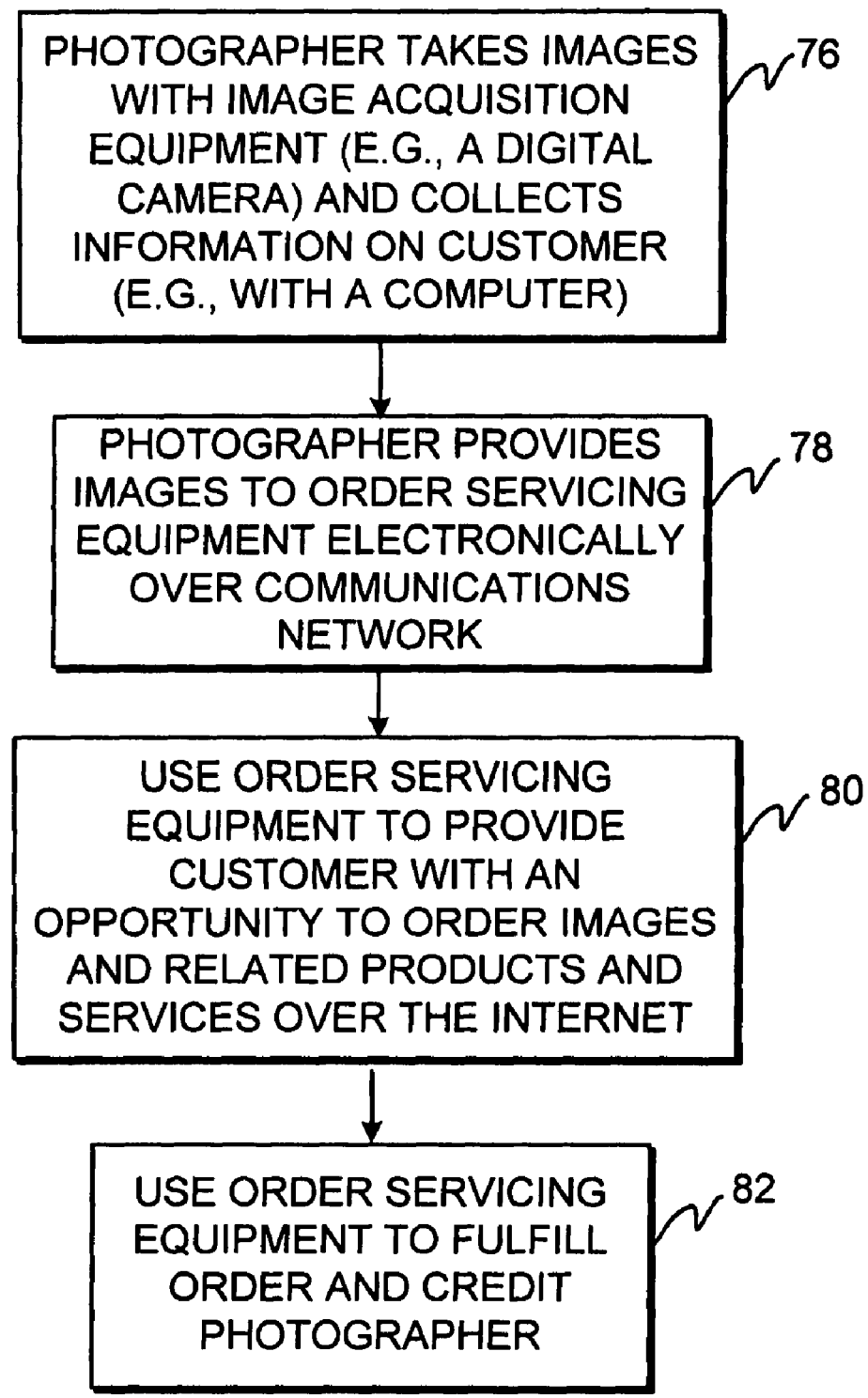
FIG. 6 is flow chart of illustrative steps involved in taking images with image acquisition equipment and making those images available to customers for ordering in accordance with the present invention.

Illustrative steps involved in using the system of FIG. 5 are shown in FIG. 6. At step 76, the photographer takes images with image acquisition equipment such as a digital camera or the like and collects information on the customer. If there are multiple customers, friends and family, or other parties involved in the project, the photographer may collect additional information (e.g., the e-mail addresses of the parties). The photographer may collect information using a computer or other device or may collect information manually. At step 78 the photographer provides images to order servicing equipment 16 electronically, over network 18. Digital images may be provided using any suitable transmission technique.

For example, images may be transmitted using an Internet Protocol approach, as e-mail transmissions, using a file transfer protocol (FTP) approach, or using any other suitable transmission technique. Images may be compressed to save storage space and transmission times or may be uncompressed to maximize image quality.

At step 80, order servicing equipment 16 is used to provide the customer with an opportunity to order images and related products and services over communications network 18 (e.g., the Internet). If the photographer is a first time user of the system, order servicing equipment 16 may be used to open an account for the photographer. If the photographer has an existing account, order servicing equipment 16 may be used to allow the photographer to access the account on-line. If the photographer has an existing account, order servicing equipment 16 may be used to accept the digital images from the photographer and to make them available for the customer to view and to use in ordering image-based products and services. The photographer, the operator at order servicing equipment 16, the media consultant at video and graphics editing and production equipment 124 or other suitable parties, may be involved in determining which image-based products and services are made available to the customer. After the customer places an order, order servicing equipment 16 is used to fulfill the customer's order and to credit the photographer a portion of the revenue from the customer at step 82.

Figure 7A:
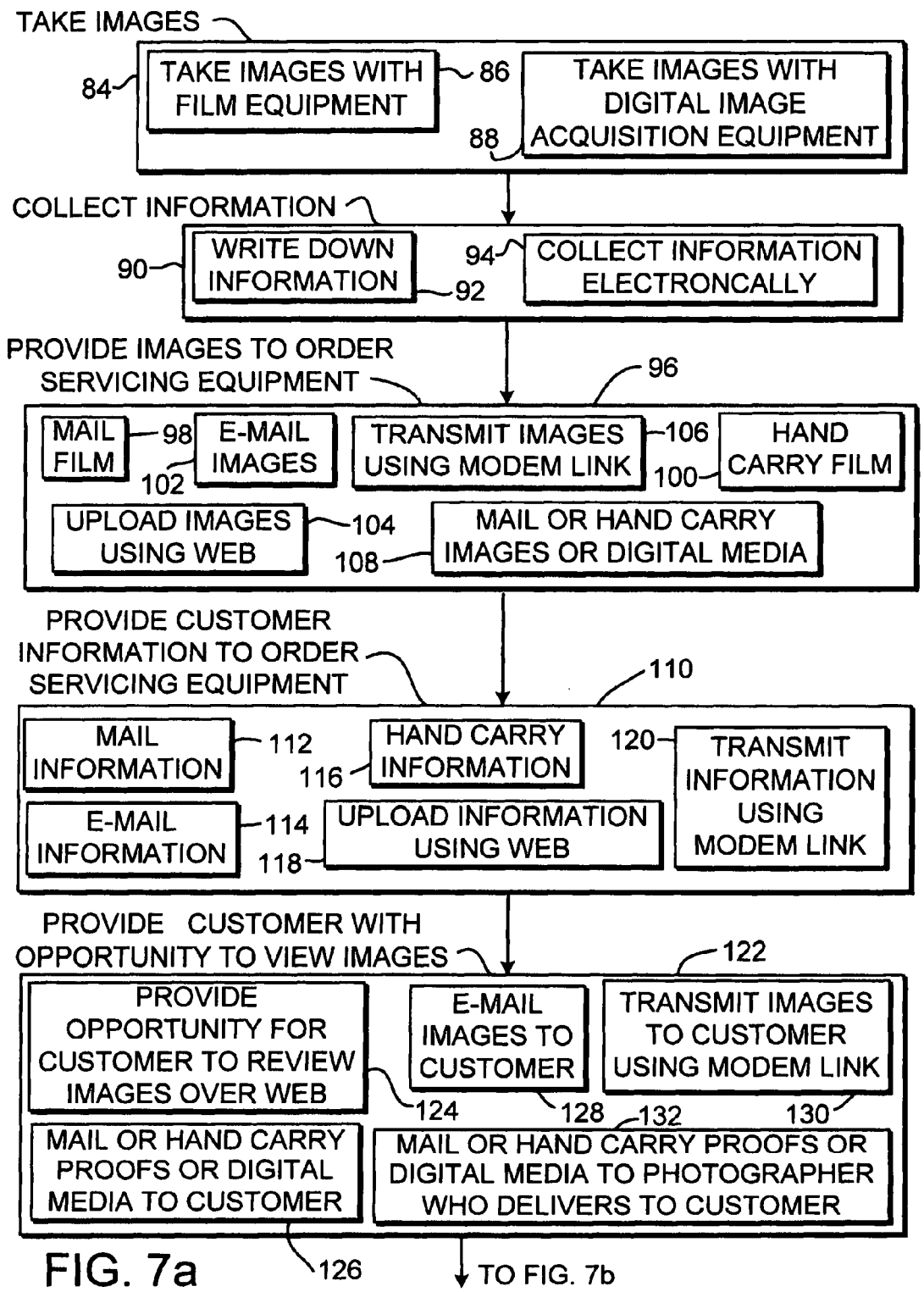
FIGS. 7a and 7b are flow charts of illustrative steps involved in using systems such as the system of FIGS. 1, 3, and 5 in accordance with the present invention.
Figure 7B:
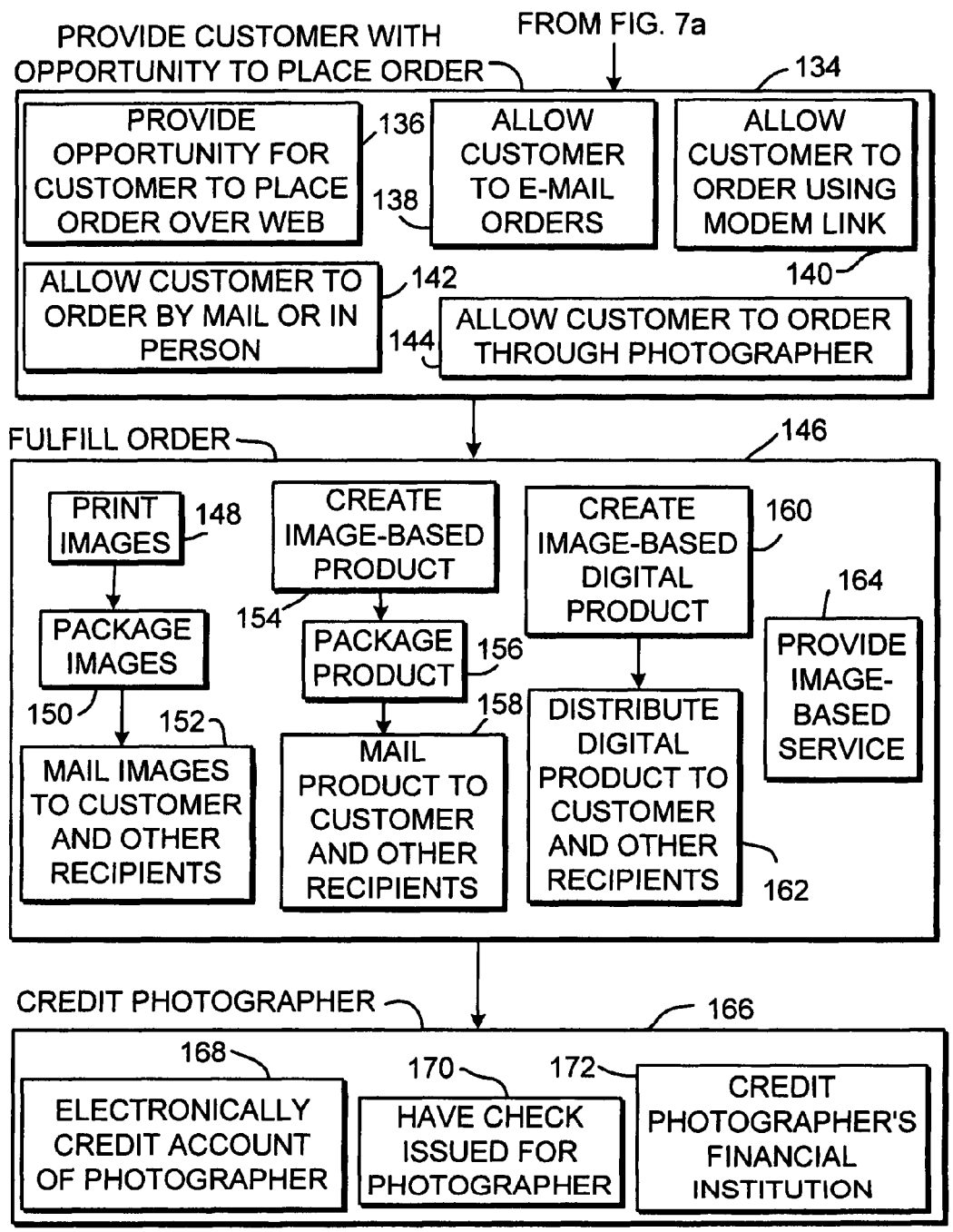

Illustrative steps involved in using the systems of FIGS. 1, 3, and 5 are shown in FIGS. 7a and 7b. As shown in FIG. 7a, images are taken at step 84. Film-based images may be taken with film-based equipment (step 86). Digital images may be taken with digital image acquisition equipment (step 88). At step 90, information is collected. For example, the photographer may collect customer information by writing it down (step 92) or by entering it directly into a computer or other electronic device (step 94).

At step 96, the images are provided to order servicing equipment 16. For example, images may be provided by mailing film (step 98) hand carrying film (step 100), e-mailing digital images (step 102), uploading images using the World Wide Web (step 104), transmitting images using a modem link (step 106), or mailing or hand carrying images on digital media (step 108).

At step 110, customer information is provided to order servicing equipment 16. For example, customer information may be provided by mailing (step 112), hand carrying (step 116), e-mailing a customer information file or the like (step 114), uploading information using the web (step 118), or transmitting information using a modem link (step 120).

At step 122, the customer (or customers) may be provided with an opportunity to view the images. For example, the customer may be provided with an opportunity to view images by providing the customer with an opportunity to view images over the web (step 124), by mailing or hand carrying proofs or digital media containing the images to the customer (step 126), by e-mailing images to the customer (step 128), by transmitting images to the customer using a modem link (step 130), or by mailing or hand carrying proofs or digital media to the photographer who delivers the proofs or digital media to the customer (step 132).

As shown in FIG. 7b, the customer may be provided with an opportunity to place an order for images and related products and services. For example, the customer may be provided with an opportunity to place an order over the web (step 136), may be allowed to place order using e-mail (step 138), may be allowed to place an order using a modem link (step 140), may be allowed to order by mail or in person (step 142), or may be allowed to order through the photographer (step 144).

At step 146, the customer's order may be fulfilled. For example, order servicing equipment 16 may fulfill the customer's order by printing images, packaging the printed images, and mailing the packaged images to the customer and other recipients (steps 148, 150, and 152). The system may be used to fulfill the customer's order by creating an image-based product (step 154), packaging the product (step 156), and mailing the product to the customer and other recipients (step 158). If desired, the system may be used to fulfill the customer's order by creating an image-based digital product (step 160) and distributing the digital product to the customer and other recipients (step 162). An image-based service may be provided at step 164.

At step 166, the system may credit the photographer and other suitable parties. For example, the system may electronically credit the account of the photographer (step 168), may issue a check or direct a financial institution to issue a check for the photographer (step 170), or may credit the photographer's financial institution (step 172).

The steps shown in FIGS. 7a and 7b are merely illustrative. Other suitable steps may be used to provide image-based products and services to customers if desired. Moreover, additional steps may be involved. For example, if a graphics designer participates in creating a web page based on the images taken by the photographer, the system may perform additional steps such as providing the designer with an opportunity to append content to the images and crediting the designer with a portion of the revenues from sales to the customer. These and other aspects of the invention are described further below.

Figure 8:
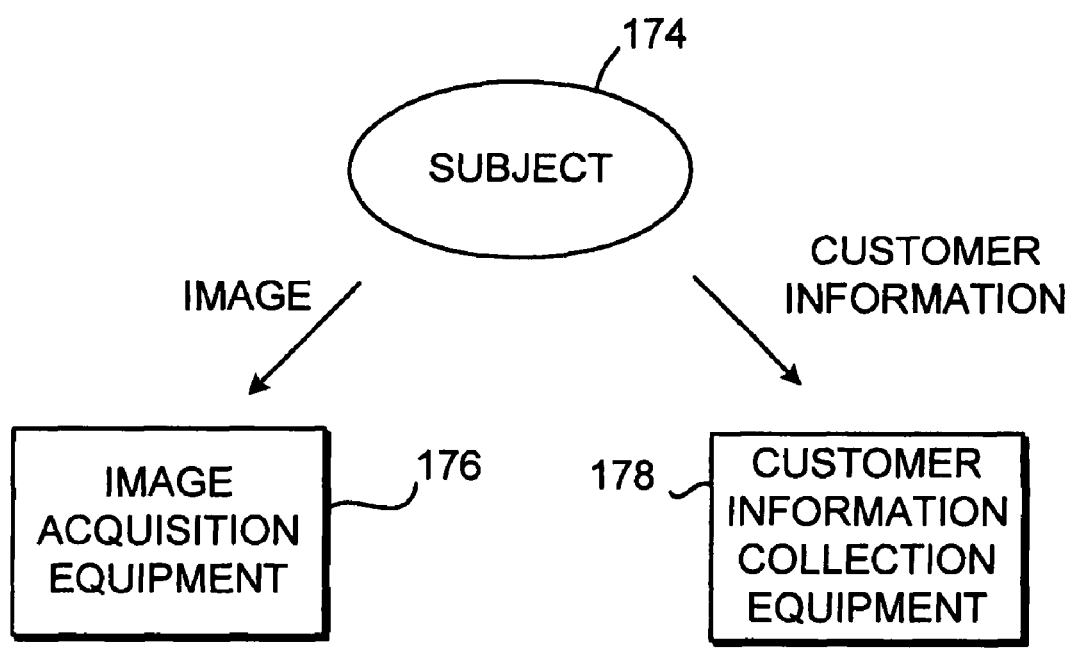
FIG. 8 is a diagram illustrating the acquisition of images and customer information with image acquisition equipment and customer information collection equipment in accordance with the present invention.

As shown in FIG. 8, images may be taken of a subject 174 using image acquisition equipment 176. Customer information may be collected using customer information collection equipment 178 in those circumstances in which the subject is the customer. Situations in which the subject is the customer arise when, for example, the photographer takes images for a school photo session, for a wedding, for a portrait, or other situation in which the subject of the images may desire to purchase images and related products and services.

Image acquisition equipment 176 may be a film-based camera, an instant photography camera, a digital camera, a digital camera built into a computer or other suitable platform, a video camera that uses a still images capture card in a personal computer, or any other suitable equipment suitable for capturing images. If desired, image acquisition equipment 176 may have the capability to capture short video clips or full-length videos. Such video-capable image acquisition equipment may use digital or analog (film, magnetic tape, etc.) recording techniques.

Customer information collection equipment 178 may be a notepad for the photographer to write down information, a printed form for a customer to write down information, a computer, a personal digital assistant or other handheld or portable computing device for the customer or photographer to enter customer information, a handheld tape recorder or a video camera that may be used to record the customer information, or any other suitable equipment for collecting information on the customer. In some situations the customer information collection equipment 178 may be based on the same platform (or be the same as) the image acquisition equipment 176. Moreover, in some situations, such as when the project involves a commercial client, customer information may be collected from a representative of the customer rather than the subject of the images. The subject of the images may be a product, building, landscape, model, etc.

Figure 9:
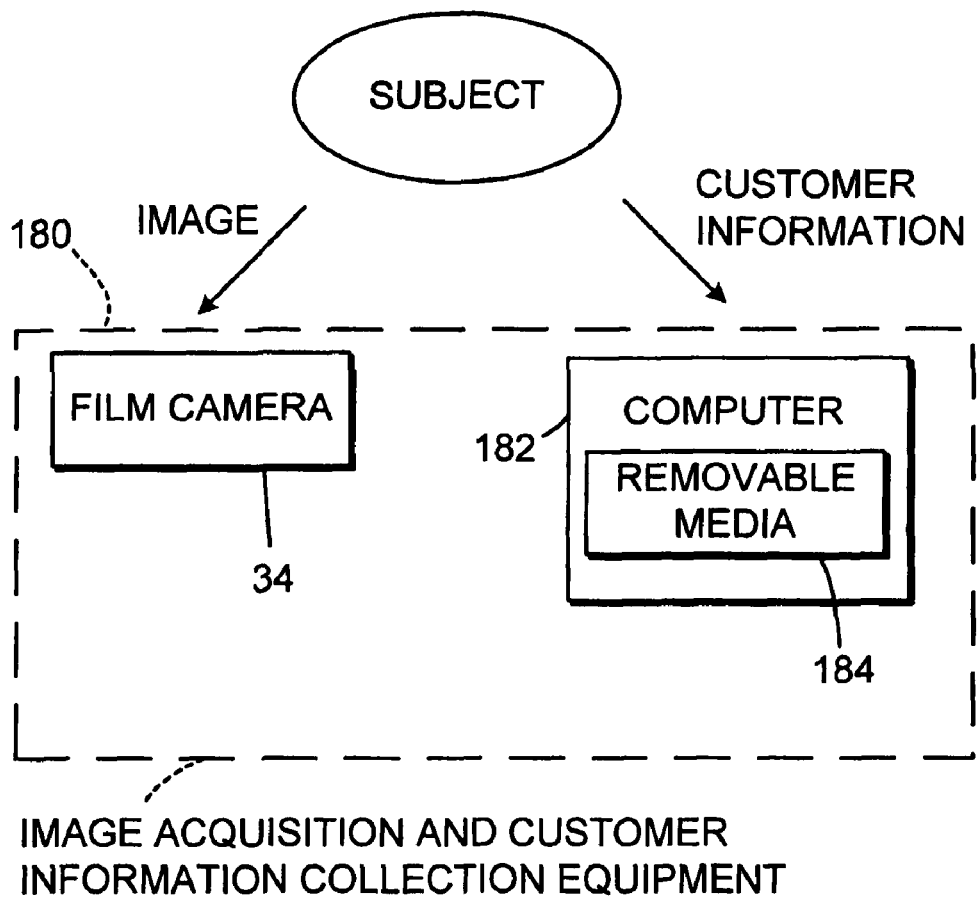
FIG. 9 is a diagram illustrating how image acquisition equipment and customer information collection equipment may be based on a film camera and a computer in accordance with the present invention.

As shown in FIG. 9, image acquisition and customer information collection equipment 180 may be used to capture images and collect customer information. A film camera 34 may be used to take images. A computer 182 may be used to collect customer information. Computer 182 may be, for example, a notebook computer or handheld computing device that supports a removable media 184 such as a floppy diskette, memory card, etc. Customer information that is collected with computer 182 may be stored on removable media 184. Removable media 184 may be removed from computer 182 and transferred to photographer computer 36 (FIGS. 3 and 5). A floppy diskette drive or other digital media reader such as digital media reader 74 of FIG. 5 may be used by computer 36 to read the customer information stored on removable media 184. Such a digital media reader may be separate from or part of computer 182. Computer 182 may be separate from or the same as computer 36.

Figure 10:
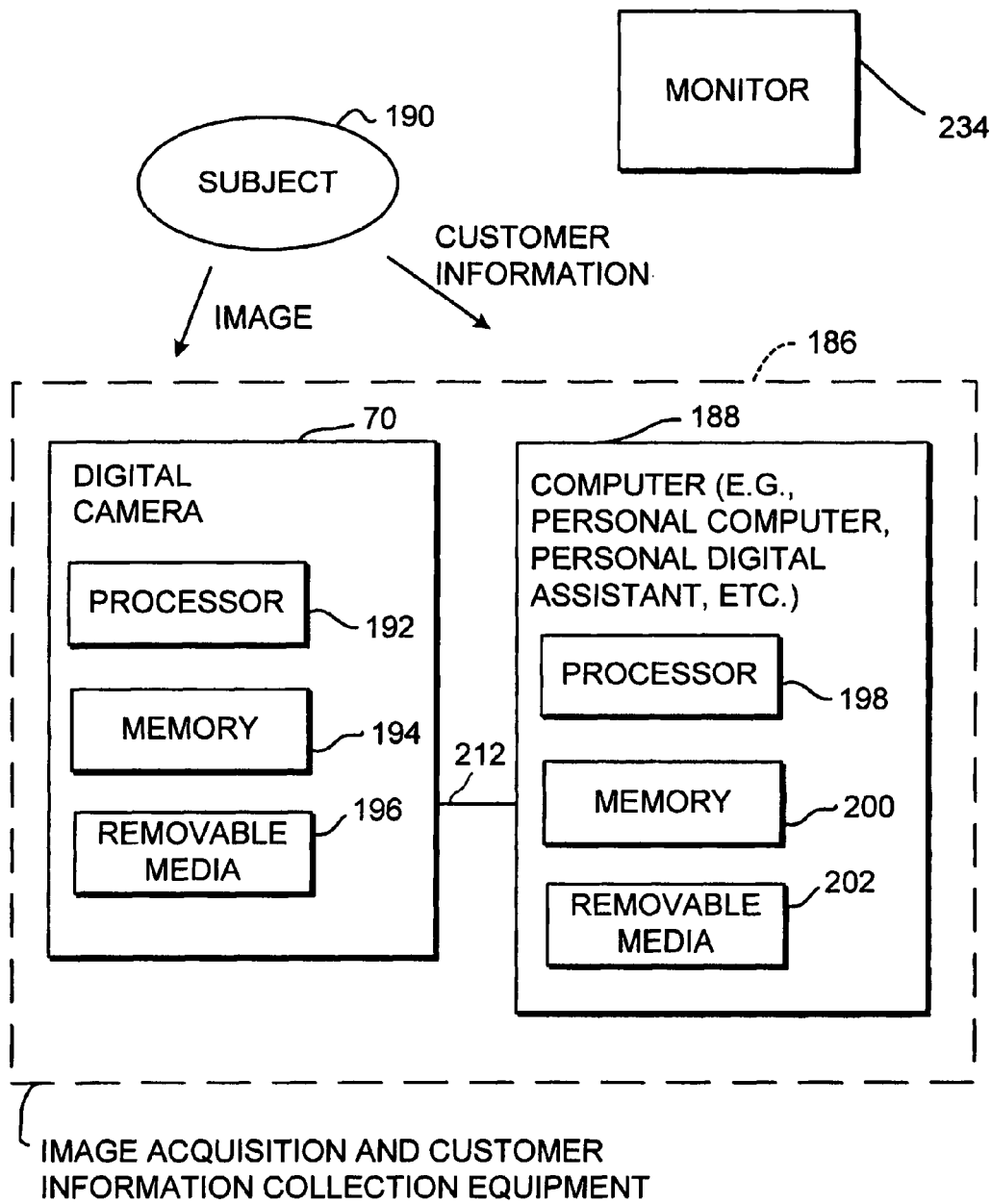
FIG. 10 is a diagram illustrating how image acquisition equipment and customer information collection equipment may be based on a digital camera and a computer in accordance with the present invention.

As shown in FIG. 10, image acquisition and customer information collection equipment 186 may be based on a digital camera 70 and a computer 188. Digital camera 70 may have a processor 192 that it uses to store images of subject 190 in memory 194 or on removable media 196. Images may be transferred to photographer computer 36 (FIG. 5) by storing images on removable media 196 and transferring removable media 196 to digital media reader 74 (FIG. 5). Images may also be transferred to photographer computer 36 (FIG. 5) over communications link 72 (FIG. 5).

Computer 188 may be used to collect customer information. When subject 190 is the customer, computer 188 may be used to collect customer information directly from subject 190. For example, when the photographer is taking images of students, each student may enter personal information into computer 188 (with assistance from the photographer if desired). As used herein, the term "photographer" may apply to a single photographer or to a photographer and various assistants and other such personnel. Computer 188 may be a notebook computer, a handheld computing device such as a personal digital assistant, or any other suitable computer. Computer 188 of FIG. 10 may be the same as photographer computer 36 (FIG. 5) or may be separate from photographer computer 36 (FIG. 5). For example, if computer 188 is a notebook computer, computer 188 may be used as photographer computer 36 (FIG. 5) for tasks such as submitting digital images and customer information to order servicing equipment 16. If computer 188 is a handheld computer, it may be preferable to use computer 188 in conjunction with digital camera 70 in the field. When the images have been taken and the customer information collected, images may be transferred to photographer computer 36 from digital camera 70 and customer information may be transferred from computer 188 to photographer computer 36. Computer 188 has a processor 198 that may be used to store customer information and images in memory 200 and on removable media 202. Images and customer information may be transferred from computer 188 to photographer computer 36 (when they are not the same computer) using removable media 202 or a communications link such as communications link 72 of FIG. 5.

Computers such as computer 188 and photographer computer 36 may support various applications for image acquisition, customer information collection, image uploading, image editing, image management, and other functions. Applications of this type and other applications implemented at photographer equipment 12 (FIG. 1) may sometimes be collectively or generically referred to herein as "the photographer application." A customer application or applications may be implemented at customer computer 14 to provide customer features such as product and service ordering, image editing, and other functions. Applications may also be used at order servicing equipment 16 (FIG. 1), video and graphics editing and production equipment 24 (FIG. 1), financial institution 22 (FIG. 1), order fulfillment facility 20 (FIG. 1), and at any other suitable equipment or facility in system 10. The applications used in system 10 may be stand-alone applications or may involve a client-server arrangement in which a local computer acts as a client processor and a remote computer acts as a server processor.

Figure 11:
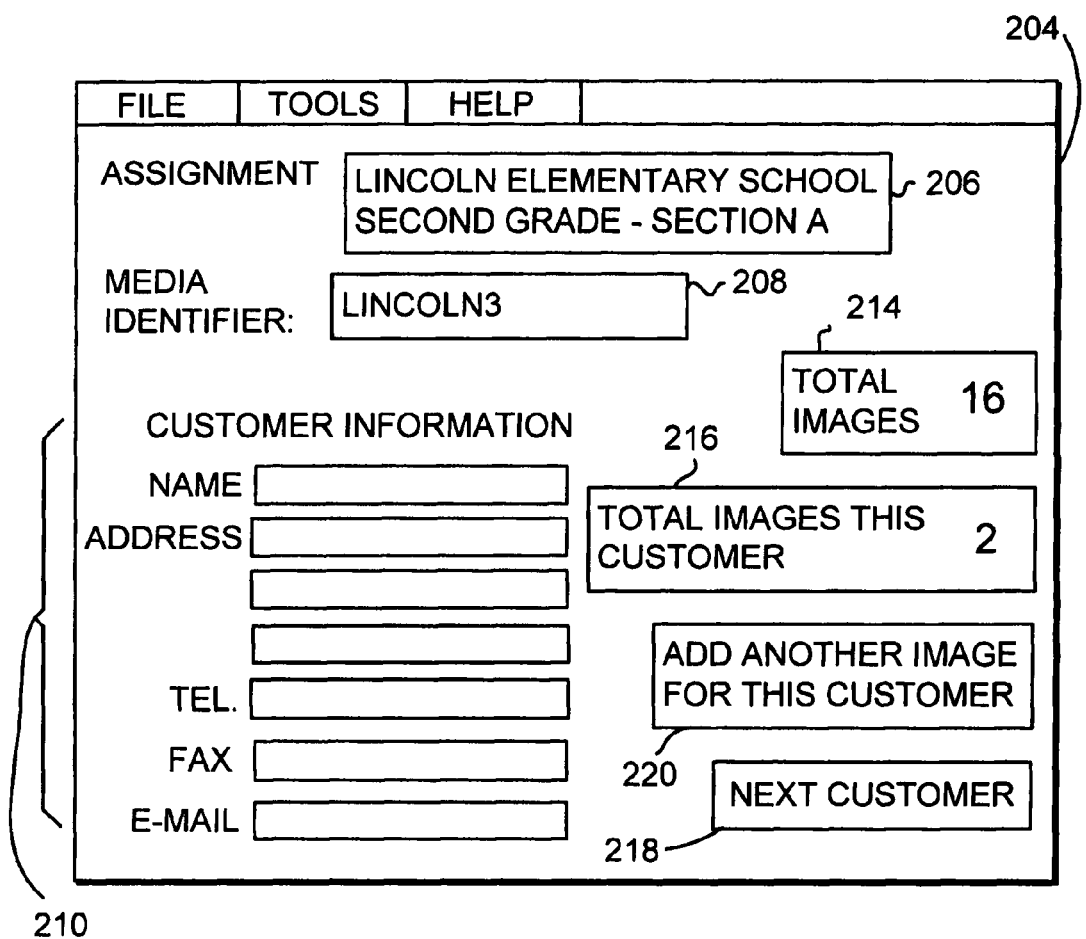
FIG. 11 shows an illustrative screen that may be provided to a photographer using photographer equipment for use by the photographer in acquiring images and collecting customer information in accordance with the present invention.

An illustrative screen provided by a photographer application on a computer such as computer 188 of FIG. 10 is shown in FIG. 11. Screen 204 allows the photographer to collect customer information and to control the acquisition of digital images with digital camera 70 (FIG. 10). For example, screen 204 may include assignment identifier entry region 206 in which the photographer may enter a description of the photographer's project or assignment. In the example of FIG. 11, the assignment involves taking images of Section A of the second grade at Lincoln Elementary School. The assignment information may be used by the photographer application to identify groups of stored images. After uploading to order servicing equipment 16 (FIG. 1), the assignment information may be used to identify images that customers are interested in viewing and purchasing. For example, customers may be asked to select their assignment from a list of assignments when viewing and ordering images on-line.

Screen 204 may also contain a media identifier entry region 208. The photographer may use region 208 to enter a label for a new floppy diskette, digital memory card, or other removable digital media. Computer 188 (10) may use the media identification information provided in region 208 to label the removable media 202 (FIG. 10) before media 202 is removed from computer 188. This allows the photographer to keep track of the removable media.

Customer information may be entered into customer information entry region 210. Customer information may be entered by the customer (using, for example, computer 188 or a keyboard and monitor linked to computer 188) or by the photographer. Customer information may include the customer's name, address, telephone number, fax number, and e-mail address, or any other suitable information on the customer's location, how the customer may be reached, the desired method of payment (credit card type and number), the identify of friends or family who might desire to be notified when the images are ready, or any other such information. Not all of this information is required. For example, it may be sufficient for the customer to provide an e-mail address. The system may then send an e-mail to the customer when images and related products and services are available to be viewed and ordered. If the customer provides only a mailing address, the order servicing equipment operator may mail a letter to the customer to notify the customer that images and related products and services may be viewed and ordered. Notifications may also be provided through a school or other institution that is involved in the project. Such notifications may be routed to the customers through the school or other institution based solely on the customer's name, without requiring mailing address or e-mail address information. These examples are illustrative. Any suitable customer information may be collected for the customer if desired.

Computer 188 (FIG. 10) may control the acquisition of digital images with digital camera 70 (FIG. 10) by issuing commands to digital camera 70 over communications link 212 (FIG. 10). The photographer application may provide information on the total number of images taken in total image information region 214 on screen 204 of FIG. 11.

Information on the total number of images taken for the current customer may be provided in region 216. If the photographer has finished with a particular customer, the photographer may click on or otherwise select next customer option 218. Selecting next customer option 218 directs the photographer application to prepare to acquire images and collect customer information for a new customer. The ways in which options such as next customer option 218 may be selected depend upon the type of inputs supported by computer 188. For example, if computer 188 has a pointer controlled by a mouse, trackball, or other pointing device, the photographer may click on the option of interest. If computer 188 has a touch-sensitive screen, the photographer may select options be touching the screen. If computer 188 has a voice recognition capability, options may be selected by voice command. If computer 188 is a pen-based computer, options may be selected using a pen. These examples are merely illustrative. Any suitable technique may be used by the photographer, customer, order servicing equipment operator, operator of video and graphics editing and production equipment, or others to select desired options provided by an application.

Option 220 may be provided on screen 204 to provide the photographer with an opportunity to add another image for the current customer. When the photographer selects option 220, the photographer application may display an image acquisition screen such as image acquisition screen 222 of FIG. 12. Information on the current assignment may be displayed in region 224. Media identifier information may be displayed in region 226. Customer information may be displayed in region 228. The photographer application may automatically assign the customer a password and display it in customer password region 230. This allows the photographer to let the customer know what the password is at the time the images are taken. If desired, the customer may choose a password and that password may be entered into a region such as customer password region 230. Regardless of how the customer password is generated, the photographer application may later provide the password to order servicing equipment 16, so that order servicing equipment 16 may use the password in deciding whether to grant access to a particular customer. If desired, order servicing equipment 16 may be used to generate a password and provide it to the customer by e-mail or other suitable notification technique. These techniques for providing password control of on-line images are merely illustrative. Any other suitable technique for providing password control may be used if desired.

Figure 12:
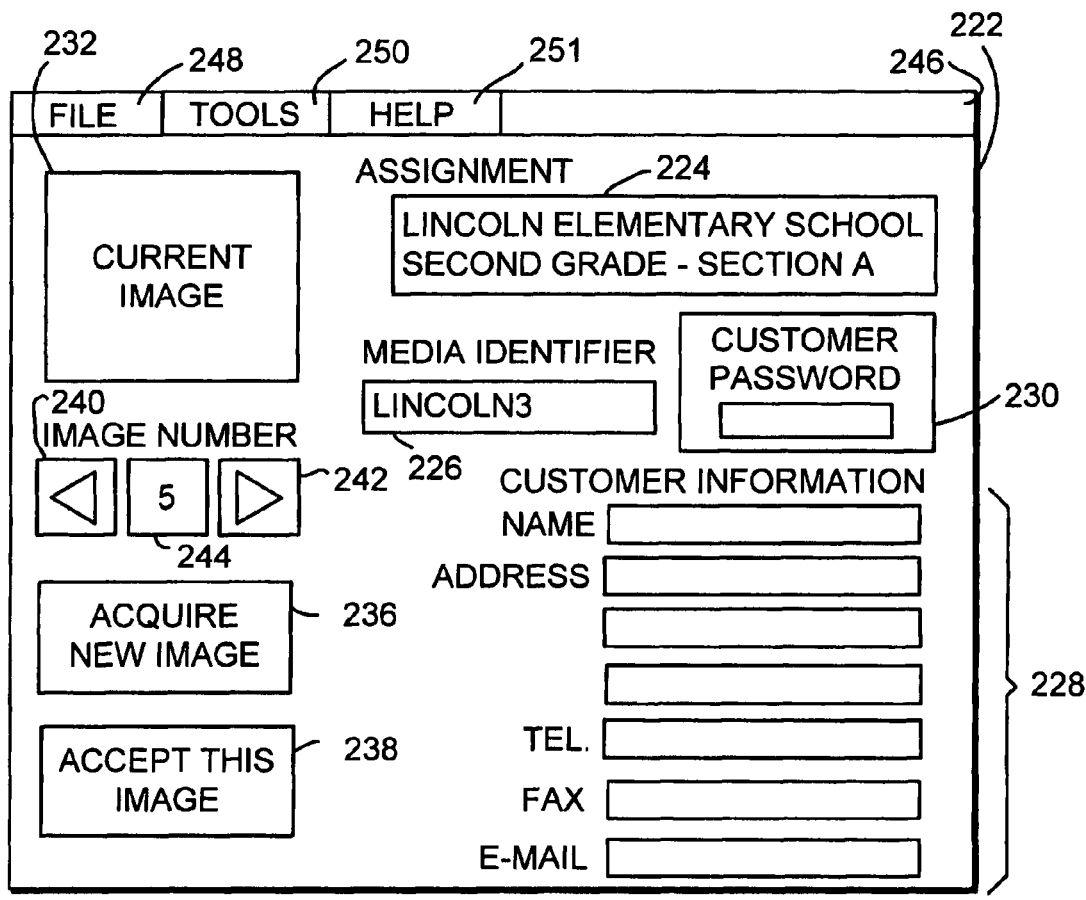
FIG. 12 shows another illustrative screen that may be provided to a photographer for use in acquiring images and collecting customer information in accordance with the present invention.

As shown in FIG. 12, the current image may be displayed in current image region 232. If desired, this image may be displayed for the customer using a monitor such as monitor 234 of FIG. 10. Monitor 234 may be part of image acquisition and customer information collection equipment 186 (FIG. 10) or may be connected to image acquisition and collection equipment by a suitable cable or other path. The photographer may acquire a new image by selecting acquire new image option 236. The acquired image may be displayed as the current image in region 232. When the customer or photographer is satisfied with the image, the image may be selected by clicking on accept this image option 238. The photographer may browse forward and backward through the accepted images using arrows 240 and 242. The number of each customer image may be displayed in region 244.

A toolbar such as toolbar 246 may be provided for screen 222 and other screens provided by the photographer application. Toolbar 246 may provide the photographer with access to features of the photographer application that are not displayed as part of the current screen. For example, file option 248 may provide access to a drop-down menu of options relating to saving the images, changing file names, exiting screen 222 and returning to screen 204 of FIG. 11, and other such file and navigation functions. Tools option 250 may provide access to a drop-down menu of options that allow the photographer to crop or edit the image displayed in region 232 before accepting the image and perform other image manipulation or content-related functions. Help option 251 may provide the photographer with a menu of help features. These toolbar options are only illustrative. Any suitable photographer application features may be provided using toolbar 246 or other such arrangement.

The order servicing equipment operator may use order servicing equipment 16 (FIG. 1) to provide the photographer with an on-line opportunity to set up an account with the order servicing equipment operator. The photographer may use a web browser or other suitable application to establish a communications link with the order servicing equipment operator over communications network 18. If the photographer uses a web browser, for example, order servicing equipment 16 may be used to provide the photographer with a web page or other interactive screen such as web page 252 of FIG. 13. If the photographer desires to set up a new account with the order servicing equipment operator, the photographer may select set up new account option 254 by clicking on box 256 and go button 258. If the photographer desires to access an existing account, the photographer may click on box 260, enter the photographer's account name or number in region 262, enter the password for the account in region 264, and click on go button 258.

If the photographer selects new account option 254, order servicing equipment 16 (FIG. 1) may provide a web page such as web page 266 of FIG. 14. Web page 266, like many other web pages that may be presented by order servicing equipment 16, may be scrolled to be viewed in its entirety. In the upper portion of page 266, the photographer is provided with an opportunity to enter name and address information (regions 268 and 270). The photographer is also provided with an opportunity to enter a telephone number in region 272, an e-mail address in region 274, and a fax number in region 276. Credit card information may be entered in regions 278 and 280 in the lower portion of page 266. Providing a credit card number or other suitable financial information allows the order servicing equipment operator to process the photographer's order even if the photographer has no credit in the account maintained by the order servicing equipment operator. Regions 282 and 284 may be used to provide the photographer with an opportunity to enter financial information such as the photographer's financial institution (e.g., financial institution 22 of FIG. 1) and account number. This allows the order servicing equipment operator to make electronic funds transfers to deposit the photographer's share of the revenues in the photographer's financial institution. Financial information such as the photographer's financial institution and account number may also be used to establish the creditworthiness of the photographer. If the photographer provides satisfactory financial information, order servicing equipment 16 may establish a relationship with the photographer allowing the photographer to submit assignments, receive credit for revenues from the customer, etc. If the photographer selects home option 286, a welcome or home page may be presented. If the photographer selects submit option 288, the new account information may be submitted to order servicing equipment 16 (FIG. 1) for processing. Selecting cancel button 290 cancels the new account setup process. The photographer may then be presented with page 252 of FIG. 13. The options shown in FIG. 14 are merely illustrative. The photographer may be required to submit other information or allowed to submit various other types of information to establish an account if desired.

Figure 13:
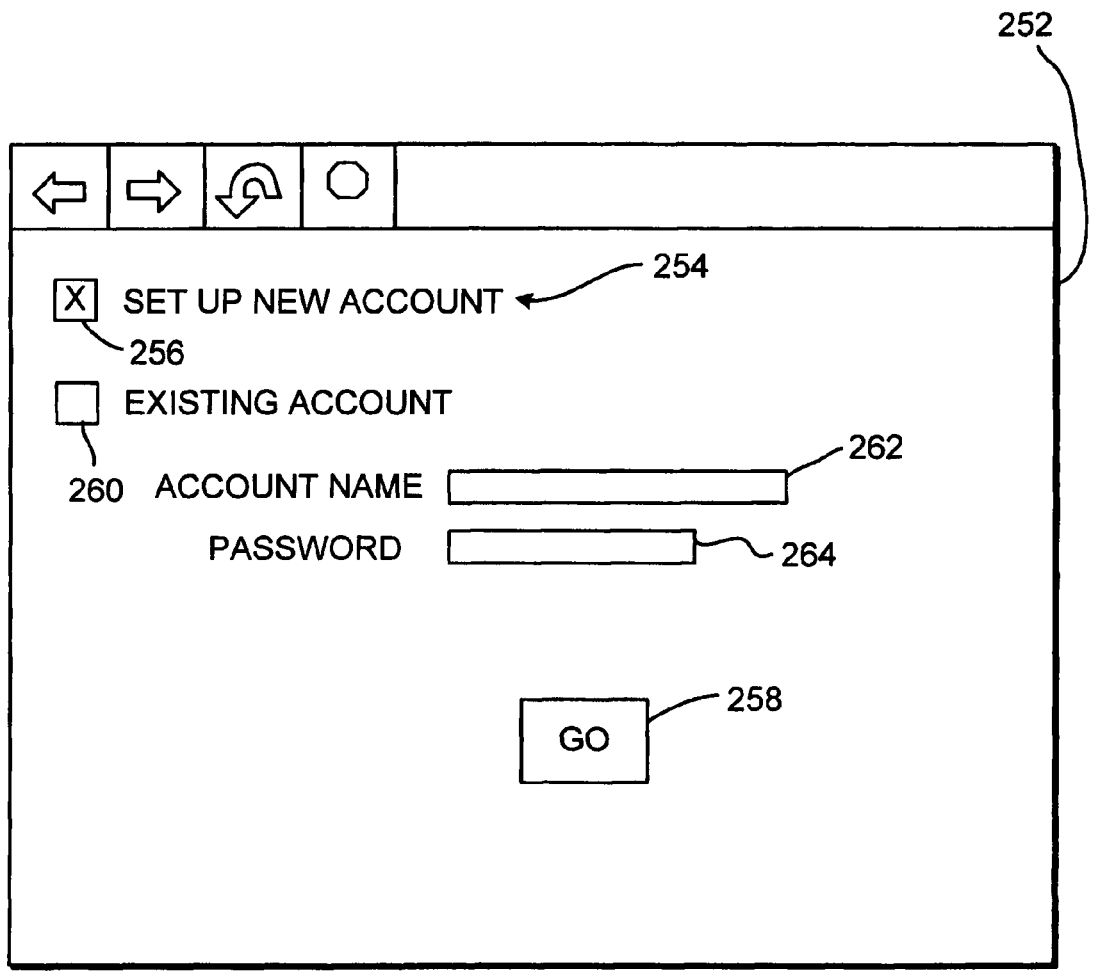
FIG. 13 shows an illustrative web page that may be used by a photographer to indicate that the photographer desires to set up a new account or access an existing account in accordance with the present invention.
Figure 15:
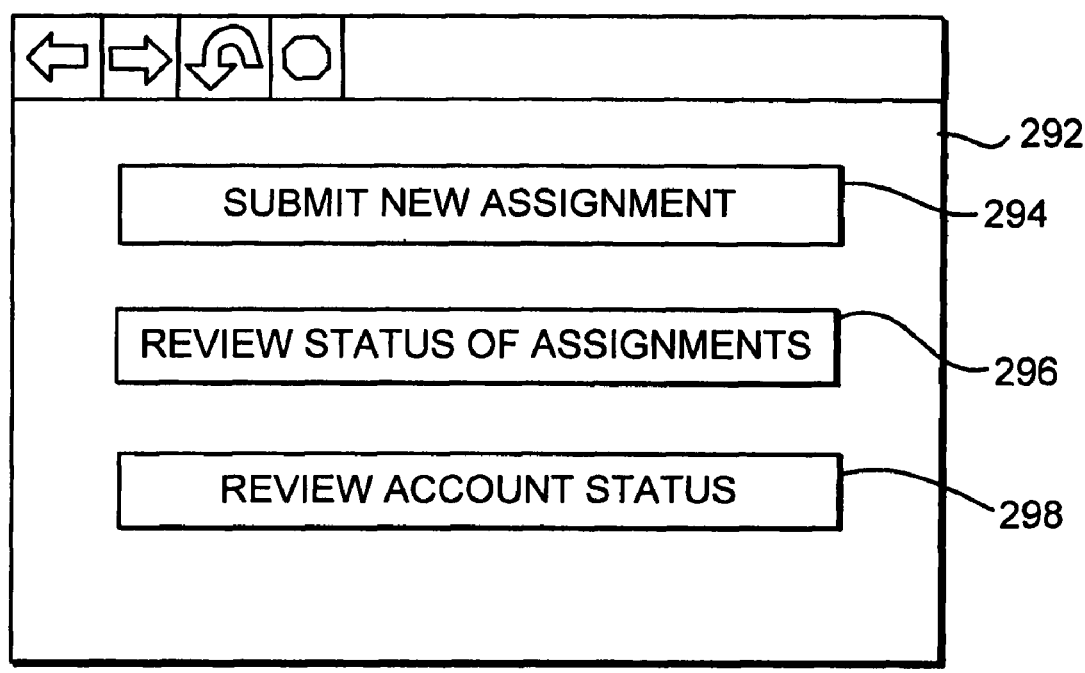
FIG. 15 shows an illustrative web page that may be used to provide a photographer with an opportunity to select various options relating to assignments and account status in accordance with the present invention.

If the photographer chooses to access an existing account from page 252 of FIG. 13, order servicing equipment 16 of FIG. 1 may be used to present the photographer with a web page such as web page 292 of FIG. 15. Submit new assignment option 294 allows the photographer to submit images and customer information to order servicing equipment 16 (FIG. 1). Review status of assignments option 296 allows the photographer to review the status of assignments associated with the photographer's account. Review account status option 298 allows the photographer to review the status of the photographer's account with the order servicing equipment operator.

As shown in FIG. 16, if the photographer selects review status of assignments option 296 (FIG. 15), the photographer may be presented with assignment status page 300. The names of various assignments may be presented in region 302. Information on when each assignment was started (e.g., when images were made available on-line for access by customers) may be presented in column 304. Information on when the images are scheduled to go off-line (e.g., without payment of a supplemental fee by the customer or photographer), may be presented in column 306. If desired, images may be made available indefinitely or until the images are no longer generating orders for products or services. Column 208 may be used to display information on the revenues received for each assignment. If the photographer wishes to view additional information, the photographer may select more option 310.

Figure 17:
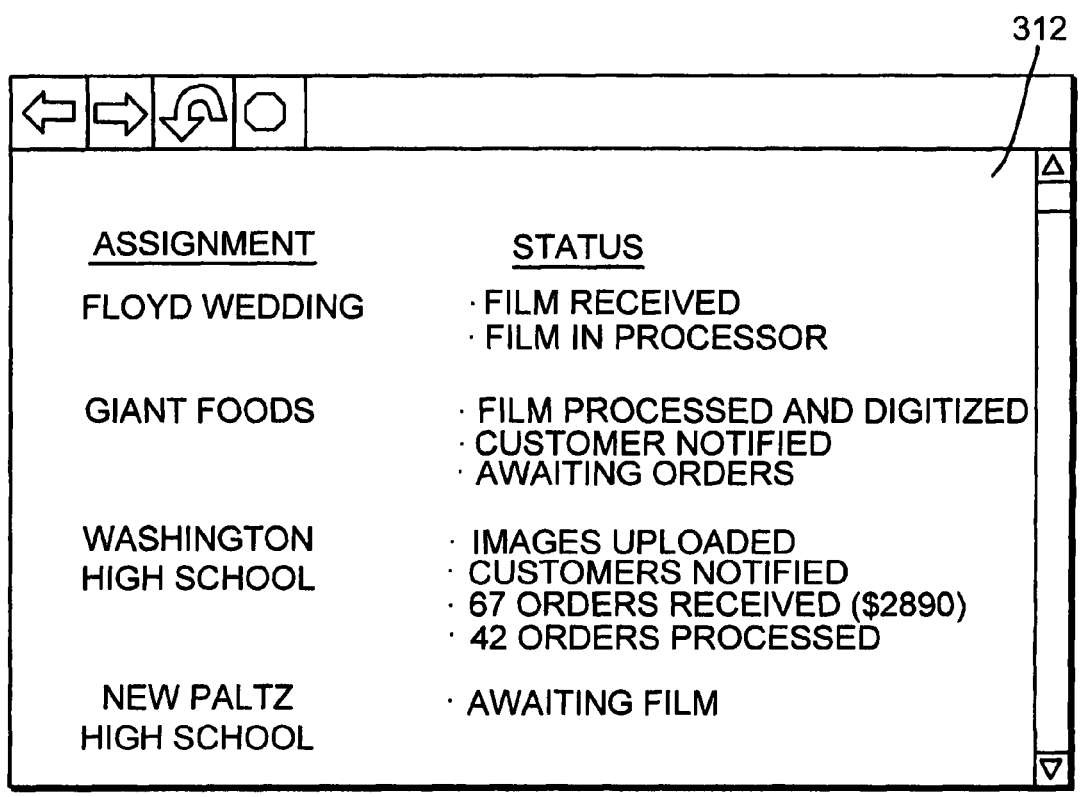
FIG. 17 shows an illustrative web page that may be provided to a photographer to allow the photographer to review assignment status in accordance with the present invention.

Selecting more option 310 of FIG. 16 may direct the system to display assignment status page 312 of FIG. 17. In the example of FIG. 17, status information for the Floyd wedding assignment indicates that film has been received from the photographer and is currently being developed. Status information for the Giant Foods assignment indicates that film has been processed and digitized, the customer has been notified, and the order servicing equipment operator is awaiting orders from the customer. Status information for the Washington High School assignment indicates that digital images have been uploaded from the photographer. Customers (students) have been notified that the images are available for on-line ordering. To date, 67 orders have been received for the Washington High School assignment totaling $2890 (as indicated on assignment status page 300 of FIG. 16). Of the 67 orders that have been received, 42 orders have been processed. The status information for the New Paltz High School assignment indicates that the photographer has provided the order servicing equipment 16 with information on the assignment, but that the film has for the assignment has not yet been received at order servicing equipment 16 for processing. The assignment status screens of FIGS. 16 and 17 are merely illustrative. If desired, more or less detail may be included and different types of status information may be provided.

Figure 18:
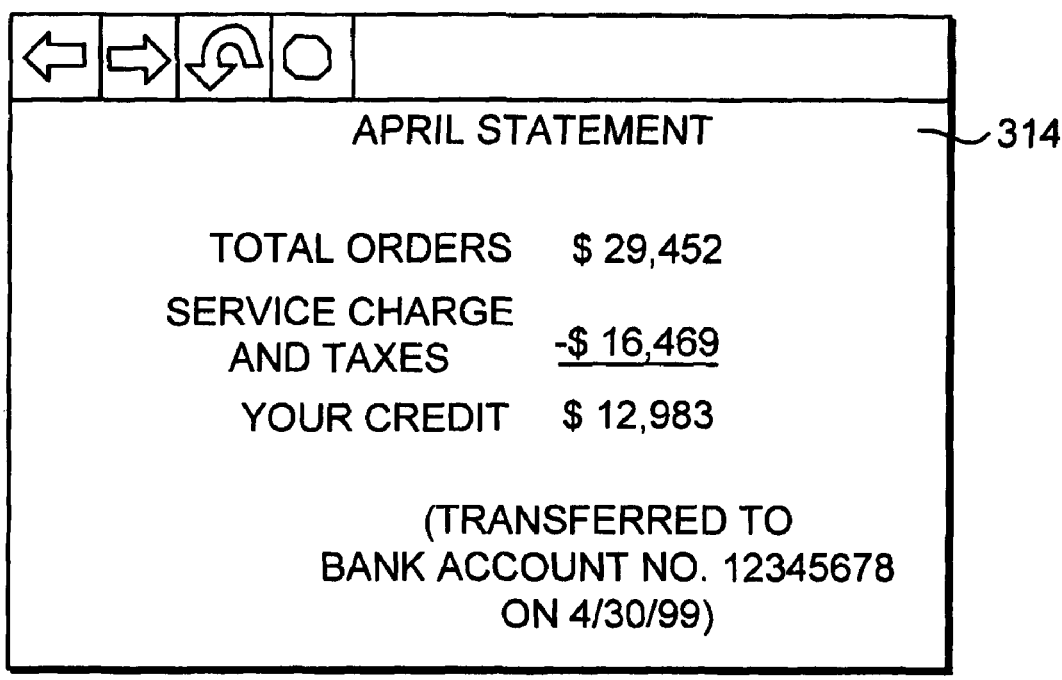
FIG. 18 shows an illustrative web page that may be used to provide a photographer with account information in accordance with the present invention.

As shown in FIG. 18, when the photographer selects review account status option 298 of FIG. 16, order servicing equipment 16 may be used to present the photographer with account status page 314. Account status page 314 may contain information on the photographer's most recent monthly statement. In the example of FIG. 18, account status page 314 includes information on the amount of revenue received during April. Information on the service charge and taxes withheld by the order servicing equipment operator may also be presented. The service charge may be computed based on any suitable formula, such as a given percentage of the total revenues, a fixed fee, fees based on the number of images handled and the image type (digital or film), a combination of such factors, or any other suitable arrangement for reimbursing the operator of order servicing equipment 16 for the effort and expense involved in handling the assignment submitted by the photographer. If desired, information may be provided on the whether the photographer's share of the April revenues have been successfully transferred to the photographer's bank account or other financial institution. The information provided in the illustrative account status page 314 of FIG. 18 is merely an example. Other suitable account status information may be provided if desired. For example, information may be provided on previous monthly account balances. The photographer may be provided with on-line or downloadable tools for graphing and analyzing past account status information. Detailed tax, revenue flow, or statistical information, or the like may be provided.

Figure 19:
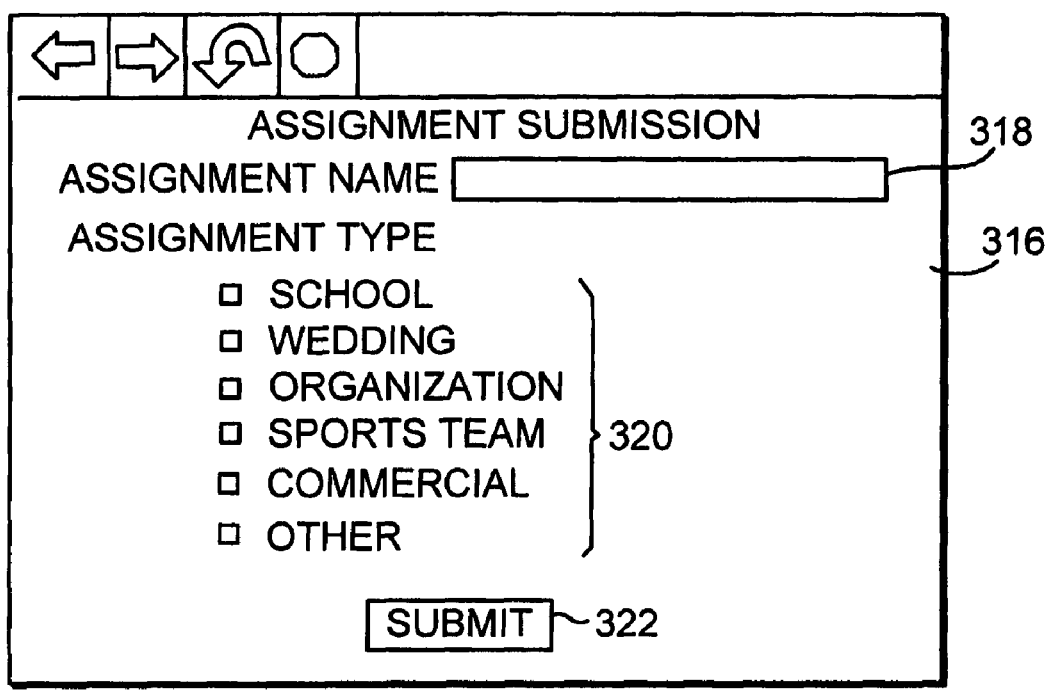
FIG. 19 shows an illustrative web page that may be used to provide a photographer with an opportunity to enter assignment information in accordance with the present innovation.

If the photographer selects submit new assignment option 294 of FIG. 15, the photographer may be presented with a page such as assignment submission page 316 of FIG. 19. Assignment submission page 316 may include assignment name region 318 in which the photographer may enter the name of the assignment that the photographer desires to submit. Assignment submission page 316 may also include assignment type specification region 320 in which the photographer may check a box to indicate the type of assignment being submitted. Information on the type of assignment being submitted may be used by order servicing equipment 16 (FIG. 1) in determining which options to present to the photographer, customer, and any other parties who access the images. The types of assignments shown in FIG. 19 are merely illustrative. Any suitable assignment types may be provided if desired. Other options may also be presented on assignment submission page 316 if desired. When the photographer has entered an assignment name in region 318 and has selected an assignment type in region 320, the photographer may select submit button 322 to transmit the information from page 316 to order servicing equipment 16 (FIG. 1).

Figure 20:
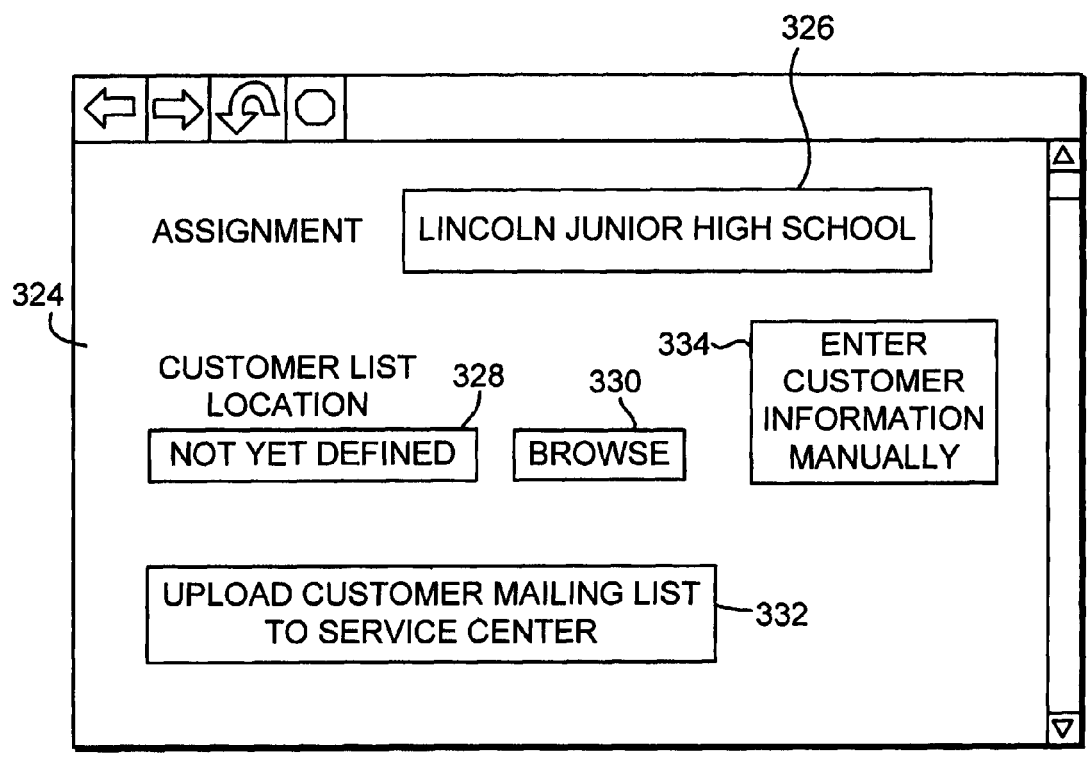
FIG. 20 shows an illustrative web page that may be used to provide a photographer with an opportunity to upload customer information to order servicing equipment in accordance with the present invention.

Once the photographer has provided information to the order servicing equipment that identifies the assignment to be submitted, order servicing equipment 16 (FIG. 1) may provide a page such as page 324 of FIG. 20. The name of the selected assignment may be displayed in region 326. Page 324 allows the photographer to specify whether customer information is to be entered manually or is to be entered from a list or other file that has already be created. A customer list may be created by a computer used by the photographer when gathering customer information such as computer 182 of FIG. 9 or computer 188 of FIG. 10. A customer list may also be created by a school, or other institution, or by some other party. For example, a school may provide the photographer with a list of students and their home addresses from a database maintained by the school. The photographer may enter the location of the customer list file in customer list location region 328. The list may be on the photographer's hard drive, because the list has been downloaded to photographer computer 36 (FIGS. 3 and 5) from a computer or other device used in the field or because the computer used to collect the information is the same as photographer computer 36. If customer information is located on the photographer's hard drive (or other local storage device), the photographer may enter the path and filename for the customer information in region 328. The photographer may also select browse option 330 to browse the available disks and other storage devices associated with photographer computer 36 (FIGS. 3 and 5). If photographer computer 36 is connected to a network, the photographer may browse to view different file locations within the network. Photographer computer 36 may be able to locate a customer list from an institution such as a school by using a dial-up link or an Internet connection. If the list is available over such a link, the photographer may download the list or may enter its location in region 328 (e.g., by specifying an Internet address or other identifying information).

Additional pages and options may be provided to the photographer to facilitate the steps involved in transferring customer information from a school computer or other such location. For example, pages may be provided that include options for entering passwords and other security information. When the desired filename and location information has been entered or determined by browsing or using other options, the photographer may select upload customer mailing list to service center option 332. Selecting option 332 may direct the system to transmit the customer information contained in the list or file to order servicing equipment 16. If desired, a school or other institution may provide the customer list directly to order servicing equipment 16. For example, the customer list may be posted to a web page provided by order servicing equipment 16.

Figure 21:
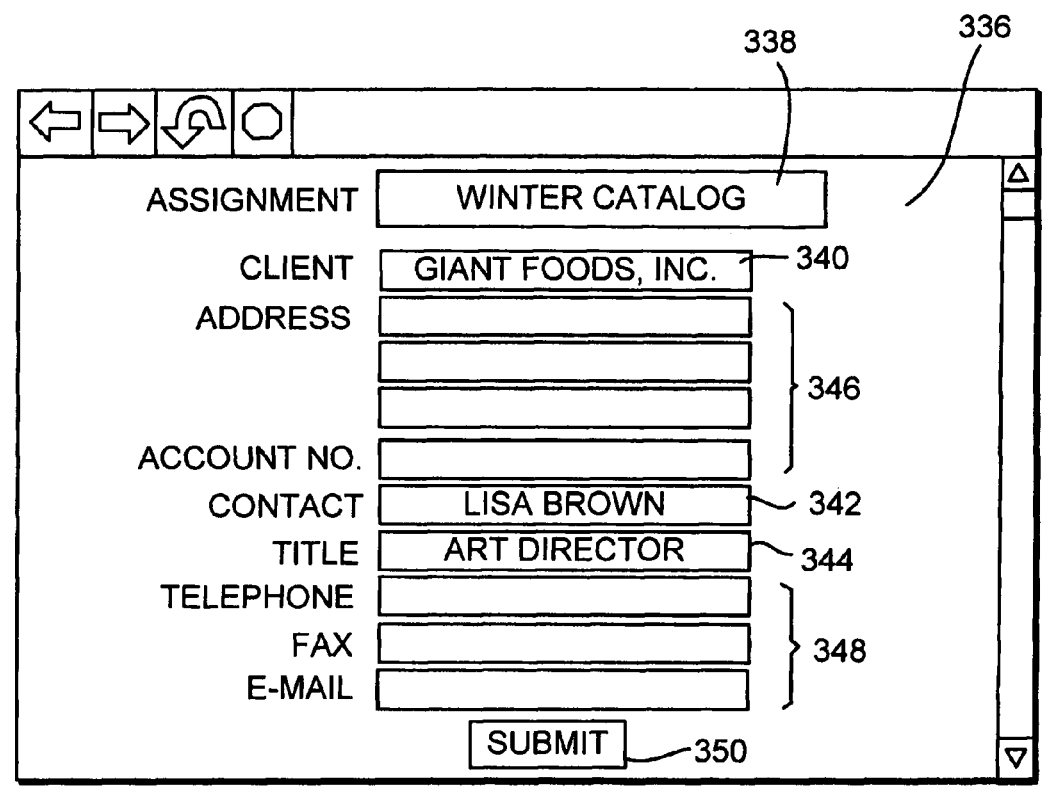

If a customer list has not been created, the photographer may enter the list manually. Page 324 may include enter customer information manually option 334. Selecting option 334 may direct the system to display a page such as page 336 of FIG. 21. Page 336 includes assignment title region 338 for identifying the assignment. Page 336 of FIG. 21 is directed toward commercial customers. This type of page may be presented, for example, when the photographer specifies that the new assignment is of the commercial type by checking the commercial box in region 320 of FIG. 19.

Commercially-oriented customer information entry pages such as page 336 may contain a client region 340 for entering a client name and a separate contact region 342 for entering a contact name at the client. The contact's title may be entered in region 344. Address and account information for the client may be entered in region 346. Telephone number, fax number, and e-mail address information may be entered in region 348. When the photographer has finished entering customer information into the information regions of page 336, the photographer may select submit button 350 to transmit the information to order servicing equipment 16 (FIG. 1).

Page 336 is merely illustrative. Any suitable page or series of pages or other suitable information entry scheme may be used to allow the photographer to enter customer information.

Figure 22:
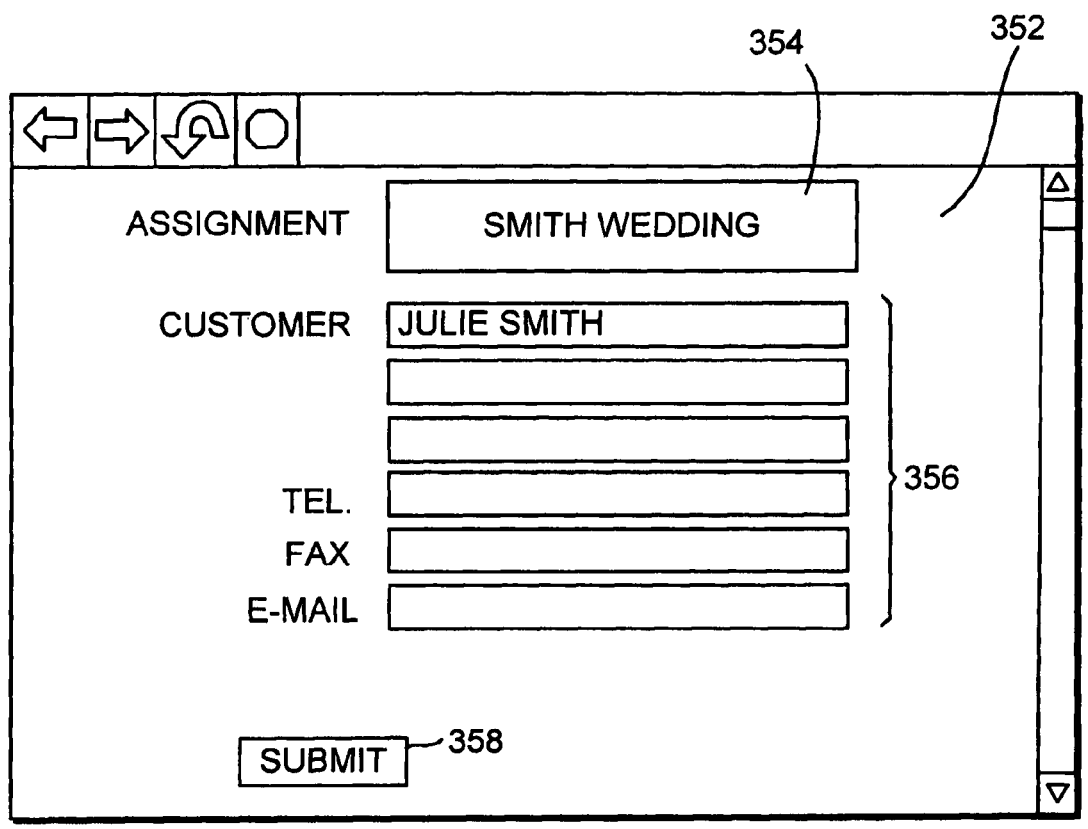
FIG. 22 shows an illustrative web page that may be used to provide a photographer with an opportunity to enter information on a customer in accordance with the present invention.

Another example of a customer information entry page is shown in FIG. 22. Page 352 of FIG. 22 is an example of the type of page that may be displayed when the photographer has indicated that the assignment is for a wedding by checking the wedding box in region 320 of FIG. 19. The assignment name may be displayed in region 354. Customer information may be entered in region 356. When the customer information has been entered, the photographer may select submit option 358 to transmit the customer information to order servicing equipment 16.

When the customer information has been submitted, the system may present the photographer with an opportunity to specify how images are to be provided to order servicing equipment 16 (FIG. 1). For example, the photographer may be provided with a page such as page 360 of FIG. 23. Page 360 may include region 362 for displaying information on the name of the assignment. Page 360 may also contain a confirmation 364 indicating that the customer information has been accepted by order servicing equipment 16 (FIG. 1). Page 360 may provide the photographer with an opportunity to indicate how images are to be provided to order servicing equipment 16 (FIG. 1).

Figure 24:
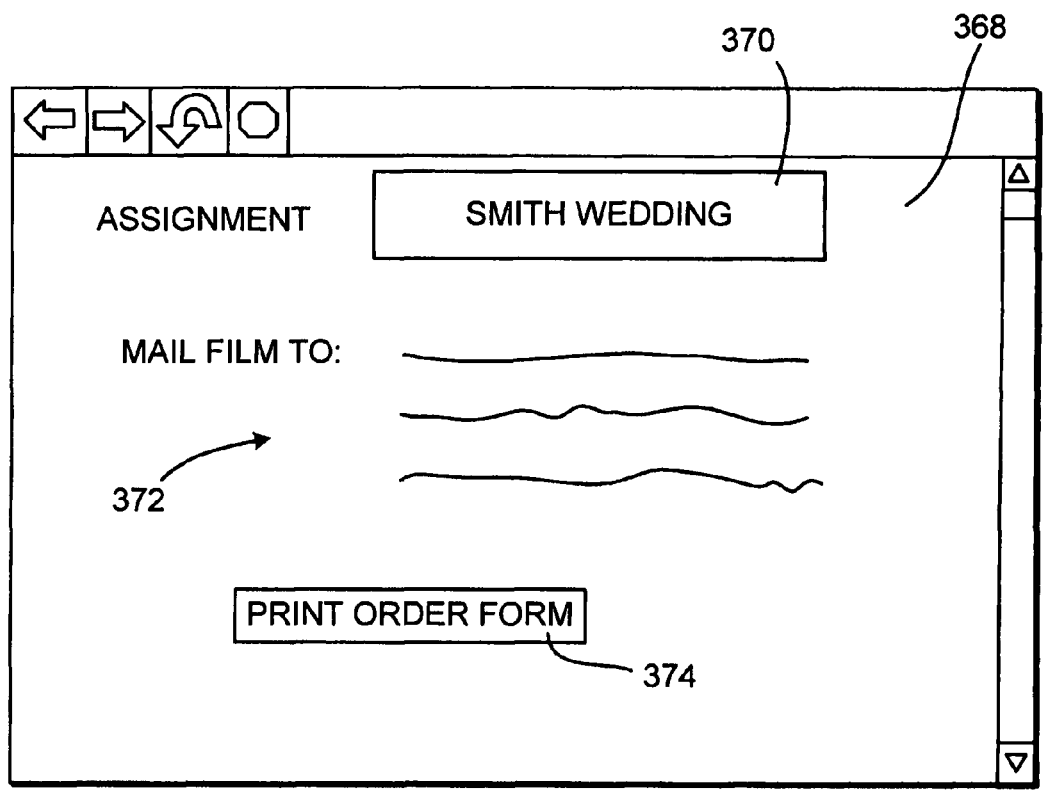
FIG. 24 shows a web page that may be used to provide a photographer with an opportunity to print an order form in accordance with the present invention.

If the photographer selects mail option 366, the photographer may be presented with a page such as page 368 of FIG. 24. Page 368 may contain assignment title information in region 370. Page 368 may also contain a region such as region 372 with information on the address to which the photographer should mail the images. If the photographer selects print order form option 374, an order form may be printed. The photographer may use the order form when mailing film or any other image-storage media to the order servicing equipment.

Figure 23:
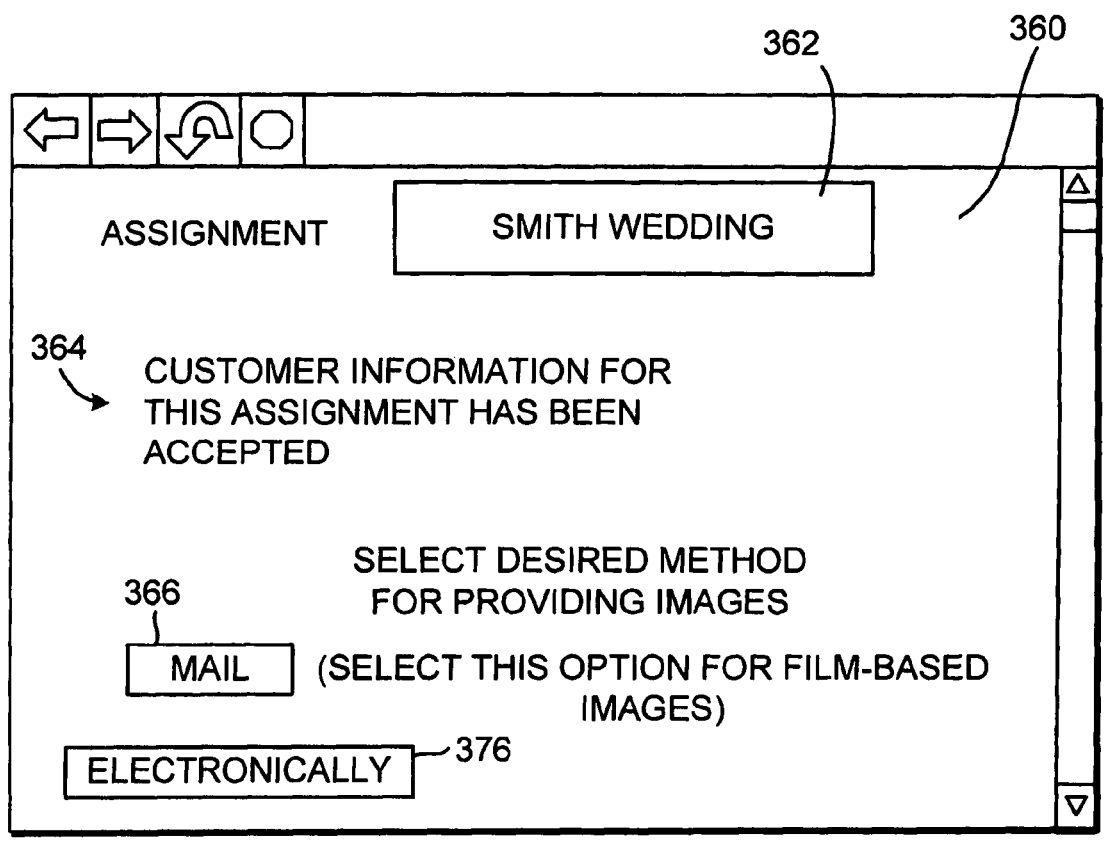
FIG. 23 shows a web page that may be used to provide a photographer with options relating to providing images to order servicing equipment in accordance with the present invention.
Figure 25:
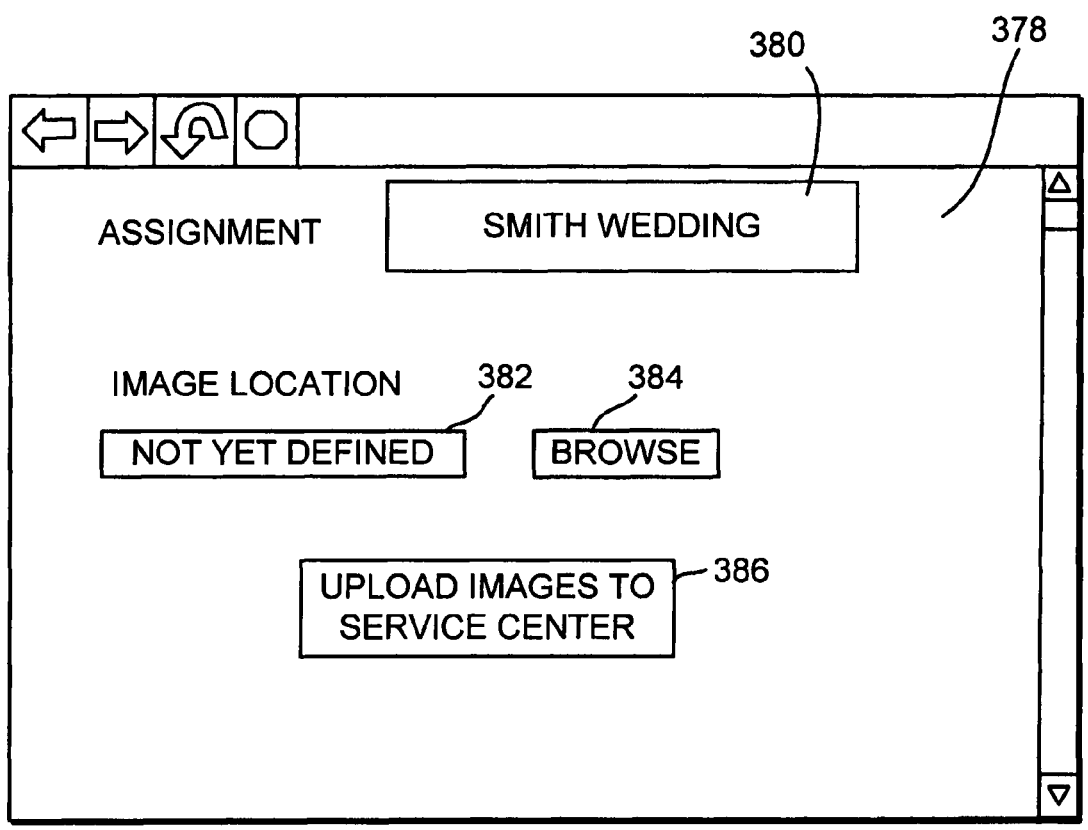
FIG. 25 shows a web page that may be used to provide a photographer with an opportunity to upload images electronically in accordance with the present invention.

As shown in FIG. 23, page 364 may also include an option 376 that the photographer may select when the photographer desires to submit images to order servicing equipment 16 (FIG. 1) electronically. When the photographer selects option 376, the photographer may be presented with a page such as page 378 of FIG. 25. Information identifying the assignment may be displayed in region 380. The photographer may enter the image location in region 382. Images may be stored on the photographer's hard drive, because the images have been provided to photographer computer 36 (FIGS. 3 and 5) from a computer or other device used in the field, because the photographer computer 36 was directly involved in capturing the images, because images have been digitized by an image digitizing device such as image digitizing equipment 62 of FIG. 5, or because digital image data was otherwise provided to the photographer's hard drive. If images are located on the photographer's hard drive (or other local storage device), the photographer may enter the path and filename for the images in region 382. The photographer may also select browse option 384 to browse the available disks and other storage devices associated with photographer computer 36 (FIGS. 3 and 5). If photographer computer 36 is connected to a network, the photographer may browse to view different file locations within the network.

Images may be stored remotely. For example, the photographer may use film to take images. The photographer may provide the film to lab 64 of FIG. 5, where the film is developed by processing equipment 66 and the images are digitized using image digitizing equipment 68. Images may then be stored at lab 64. Photographer computer 36 may be able to locate an image file stored at a remote location such as lab 64 using a dial-up link or an Internet connection. If the images are available over such a link, the photographer may download them to photographer computer 36 or may enter their location in region 382 of FIG. 25 (e.g., by specifying an Internet address or other identifying information). Additional pages and options may be provided to the photographer to facilitate the process of transferring images to order servicing equipment 16 from locations such as lab 64 of FIG. 5. For example, pages may be provided that include options for entering passwords and other security information. When the desired filename and location information has been entered or determined by browsing or using other options, the photographer may select upload images to service center option 386 of FIG. 25. Selecting option 386 may direct the system to transmit the images to order servicing equipment 16.

Once order servicing equipment 16 receives the customer information and images for an assignment, the images may be made available to the customer on-line. If the photographer provides the images on undeveloped film, the film may first be developed and the images digitized from the developed film. One way in which images may be provided to the customer is by placing them on a web page or by otherwise making them available electronically such as via e-mail, dial-up connection, or any other suitable technique. If desired, the operator of order servicing equipment 16 may use the customer's e-mail address that has been provided with the customer information to e-mail a notification to the customer that the images are available on-line for the customer's review. Such notifications may be sent automatically by order servicing equipment 16 if desired. A typical notification message 388 is shown in FIG. 26.

Figure 26:
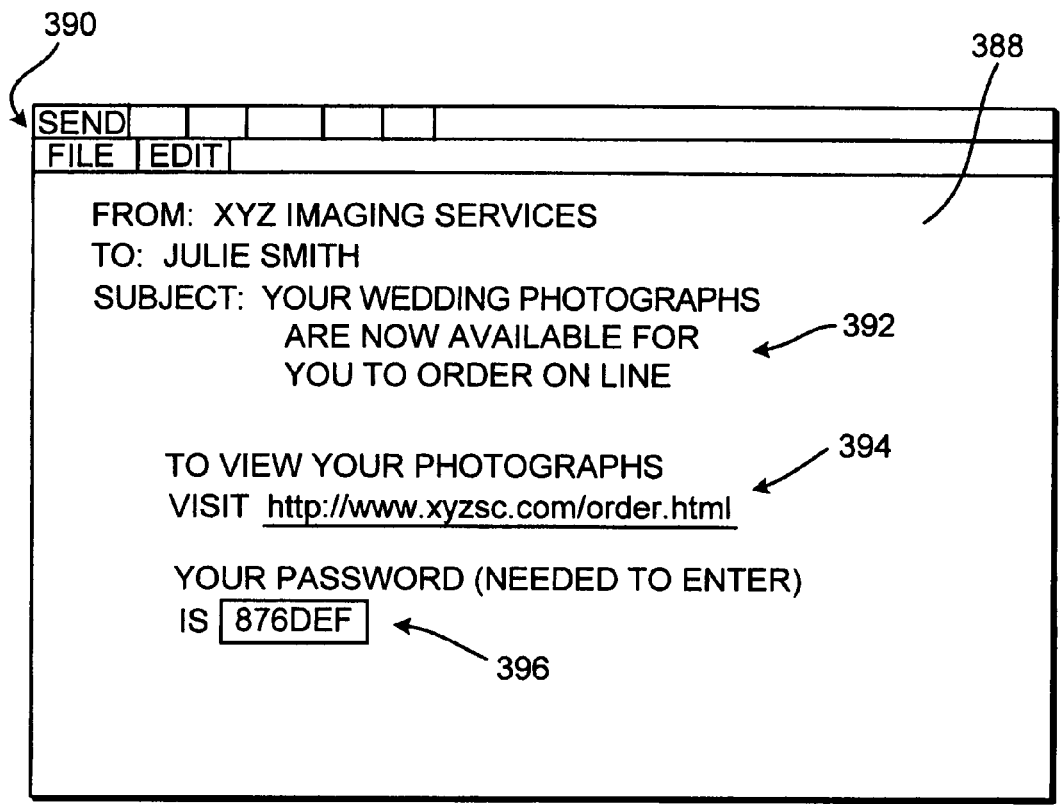
FIG. 26 shows an illustrative e-mail message that may be sent to a customer to notify the customer that the images taken by the photographer are available for on-line viewing in accordance with the principles of the present invention.

Notification message 388 of FIG. 26 may be read by the customer using an e-mail application (illustrated in FIG. 26 by the presence of e-mail function options 390). Notification message 388 may contain information on the sender (XYZ Imaging Services), the recipient (Julie Smith), the current availability of the images (text shown in region 392), and the location of the images (indicated by Internet address or URL 394). Notification message 388 may also contain information on the customer's password in region 396. If the customer provided a password to the photographer when the photographer collected the customer information of if the photographer application implemented on computer 182 (FIG. 9) or on computer 188 (FIG. 10) generated the password, order servicing equipment 16 (FIG. 1) may include that password in message 388 as a reminder to the customer. If desired, order servicing equipment 16 may generate a password autonomously. Notification by e-mail is merely one illustrative notification technique. The customer may be notified by any other suitable technique or may not be specifically notified if desired.

The operator of order servicing equipment 16 (FIG. 1) may place the images on-line using any suitable combination of manual and automatic techniques. Automated techniques may involve placing uploaded digital images or digital images from image digitizing equipment 44 of FIG. 3 directly into a web page or other location without manual operator involvement. If desired, personnel at order servicing equipment 16 may oversee the operation. Similarly, customer notifications and other functions performed by order servicing equipment 16 may be accomplished using any suitable combination of manual and automatic techniques. For example, automatic notification may be sent to customers by using order servicing computer 46 (FIGS. 3 and 5) to extract the customers' e-mail addresses from the customer information provided to order servicing equipment 16 (FIG. 1) by the photographer. Order servicing computer 46 may handle tasks associated with image storage, providing customers with access to stored images, the storage of customer information, customer notification, financial transactions, crediting the photographer, maintaining photographers' accounts, processing orders, etc.

Figure 27:
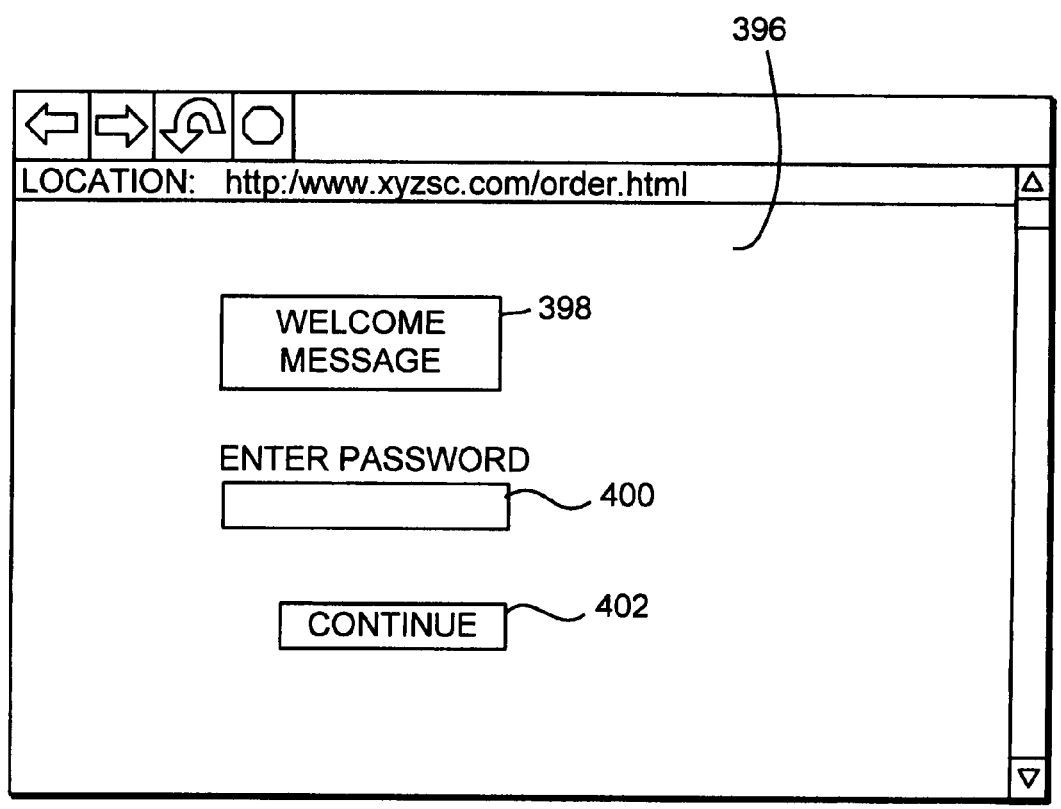
FIG. 27 shows an illustrative web page that may be used to provide a customer with an opportunity to enter a password prior to being provided with on-line access to images in accordance with the present invention.

After a customer receives a notification such as notification message 388 of FIG. 26, the customer may access their images by, for example, using a web browser to visit the URL indicated in region 394 of FIG. 26. If supported by the customer's e-mail application and browser, the customer may click on region 394 to launch their browser and retrieve the relevant web page. An illustrative web page that may be presented to the customer when the customer clicks on a link such as the link in region 394 of FIG. 26 is shown as web page 396 in FIG. 27.

Web page 396 may include a welcome message 398, a region 400 in which the customer may enter the customer's password, and a continue option 402 that the customer may select to submit the password after it has been entered into region 400.

Figure 28:
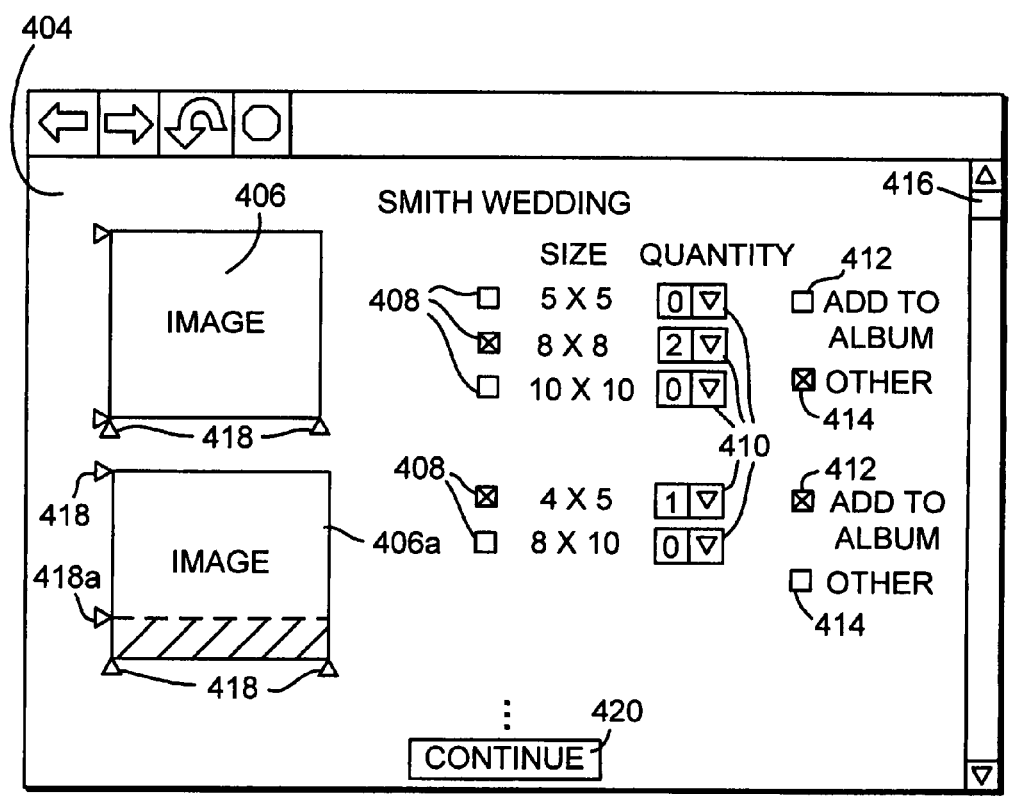
FIG. 28 shows an illustrative web page that may be used to provide an opportunity to select options for ordering image-based products and services in accordance with the present invention.

When order servicing equipment 16 receives a valid password from the customer, the customer may be presented with a page such as page 404 of FIG. 28. Page 404 contains the images 406 that were taken by the photographer. The customer may view the images. The customer may order enlargements by checking size boxes 408 and by selecting a desired quantity for each checked size using options 410. If the customer wishes to add the image to an album, the customer may check an appropriate one of add to order boxes 412. Checking one of other boxes 414 indicates that the customer is interested in other image-based products or services. The customer may scroll through the images using scroll control region 416. The customer may crop images by using a pointer to click and drag cropping arrows 418 to desired locations. In the example of FIG. 28, crop arrow 418*a* has been dragged upwards from its nominal position at the bottom of image 406*a*, so that image 406*a* will be cropped as shown. When the customer has finished selecting which enlargements to order, the customer may click on continue option 420. If only enlargements are being ordered, the order servicing equipment 16 may provide the customer with additional order pages that allow the customer to provide financial information such as credit card information and to otherwise complete the order.

If the customer selects one of add to album options 412, the customer may be provided with an opportunity to create and edit their own album. The customer may be provided with templates to simplify the album creation process. If desired, the photographer or other party can edit and finalize the album design.

Figure 29:
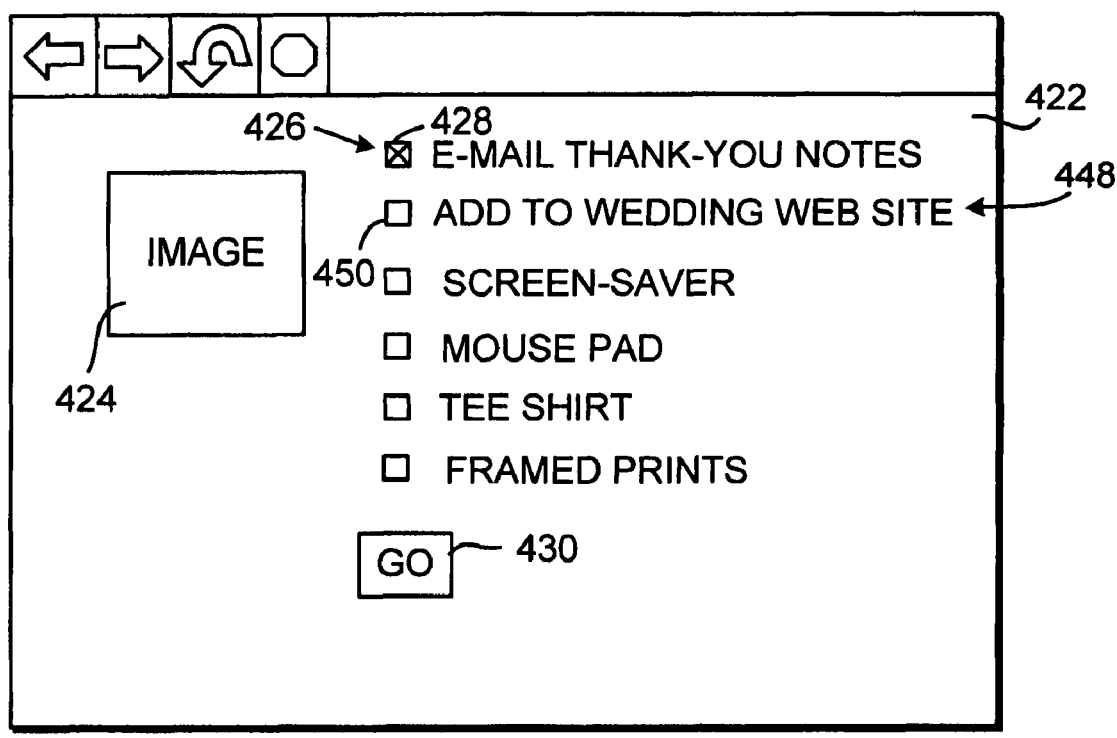
FIG. 29 shows another illustrative web page that may be used to provide an opportunity to select options for ordering various image-based products and services in accordance with the present invention.

If the customer selects other option 414 for any of images 406 in FIG. 28, the photographer may be presented with a page such as page 422 of FIG. 29 that allows the customer to view the selected image 424 and to order various products and services related to that image. The options that are presented on page 422 may be related to the type of assignment involved. Information on the type of assignment involved may be provided by the photographer when the photographer submits the assignment to order servicing equipment 16 (FIG. 1). If desired, the customer may also be provided with an opportunity to enter information that identifies the type of assignment involved.

In the example of FIG. 29, the assignment type is a wedding. The customer is therefore presented with an opportunity to select options from various wedding-related options. For example, the customer may select e-mail thank-you-notes option 426 by checking box 428 and selecting go option 430. If the customer selects option 426, the customer may be presented with an e-mail generation page such as page 432 of FIG. 30.

Figure 30:
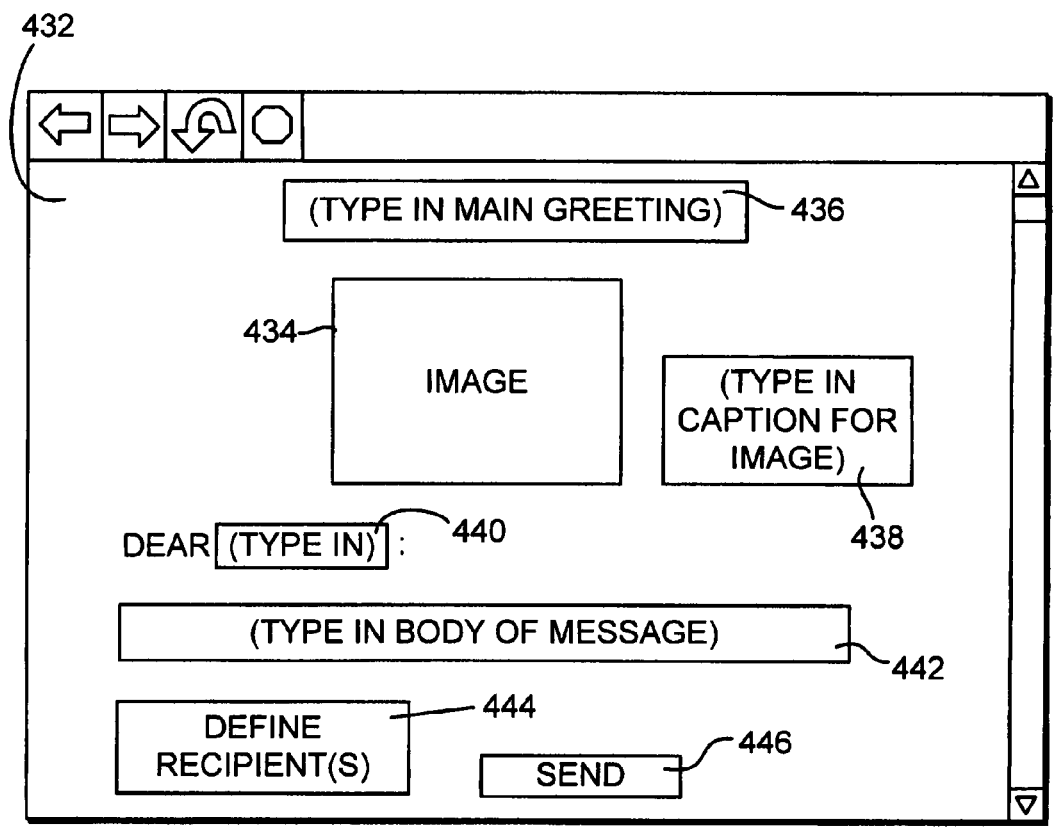
FIG. 30 shows an illustrative web page that may be used to provide an opportunity to create an image-based e-mail message in accordance with the present invention.

As shown in FIG. 30, the image that was selected by the user by checking an associated box 414 on page 404 of FIG. 28 and that was displayed as image 424 on page 422 of FIG. 29 may be displayed as image 434 on page 432 of FIG. 30. The customer may type in a greeting or other suitable title or header in greeting region 436. Caption information may be entered in region 438. The customer may enter the recipient's name in region 440 and the body of the message in region 442. A recipient may be defined by selecting option 444. When the customer selects option 444, the customer may be provided with an opportunity to enter an e-mail address for a desired recipient. If there are multiple recipients, the customer may enter them manually, or may provide the location of a mailing list stored on customer computer 14 (FIG. 1) or other suitable location. A mailing list may be based, for example, on a list of attendees at a wedding. The customer may send the message to the recipients by selecting send option 446. The customer may be provided with an opportunity to save the mailing list for later use. For example, the list may be saved for later use in sending holiday cards.

The thank-you-note arrangement of FIG. 30 may be used for other types of image-based message services. For example, if the image is a novelty portrait of a child during the holiday season, a page such as page 432 may be used to provide the customer with an opportunity to send holiday e-mail cards. These examples are illustrative only. Any type of message containing an image 434 may be sent if desired. Moreover, the messages may be printed and mailed by the system so that recipients may receive regular letters. For example, messages may be printed on paper using digital printing equipment 48 (FIGS. 3 and 5) and mailed using packaging and mailing equipment (FIGS. 3 and 5).

Figure 31:
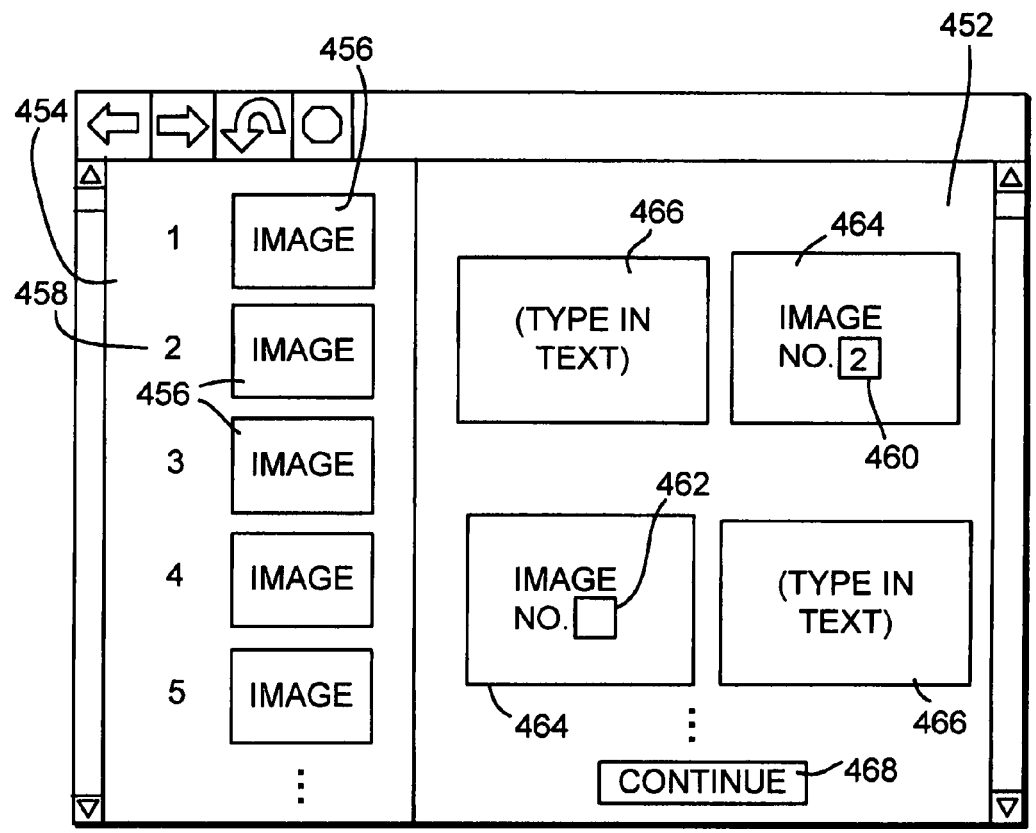
FIG. 31 shows an illustrative web page that may be used to provide an opportunity to select images to include in a web site in accordance with the present invention.

If the customer selects add to wedding web site option 448 of FIG. 29 by checking box 450 and selecting go option 430, the customer may be presented with a page such as page 452 of FIG. 31. Page 452 allows the customer to construct a web site that incorporates the images taken by the photographer. The images that are available for incorporation into the site may be displayed in region 454 as images 456. Each image 456 may have an associated number 458. Image numbers may be entered into regions such as region 460 and 462 in image display regions 464. When the web site is displayed, the images 456 corresponding to the entered image numbers are displayed. Text may be entered in text entry regions 466. Borders and backgrounds may be selected by the customer by accessing options on additional pages or by using other on-line tools.

Figure 32:
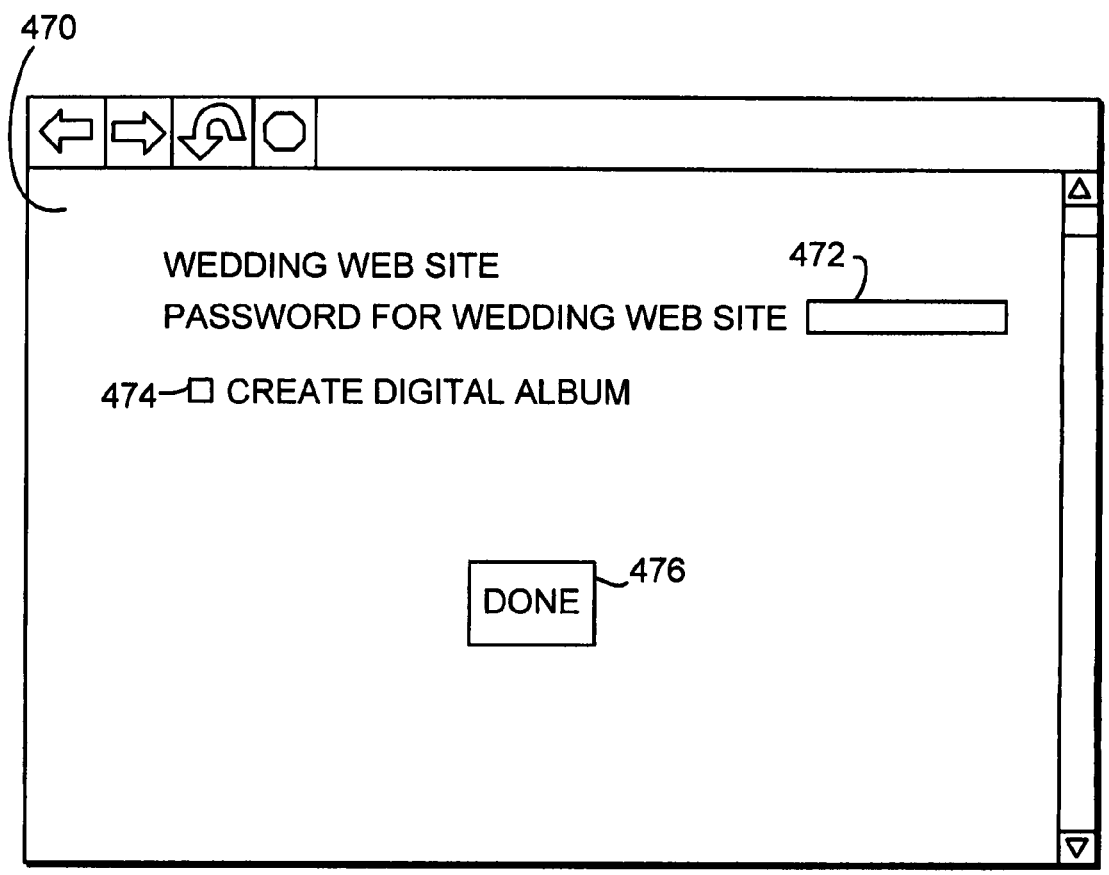
FIG. 32 shows an illustrative web page that may be used to provide an opportunity to specify a password to be used before access to a wedding web site is grated in accordance with the present invention.

If desired, the customer may be provided with access to tools that allow the customer to edit the images, position the images where desired, append video, audio, text, and graphic content to the images, establish passwords for the site, etc. For example, when the customer has finished selecting the images for page 452 and has entered any desired text, the customer may select continue option 468. When the customer selects continue option 468 of FIG. 31, the customer may be presented with a web page such as web page 470 of FIG. 32 that allows the customer to establish a password for the wedding web site by entering a password in region 472. If the customer is interested in creating a digital album from the web site (which need not be viewed on-line and which may be provided to the customer by downloading or on digital storage media) the customer may check box 474. When the customer has finished, the customer may select done option 476.

Other illustrative options that may be provided on a page such as page 422 of FIG. 29 include options for creating screen-savers, mouse pads, tee shirts, framed prints, etc. These options are merely illustrative. Any other suitable set of options may be provided if desired.

In some situations it may be desired to provide the customer with little or no control over the digital on-line images. For example, if a photographer is working on an assignment for a commercial customer, the photographer may wish to ensure that the client is not provided with high-quality digital images until such images have been paid for. Similarly, for artistic or business reasons, the photographer may not wish to allow the customer to manipulate on-line images for a wedding web site or other type of web site. In other situations, however, it may be desirable for a customer to manipulate images. It may also be desirable for photographers to be able to manipulate images before (or after) they are made available to the customer. For example, the photographer may wish to digitally correct mistakes in framing, exposure, color balance, etc. before the images are presented to the customer. Another party who may wish to manipulate images is a media consultant, who may use video and graphics editing and production equipment 24 (FIG. 1) to access images at order servicing equipment 16 (FIG. 1). Using equipment 24, images may be downloaded, manipulated and returned to order servicing equipment 16 or may be edited on-line via communications network 18.

The photographer's interest in manipulating images may be related to a desire to increase revenues from sales of image-based products and services. If the photographer improves the marketability of the images by image manipulation, the photographer may enhance sales. The photographer may wish to enlist the efforts of a media consultant. The media consultant may work for a fixed fee paid, for example, by the photographer. If desired, the media consultant may be retained by the photographer or the operator of order servicing equipment 16 to work for a percentage of the revenues derived from the sales of image-based products and services. If the media consultant works for a percentage of the revenues, order servicing equipment 16 may be used to credit the account of the media consultant, to transfer funds into the financial institution of the media consultant, or to direct the appropriate equipment or institution to issue a check for the media consultant or otherwise pay the media consultant. If desired, the photographer may reimburse the media consultant using order servicing equipment 16 or photographer equipment 12.

If the customer is provided with an opportunity to manipulate the images, the customer may be more satisfied with the end result and may order more image-based products and services. The customer may edit images locally by downloading the images to customer computer 14 from order servicing equipment 16, manipulating the images, and returning the manipulated images to order servicing equipment 16. A variety of techniques may be used to prevent the customer from retaining high-quality digital images without payment. For example, during the image manipulation phase, order servicing equipment 16 may only provide customer computer 14 with low resolution images. The customer may manipulate the low resolution images (e.g., by cropping, changing the color balance, adjusting the background, etc.) Information on which manipulations have been made may be transferred back to order servicing equipment 16. The image manipulation information may be used by the order serving equipment when fulfilling subsequent orders from the customer. If desired, digital images may be provided with a visible or invisible digital watermark. The images may be contained in files that lock themselves after a predetermined period of time (e.g., after a few days). The images may be password protected and the password may change after a predetermined period of time. These are merely examples of ways in which the images may be protected if it is desired to allow the customer to make image manipulations prior to some or all of the orders placed to order servicing equipment 16. Any other suitable technique for protecting the images during local editing by the customer may be used if desired.

Figure 33:
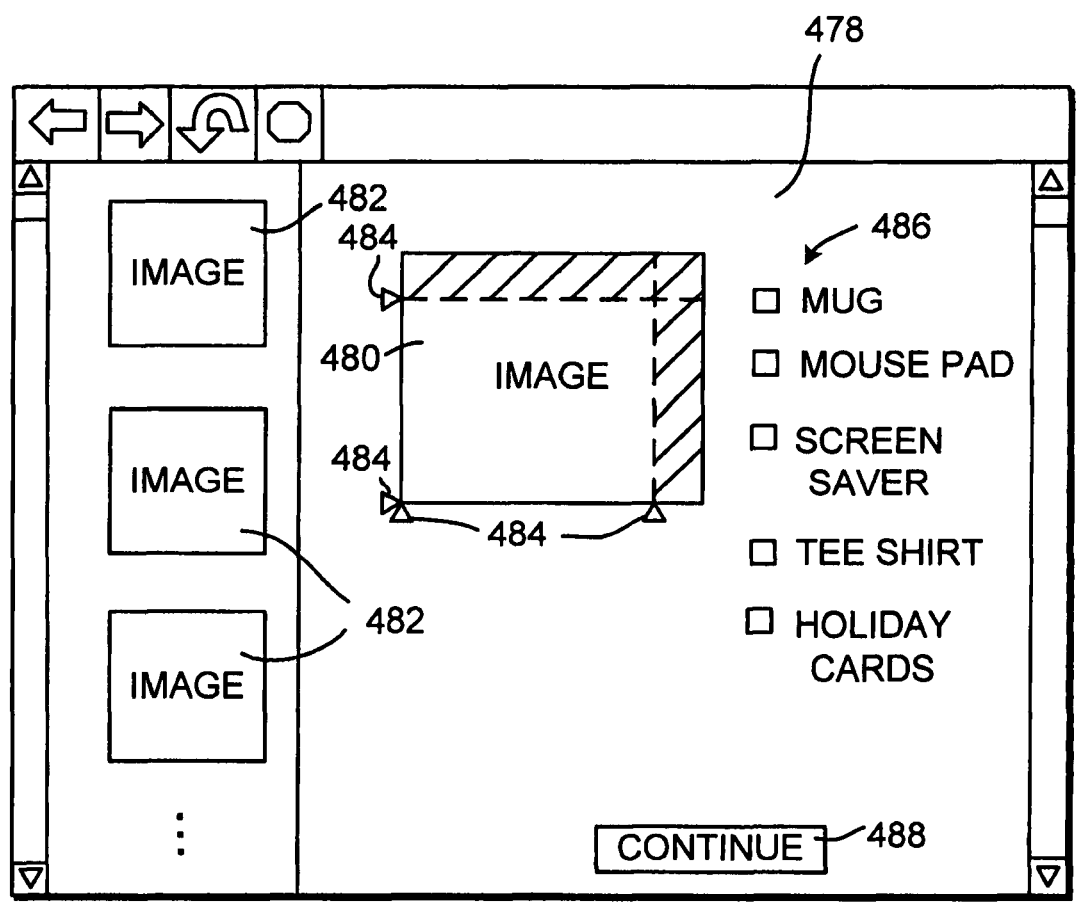
FIG. 33 shows an illustrative web page that may be used to provide an opportunity to manipulate an image by cropping in accordance with the present invention.

Another way that images may be manipulated by the customer is during the image ordering process. For example, if the customer selects an option such as option 414 of FIG. 28, the customer may be presented with a web page such as web page 478 of FIG. 33. Web page 478 allows the customer to select a desired image 480 from available images 482 and to crop the image using movable cropping arrows 484. The customer may select desired products and services by checking the boxes associated with options 486 and selecting continue option 488.

The photographer, a media consultant, or other party may edit images locally on their computers. The photographer may edit images on photographer computer 36 (FIG. 5) before the images are uploaded to order servicing equipment 16. The media consultant may use equipment 24 for local image editing by downloading the images from order servicing equipment 16 or other location via network 18, manipulating the images, and returning the edited images to the order servicing equipment or other location.

Local image manipulation capabilities may be provided for the photographer, customer, media consultant, or other party using a custom editor or an off-the-shelf editor such as Adobe Photoshop. Local image manipulation may involve adding text, graphics, and video to the images. Tools for performing these functions include desktop publishing tools, video editing tools, word processing applications, and other suitable content-manipulation tools.

Figure 34:
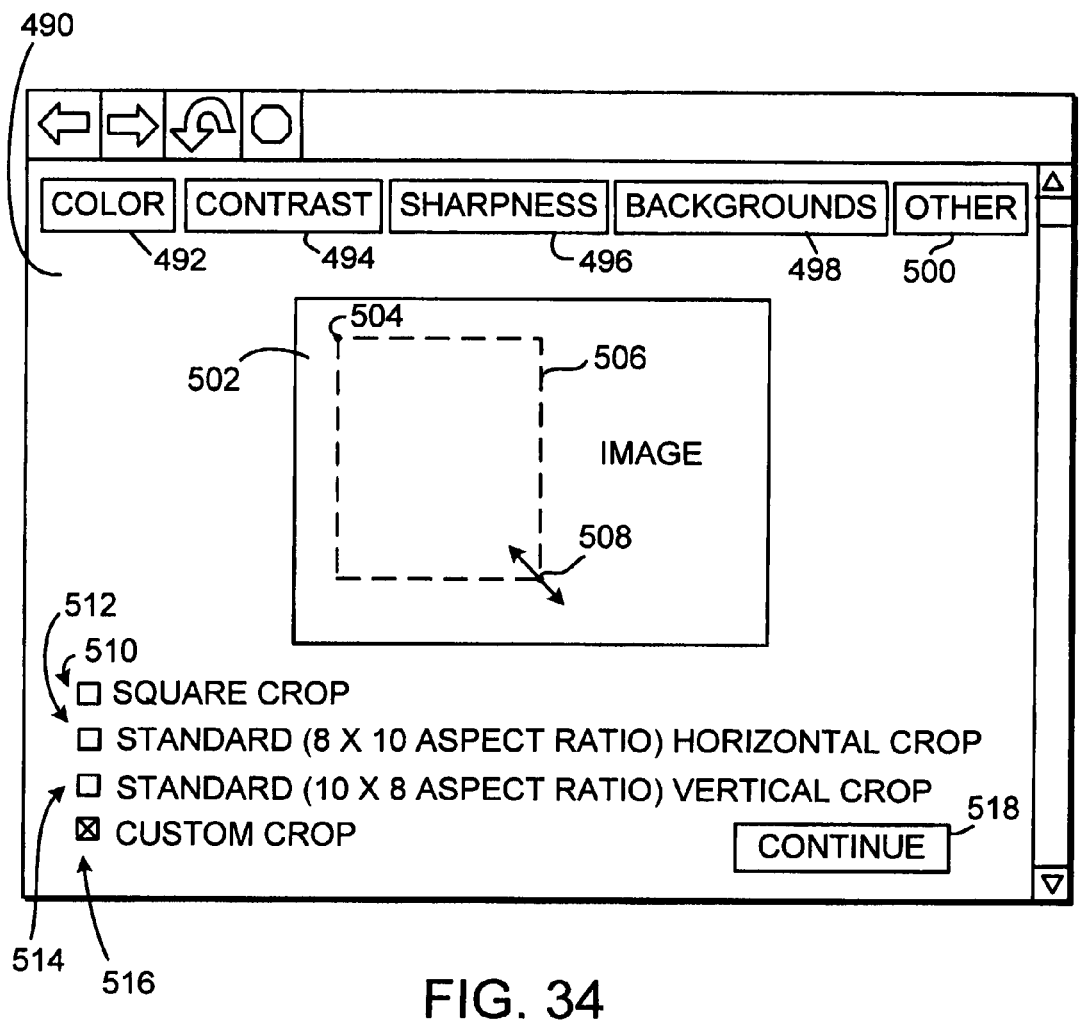
FIG. 34 shows an illustrative web page that may be used to provide an opportunity to manipulate images by cropping, changing contrast, and changing other image attributes in accordance with the present invention.

If desired, the photographer, user of equipment 24, customer, or other party may manipulate images on-line. An illustrative web page that may be provided to a customer, photographer, or other party desiring to edit images is shown in FIG. 34. Web page 490 may include options that allow adjustments to be made in image color (option 492), contrast (option 494), sharpness (option 496), backgrounds (option 498), or other images characteristics (option 500). These options are merely illustrative. Any suitable image manipulation and editing options may be provided if desired. Images may be cropped by, for example, clicking on image 502 to establish the position for upper left corner 504 of expandable cropping window 506, moving the lower right corner 508 of window 506 until a suitable crop has been obtained, and then clicking on image 502 to establish the final position for lower right corner 508. Another approach that may be used for on-line cropping is to use movable cropping lines such as those used to crop image 480 of FIG. 33.

Predetermined cropping options such as options 510, 512, and 514 may be provided. If option 510 is checked, a square window may be provided that converts the rectangular image 502 into a square having the maximum possible dimensions allowed by the size of image 502 by overlaying a square window similar to window 506. The square window may be resized and repositioned if desired. A standard horizontal crop option 512 (with an 8×10 aspect ratio) may be provided by overlaying a resizable and repositionable horizontal window having a fixed 8×10 aspect ratio. Option 514 is similar to option 512 except that it uses a vertical orientation. Cropping using custom cropping window 506 may be invoked by checking custom cropping box 516. After cropping and image manipulation have been performed, continue option 518 may be selected.

Figure 35:
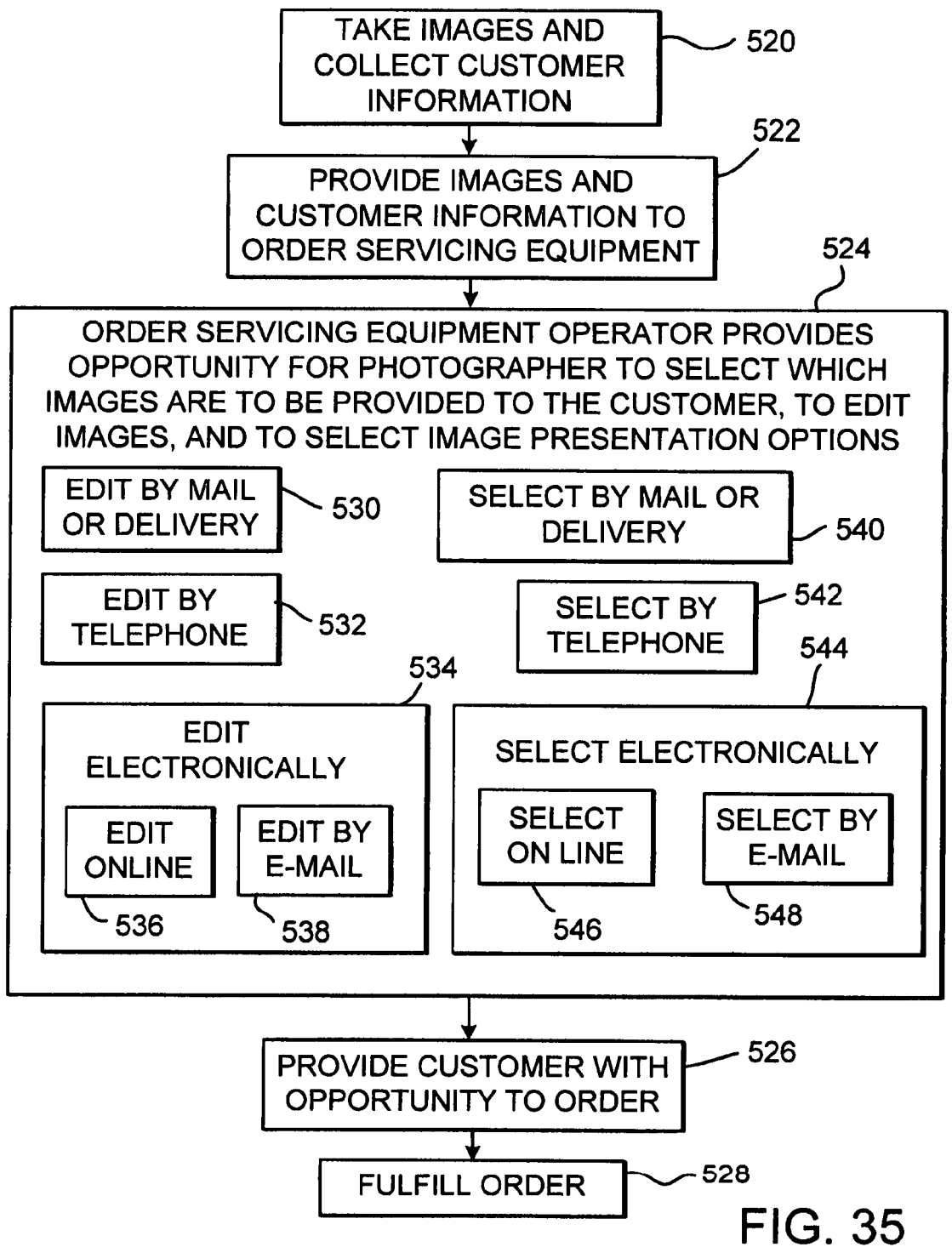
FIG. 35 is a flow chart of illustrative steps involved in providing a photographer with an opportunity to select which images are to be provided to a customer, to edit images, and to select image presentation options in accordance with the present invention.

The photographer may wish to edit images on-line, to select which images are presented to the customer, and to select presentation options for the images. Illustrative steps involved in providing a photographer or other party with these functions are shown in FIG. 35. At step 520, the photographer may take images and collect customer information. At step 522, the photographer may provide the images and customer information to order servicing equipment 16 (FIG. 1). At step 524, order servicing equipment 16 may be used to provide the photographer with an opportunity to select which images are to be provided to the photographer and to select images presentation options (e.g., what type of album the images are presented in, the type of paper surface used for enlargements, frame types, etc.). Order servicing equipment 16 may also be used to provide the photographer with an opportunity to edit images at step 524. After the images have been edited and after the photographer has selected image presentation options and has selected which images are to be presented to the customer, the customer may be provided with an opportunity to view images and to order products and services based on the selected images at step 526. At step 528, order servicing equipment 16 (FIG. 1) may be used to fulfill the orders of customers. If desired, facilities such as order fulfillment facility 20 (FIG. 1) may be used to fulfill orders during step 528.

Step 524 may involve various techniques for manipulation images. If desired, one, some, or all of the techniques illustrated as substeps of step 524 of FIG. 35 or suitable alternative steps may be used. At step 530, information on how images are to be manipulated may be transmitted to order servicing equipment 16 from photographer equipment 12 by mail or delivery. Image manipulations may be made by telephone at step 532, by, for example, allowing the photographer to enter touch-tone commands to a computer in response to a computer-generated voice. Electronic editing may be supported at step 534. Step 536 may involve allowing the photographer to edit images on-line. Step 538 may involve allowing the photographer to edit images by e-mail or other messaging technique. At step 540, the photographer may select which images to present to the customer and may select image presentation options using mail or delivery. At step 542, the photographer may select which images to present to the customers and may select image presentation options using a telephone. At step 544, the photographer may be provided with an opportunity to electronically select which images are presented to the customer and to electronically select image presentation options. For example, the photographer may be provided with an on-line opportunity to select which images to present to the customer and to select image presentation options at step 546. The photographer may be provided with an e-mail opportunity to select which images are to be presented to the customer and to select image presentation options at step 548. If desired, steps 520-548 may involve parties other than the photographer, such as a media consultant, order servicing equipment operator, etc.

Figure 36:
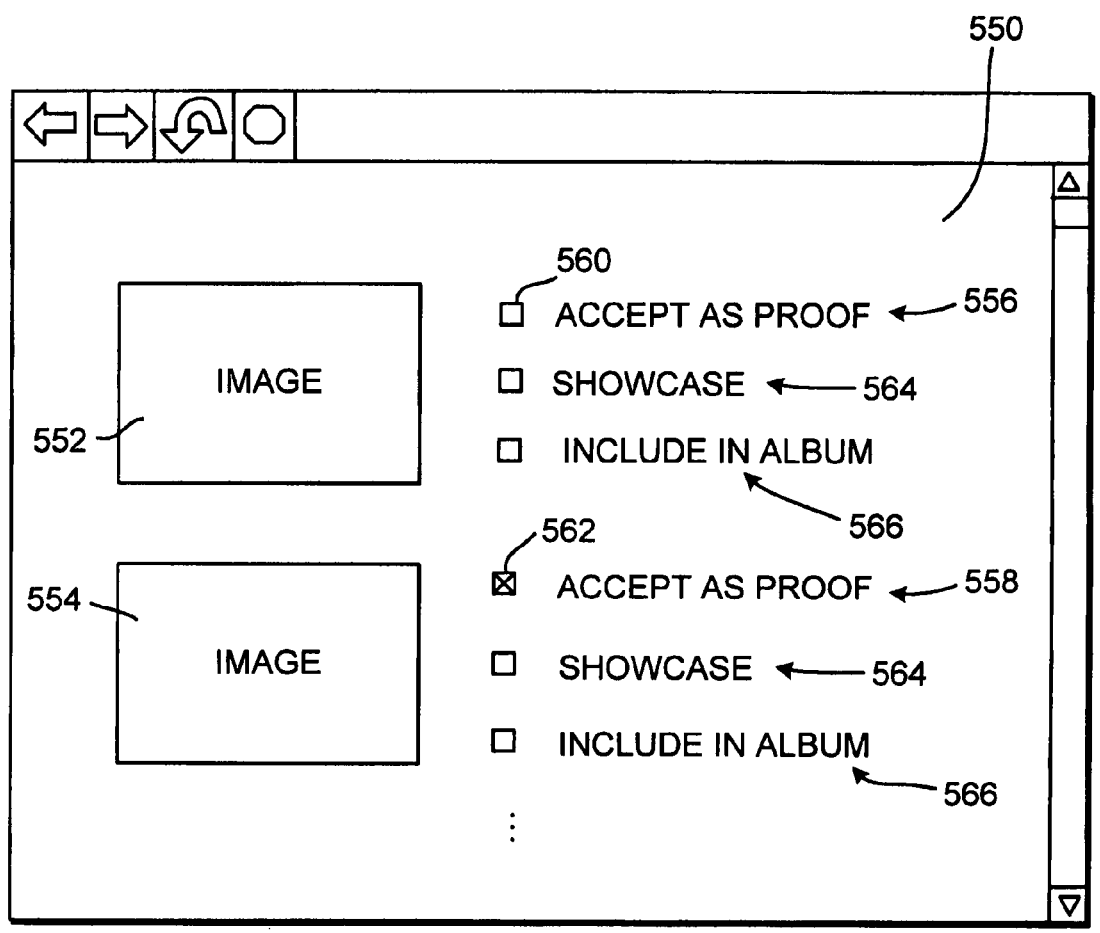
FIG. 36 shows an illustrative web page that may be used to provide an opportunity to a photographer or other party to select on-line which images are presented to a customer and how they are presented in accordance with the present invention.

As shown in FIG. 36, the photographer or other suitable party may be provided with an on-line opportunity to select which images are to be presented to the customer and to select image presentation options using a web page such as web page 550. All of the images such as images 552 and 554 that were originally submitted by the photographer may be displayed on the left side of web page 550. Web page 550 may include accept-as-proof options such as accept-as-proof options 556 and 558. If the photographer would like the customer to be able to view a particular image when ordering image-based products and services, the photographer may select the appropriate accept-as-proof option. For example, if the photographer would like the customer to be able to order image 554 but not be able to order image 552 (e.g., because image 552 is somehow flawed, duplicative, or otherwise undesirable), the photographer may check box 562 but not box 560, as shown.

The photographer may wish to showcase a certain group of images because they are group shots, because the images are candids, because the photographer feels that the images were particularly successful or will sell well if showcased, etc. The photographer may select which images are to be showcased during presentation to the customer by selecting appropriate showcase options 564.

The choice of which images are to be showcased is an example of a digital image presentation option. Another image presentation option that may be selected by the photographer relates to whether the selected images are to be included in a wedding album or other suitable album. The photographer may be provided with an opportunity to make this type of selection using options such as include-in-album options 566.

After the photographer has selected which images to present to the user, the order servicing equipment may only present those images to the customer for viewing or ordering. Images that the photographer selects for showcasing may be presented to the customer on a special web page and may involve a special pricing structure. Images selected for inclusion in an album may be viewed by the customer in the form of a digital mock-up of the album. By preparing the album for the customer in this way, the photographer may be able to enhance album sales and overall revenues.

Figure 37:
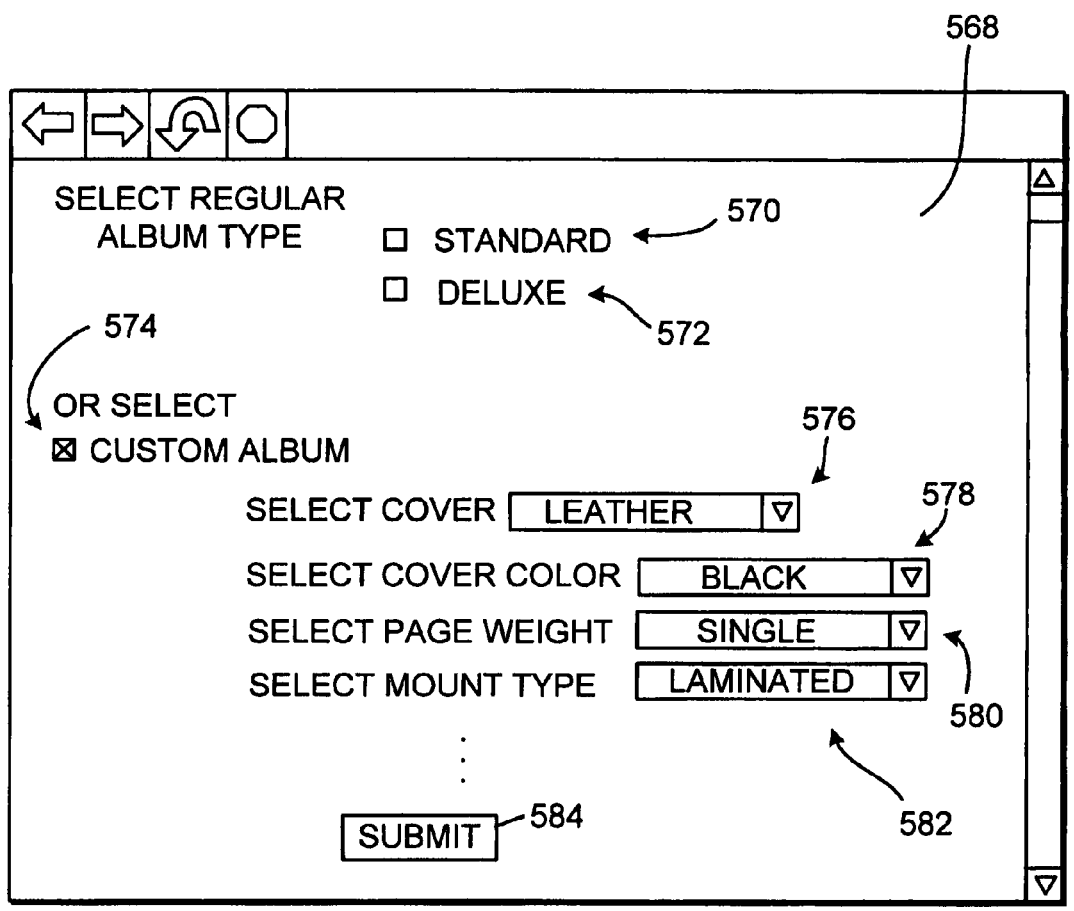
FIG. 37 shows an illustrative web page that may be used to provide an opportunity to select image presentation options on-line in accordance with the present invention.

The photographer may be provided with an opportunity to select image presentation options such as album characteristics using a web page such as web page 568 of FIG. 37. Web page 568 may include options such as options 570 and 572 that allow the photographer to select the type of album desired (e.g., an inexpensive standard album or a more deluxe version). The photographer may be presented with custom album option 574. When this option is selected, the photographer may select album characteristics such as cover type (option 576), cover color (option 578), page weight (option 580), mount type (option 582), etc. When the image presentation options (album characteristics in the example of FIG. 37) have been selected by the photographer, the photographer may select submit option 584. The album characteristics that are selected by the photographer may be used to determine how the album is made up when the album is constructed at order servicing equipment 16 or order fulfillment facility 20 (FIG. 1). If desired, the selected album components may be shipped to the photographer for final assembly before presentation to the customer in person or by mail.

The album characteristics that may be selected using a web page such as web page 568 of FIG. 37 are only one example of various different types of image presentation options that may be selected by the photographer. The image presentation options that are presented to the photographer may depend on the type of image-based product and service involved, which may in turn depend on the type of assignment involved. For example, if the assignment is a school photograph, the image-based product or service may be a collection of enlargements in certain sizes (e.g., wallet-sized, 4"×6", 5"×7", etc.) The photographer may select the mix of different images sizes to offer the customer as a package. If the assignment is a wedding, the image-based product or service may be a framed print. The photographer may be presented with an opportunity to select the frame type (e.g., wood, metal), frame color, mat type (buffered, unbuffered, etc.,), mat color, mat style (single mat, double mat, shape of mat opening), image protection options (unprotected, glass, coated glass, acrylic sheets, etc.), and any other framing-related options. If the assignment relates to taking images for a commercial customer to display as enlargements, the photographer may be presented with options relating to paper type (archival, transparent, fiber-based or resin-coated, single weight or double weight, etc.), paper brand, paper surface (glossy, matte, or semi-matte), etc.

If desired, the customer may be provided with an opportunity to select image presentation options. For example, a wedding customer may be provided with an opportunity to select which type of album is used. If desired, the decision as to how much control to provide the customer may be made by the photographer. Some photographers may wish to provide their customers with a large number of options. Other photographers may wish to retain control over the assignment and may base their reputation on making decisions for their customers so that the customers do not need to make such decisions.

Figure 38:
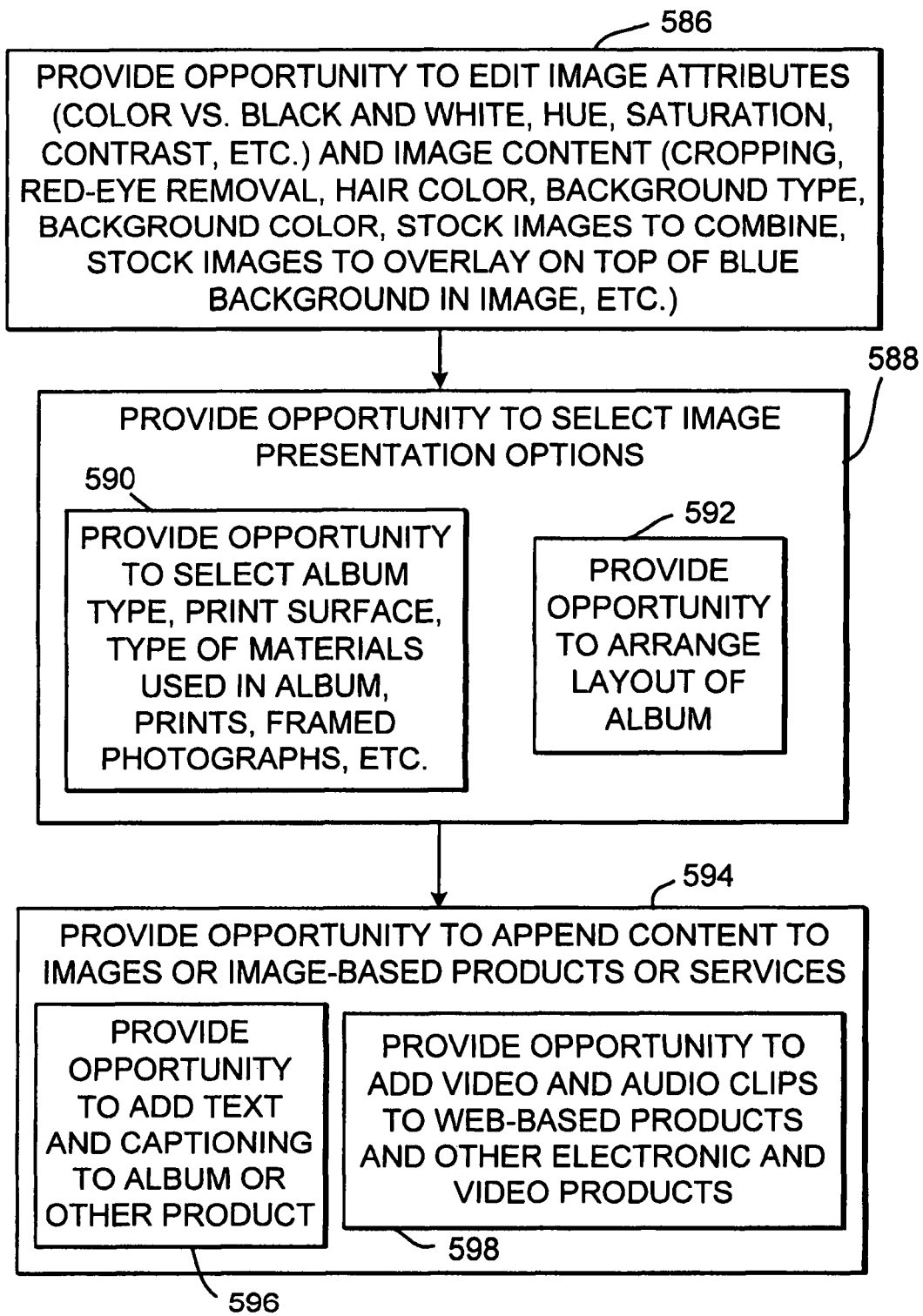
FIG. 38 is a flow chart of illustrative steps involved in using a system such as the system of FIG. 1 to provide opportunities to edit images, select image presentation options, and append content in accordance with the present invention.

Steps involved in image editing, selecting which images are presented to the customer, and selecting image presentation options are shown in FIG. 38. At step 586, the system provides appropriate parties (e.g., the photographer, the customer, the media consultant, the operator of the order servicing equipment, a lab operator, an order fulfillment facility operator, etc.) with an opportunity to edit image attributes and content (e.g., an opportunity to electronically edit image attributes and content using network 18.). Image attributes that may be manipulated include color vs. black and white, hue, saturation, contrast, and any other suitable image attributes. Image content may be manipulated by cropping, removing red-eye, changing hair color, changing background type, color, or content, selecting stock images or graphics to combine with the image (e.g., if the image was taken with a blue background for a novelty portrait), etc. For example, the photographer may originally have taken an image of a customer posed against a blue background. The customer may then access a database of cartoon characters, movie images, images of people, magazine cover templates, templates with the bodies of people to which the heads in the images may be attached, nature scenes, etc. The customer may select a desired image from the database to combine with the original image (e.g., as a background to replace the original blue background). Because the customer may access a large database of stock images, the customer may order image-based products and services based on numerous different modifications of the original image. Image manipulation may encourage repeat orders, because customers may desire to order additional images and image-related products or services each time the underlying images are modified.

At step 588, parties are provided with an opportunity to select image presentation options. For example, an opportunity may be provide to select an album type, print surface, type of materials used in an album, framed photograph, or other image-based product (step 590). An opportunity may also be provided to arrange a layout of an album, a digital album, or a web site, or make other such changes to the way that the images are presented (step 592).

At step 594, the system may be used to provide an opportunity to append content to images or image-based products or services. For example, an opportunity may be provided for a party to add text and captioning to an album or other product (step 596) and to append video and audio clips to web-based products and other electronic and video products (step 598). If the assignment is a wedding, for example, the photographer may provide images to order servicing equipment 16. The customer may select which images to include in a web site to commemorate the wedding. A media consultant who has access to videos of the wedding may edit the videos and may append selected video and audio clips to the web site. For example, the media consultant may insert still video images into the web site that turn into full motion video clips when a viewer of the web site clicks on them.

Figure 39:
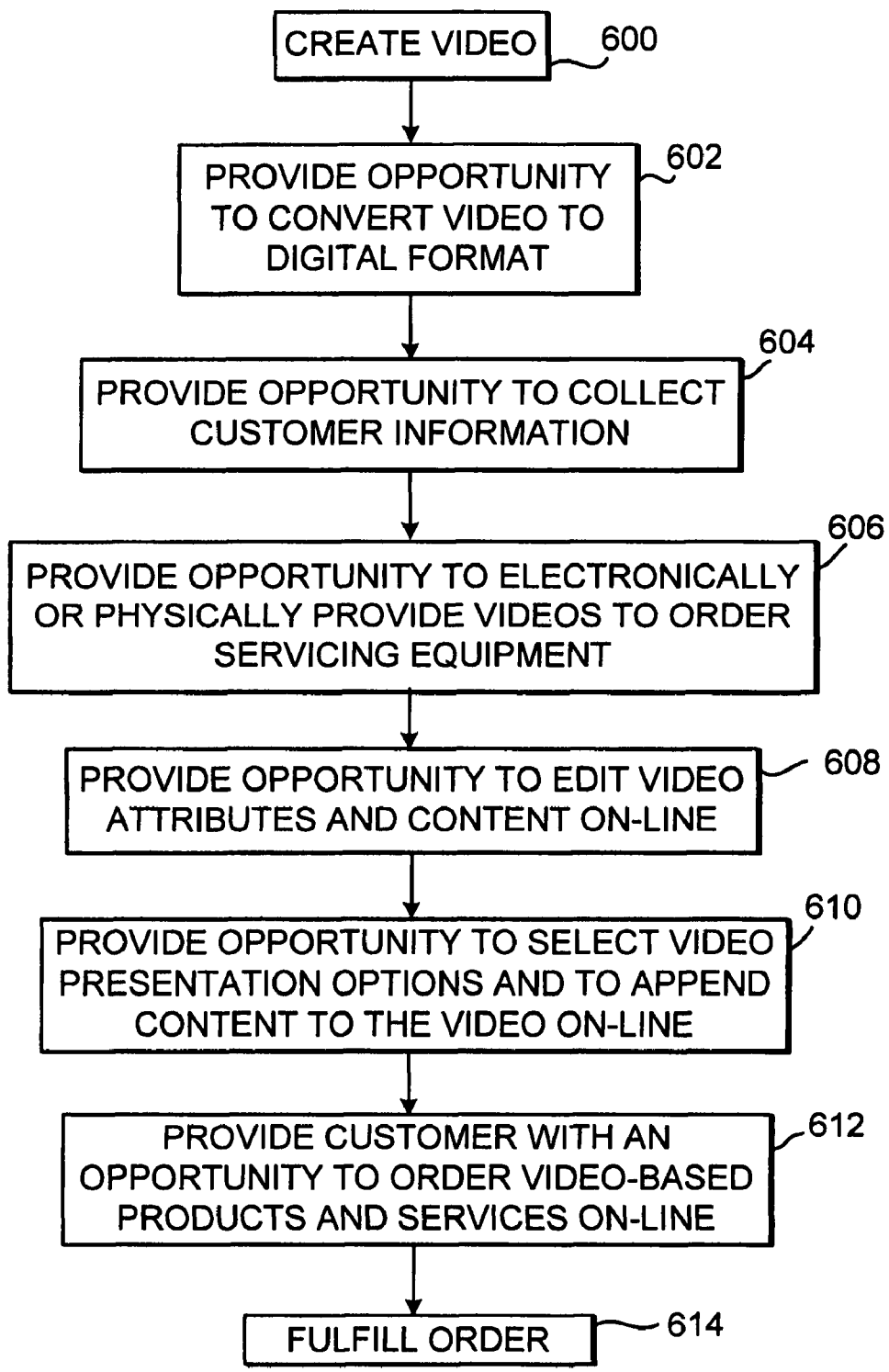
FIG. 39 is a flow chart of illustrative steps involved in using a system such as the system of FIG. 1 to provide opportunities to perform functions including converting video to digital form, providing video to order servicing equipment, editing video on-line, selecting video presentation options and appending content, and other such video-related features in accordance with the present invention.

Steps involved in using video content are shown in FIG. 39. At step 600 video is created. For example, a media consultant or other party may take videos at a wedding, a sporting event (to associate, e.g., with images of athletes or cheerleaders, etc.), a meeting of an organization, a corporate event, or any other suitable event. Videos may be taken using analog or digital equipment. If images are taken using analog equipment, the system may be used to provide the media consultant or other party with an opportunity to convert video to digital format at step 602. For example, analog video may be converted using video and graphics editing and production equipment 24 (FIG. 1) and an application downloaded from order servicing equipment 16. At step 604, an opportunity is provided to collect customer information. For example, a media consultant or other party may be provided with an opportunity to collect customer information using customer information collection equipment 178 (FIG. 8). At step 606, the system may be used to provide the media consultant or other party with an opportunity to electronically or physically provide some or all of the video created at step 600 to order servicing equipment 16. For example, a web page may be provided to the media consultant or other party that assists the media consultant in uploading the video to order servicing equipment 16 over the Internet. The web page may contain a video upload option. When the media consultant selects the video upload option, the media consultant or other party may be provided with an opportunity to enter a filename or other suitable location information for the digital video file to be uploaded. The media consultant or other party may then submit the video by selecting a submit option or other suitable option.

After the video has been provided to order servicing equipment 16, the media consultant or other party may be provided with an opportunity to edit video attributes and content on-line at step 608. Step 608 (and step 606) may involve determining which portions of the videos are to be presented to the customer as part of a video-based product or service. Video attributes that may be edited include, color balance, sharpness, hue, saturation, color vs. black and white, volume of accompanying audio track, etc. At step 610, an opportunity may be provided to select video presentation options and to append content to the video on-line. For example, the media consultant may be provided with an opportunity to select options such as the amount of compression used in displaying the videos, what type of compression scheme is used in displaying the videos, whether the audio track is in stereo or mono, etc. The media consultant may also be provided with a tool that allows the media consultant to append content to the videos, such as titles, captions, text, graphics, images, etc.

At step 612, the customer may be provided with an opportunity to view and order video-based products and services on-line. For example, the customer may be provided with an opportunity to purchase a videocassette, digital video disc (DVD), or other suitable media onto which the videos and any appended content have been placed. The customer may also be provided with an opportunity to order a web site or digital album containing interactive videos and appended content.

At step 614, the system fulfills the customer's order. For example, if the customer has ordered a videocassette, order servicing equipment 16 or order fulfillment facility 20 may be used to ship the videocassette to the customer. If the customer has ordered a digital album, the album may be made available for the customer for downloading from order servicing equipment 16. If the customer has ordered a web site, the web site may, at least initially, be hosted by order servicing equipment 16. If the customer desires, the web site may be hosted by order servicing equipment 16 for a monthly fee or may be downloaded to the customer or transferred to a separate web site host.

Various parties may use the system, such as the photographer, the customer, the media consultant, visitors, the order servicing equipment operator, the operators of separate fulfillment facilities, labs, and financial institutions, and other parties. Each of these parties may have a different role. For example, some parties, such as the photographer, may be involved in content creation. Other parties, such as the operator of the order servicing equipment, may be involved in content distribution. The customer and other parties may be involved in the purchasing of content. The system may accommodate these different roles by allowing different rights to be assigned to each of the parties. This allows the system to simultaneously support different types of usage. Moreover, if the needs of the parties change, or if a different arrangement is required, rights may be reallocated.

A table 616 that illustrates how different rights may be assigned to different parties is shown in FIG. 40. The rows in table 616 correspond to different parties, such as the customer and the photographer. Columns correspond to different usage arrangements. The numbers in the cells of table 616 show the types of rights that might be assigned to each party in each of several different usage arrangements. For example, a customer in a typical wedding scenario may be allowed to view images (1), order image-based products and services (2), append content to image-based products or services (3), and download images (4). The photographer in the same scenario may not be allowed to order image-based products or services (2), but may be allowed to edit image attributes and content (5), select image presentation options (6), and select which images are presented to the customer (7). The rights of the media consultant may be the same as the photographer, except that the media consultant may not be allowed to select which images are presented to the customer. A visitor may have rights that are the same as the customer, except that the visitor may not be permitted to download images (4). The operator of the order servicing equipment may be allowed to set rights levels, but under normal operating circumstances may not be allowed to use the system features that the customer, photographer, media consultant, and visitor have access to.

The other scenarios of FIG. 40 involve different relationships between the parties and therefore typically have different types of rights distributions. For example, in a typical commercial customer scenario, the customer may be provided with fewer rights, because the photographer may be concerned with controlling the content and use of the images. The customer may only be able to download images. To protect the rights of the photographer, the system may only allow the customer to download low-resolution images or images with watermarks, digital watermarks, embedded copyright notices, or other form of usage control. In a typical novelty portrait arrangement, the customer may be allowed to manipulate the images. For example, the customer may be allowed to change the background of the images. Typical maximum rights scenarios are shown in the leftmost column.

The examples of FIG. 40 are merely typical and are shown only for illustration. In many situations rights may be allocated differently. If desired, other parties may be assigned rights levels. For example, rights may be assigned to financial institutions, the operators of labs, order fulfillment facilities, or any other suitable facility or party operating a facility. Moreover, rights (1)-(8) of FIG. 40 are merely illustrative. Rights may be assigned to control access to any other suitable system function or feature. For example, rights levels may be set for financial functions such as accessing account information, redeeming credit, transferring funds between accounts (e.g., between an account at the order servicing equipment and a financial institution or between two financial institutions. Rights levels may also be set for order fulfillment functions, such as functions related to payment (type of credit card used, whether credit is allowed, etc.), checking on order status, changing shipment methods, tracking shipment, and any other functions related to order fulfillment. If desired, the photographer may be allowed to set rights levels, as illustrated in the typical commercial scenario of FIG. 40. Allowing the photographer to set rights levels allows the photographer control of the service, so that the photographer can tailor the features of the system toward the photographer's intended audience without involvement of the operator of the order servicing equipment.

Rights levels may be set during a custom setup procedure in which the photographer, order servicing equipment operator, or other party establishes the rights levels for each party. If desired, rights levels may be selected automatically by the system when the photographer initially identifies the type of assignment involved. For example, the system may set rights levels when the photographer submits images and customer information for a new assignment using a web page such as web page 316 of FIG. 19 and identifies the assignment type by selecting one of options 320. These are merely illustrative techniques for establishing rights levels. Any suitable technique for establishing different rights levels for different parties may be used if desired.

As shown in FIGS. 3 and 5, order servicing equipment 16 may contain order servicing computer 46. Order servicing computer 46 may be used to place images on-line for customers to order and may be used to handle various tasks associated with producing image-based products and services. Order servicing computer 46 may be a single computer or multiple interconnected computers. If multiple computers are used, they may be interconnected using any suitable communications paths or network. For example, such multiple computers may be interconnected by telephone lines or a communications network such as communications network 18 (FIGS. 3 and 5).

Figure 41:
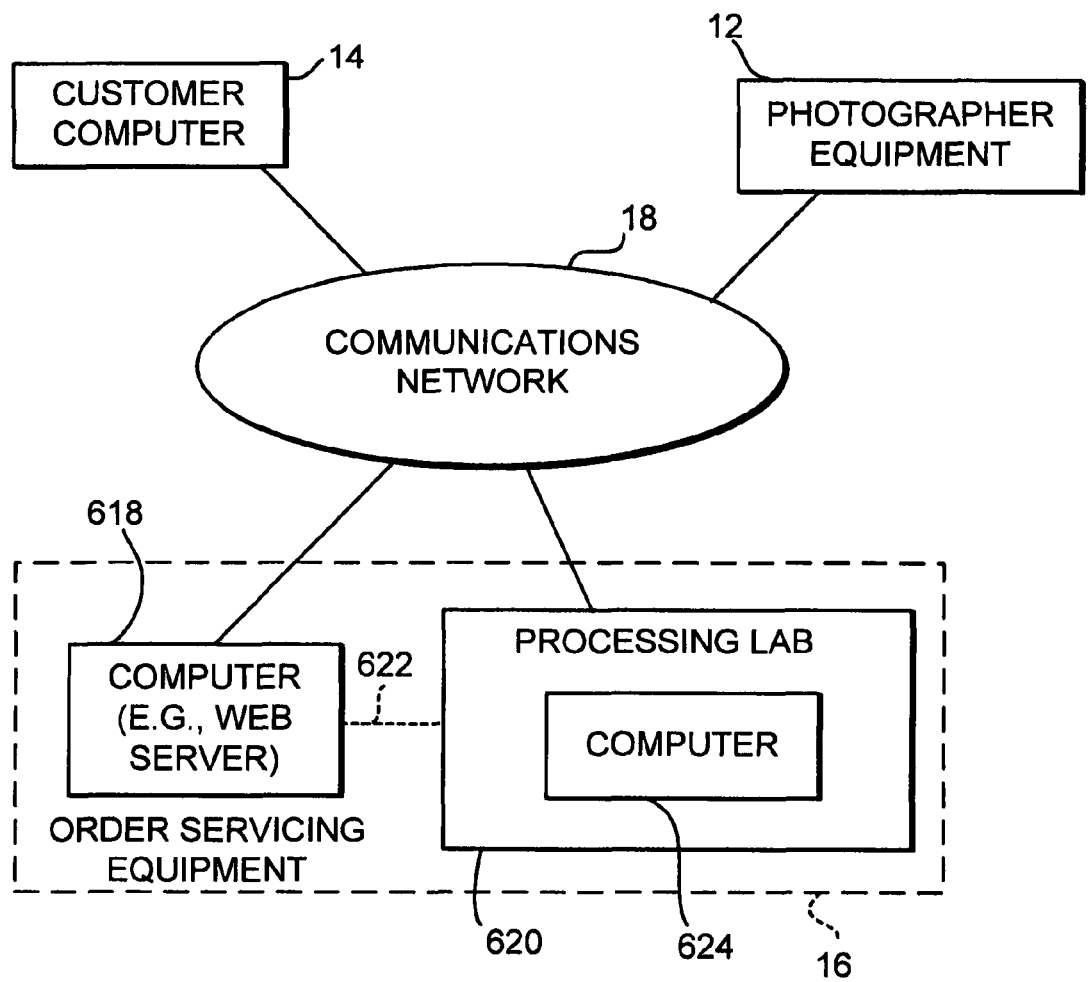
FIG. 41 is a schematic diagram illustrating how order servicing equipment may include a processing lab and a computer that need not be at the same location in accordance with the present invention.

If desired, order servicing equipment 16 may use processing lab equipment that is separate from and potentially remote from the computer used to place images on-line and used to handle other tasks associated with providing image-based products and services. As shown in FIG. 41, for example, order servicing equipment 16 may include a computer 618 for placing images on-line that is separate from processing lab 620 that is used to process images. Computer 618 may be remote from processing lab 620. For example, computer 618 may be located in one city and processing lab 620 may be located in another city. Computer 618 may have web server capabilities to place images on-line in the form of web pages. If desired, the functions of computer 618 may be performed by a number of linked computers (e.g., computers linked by a network or other communications paths). Processing lab 620 may be used to develop film (if undeveloped film is provided by the photographer) and may be used to print images (for film-based or digital images). Processing lab 620 may communicate with computer 618 using any suitable communications technique. For example, processing lab 620 may be interconnected with computer 618 using communications network 18, which may be, for example, the Internet, a local area network, a wide area network, a private network, the public switched telephone network, or other suitable communications path. Computer 618 and processing lab 620 may also be connected by direct communications link 622, which may be a communications link such as a cable or fiber optic link. This approach may be particularly appropriate when computer 618 and processing lab 620 are located in the same vicinity. If desired, processing lab 620 may have a computer 624. Computer 624 may be used to facilitate communications between processing lab 620 and computer 618 and to facilitate communications between processing lab 620 and other facilities. Computer 624 may also be used in the operation of processing lab 620. For example, computer 624 may be used to control equipment such as image digitizing equipment, printing equipment, mailing equipment, etc. If desired, some of the functions of computer 618 may be performed by computer 624 or in cooperation with computer 624.

The amount of money spent by the customer, the photographer, both the customer and photographer, or any other suitable party or group of parties may be used to earn loyalty rewards. For example, the amount of money spent by the customer, the photographer, or both may be used to earn the photographer loyalty rewards from the operator of order servicing equipment 16. When the photographer has accumulated a sufficient amount of loyalty reward credit, the photographer may become entitled to free products or services, discounts on products or services, or cash rewards. Suitable reward products include film and other photographic supplies and non-photographic items such as household appliances, luggage, clothing, furnishings, etc. The reward services may be photographic services such as film developing or non-photographic services such as travel or financial services. The loyalty rewards credited to the photographer are preferably provided in addition to the financial rewards credited to the photographer in connection with each normal transaction. Loyalty rewards may be used to encourage photographer loyalty to a particular order processing operator or brand of operator.

Figure 42:
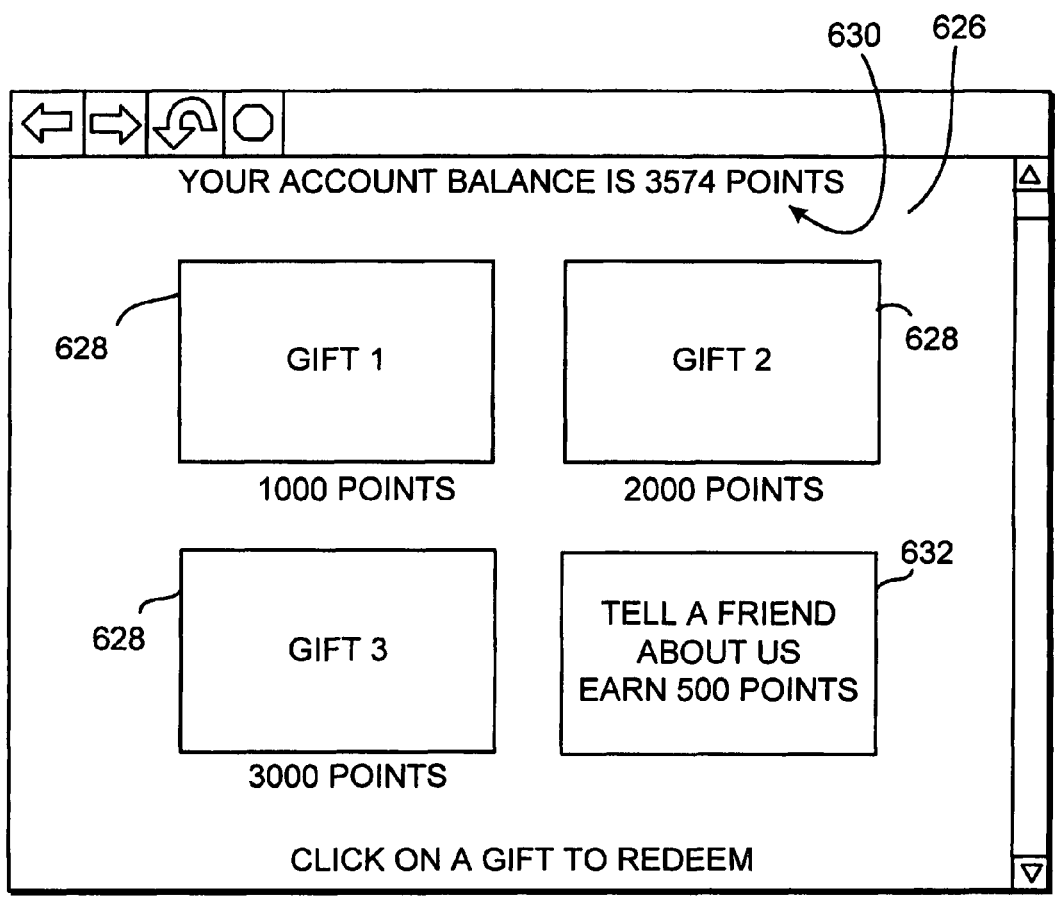
FIG. 42 shows an illustrative web page that may be used to provide information on loyalty reward account status, to provide an opportunity to redeem rewards, and to provide an opportunity to earn loyalty reward points for referring another party to the system in accordance with the present invention.

If desired, loyalty rewards may be redeemed on-line through a web site or other suitable interface. An illustrative loyalty rewards redemption web page that may be provided by the system is shown in FIG. 42. A web page such as loyalty rewards redemption web page 626 of FIG. 42 may be used to provide the photographer with an opportunity to redeem a loyalty reward by clicking on an option such as one of options 628 for a desired loyalty reward product or service. If desired, each option 628 may contain a picture of the product or service associated with the option. Loyalty rewards redemption page 626 may be used to provide the photographer with information such as account balance information 630 on the amount of loyalty reward credit that the photographer has accumulated. This information and access to reward redemption functions may be controlled by, for example, requiring the photographer to provide an account number, password, or other such information. The photographer may be required to provide the photographer's normal account number and password, may be required to provide a special loyalty rewards account number or password, or may be required to provide other information identifying the photographer.

Loyalty rewards redemption page 626 may be used to provide the photographer with an opportunity to earn loyalty rewards or other credit such as a monetary referral fee for each additional photographer that they refer to the system. For example, loyalty rewards redemption page 626 may be used to provide a selectable option such as option 632 that when selected allows the photographer to enter information to identify a party that the photographer wishes to refer to, e.g., the operator of the order servicing equipment.

Loyalty rewards redemption page 626 is only an illustrative example of a suitable way in which to provide loyalty reward features. Any other suitable approach for providing these features may be used if desired. For example, these features may be provided without using web pages. The photographer or other loyalty rewards party may be provided with information on the loyalty rewards program, redemption options, referral options, and the like over the telephone or through the mail.

In some of the foregoing examples, the photographer, customer, and other parties are provided with on-line access to certain system features through the Internet using web pages. The photographer, customer, or other party may use a web browser to access such web pages. This type of arrangement is only illustrative. Any suitable arrangement may be used to provide the photographer, customer, or other party with access to the system features of interest. For example, interactive screens may be provided to various parties that do not rely on web page protocols. Rather than using a web browser to access information at a remote location over the communications network, a party may use another suitable application that supports network communications. Applications may generate screens locally that present information and on-screen options to various parties. Moreover, features that have been described as being suitable to provide using non-web-browser applications may, if desired, be provided by using a web browser to present web pages. Features that have been described as being provided on a single page or screen may generally be provided using multiple pages or screens. Features that have been described as being provided on multiple screens or pages may generally be provided on a single screen or page or on a different group of screens or pages.

The computers used for the customer computer, photographer computer, order servicing equipment computer, customer information collection computer, and other computers may be any suitable processing device including mainframe computers, workstations, networked computers, personal computers, notebook or laptop computers, handheld computing devices, personal digital assistants, set-top boxes, or any other suitable computing device. Certain devices are favored in certain situations due to considerations such as size, cost, and complexity. For example, mainframe computers may be used at order servicing equipment, but may be less desirable in the field for use in collecting customer information.

The foregoing is merely illustrative of the principles of this invention and various modifications can be made by those skilled in the art without departing from the scope and spirit of the invention.

What is claimed is:

1. A system that allows users at computers to upload and download videos over a communication network, comprising:
   computer equipment that communicates with the computers over the communication network, wherein the computer equipment is configured to provide a user with a screen that contains a video upload option,
   wherein when the video upload option is selected the user is provided with an opportunity to upload a digital video file to the computer equipment,
   wherein the computer equipment is configured to provide the user with an opportunity to edit the digital video file online over the communication network after the digital video file has been uploaded to the computer equipment over the communication network, and
   wherein the computer equipment is configured to allow the user to establish different rights levels for different parties other than the user according to a type of usage scenario.

2. The system defined in claim 1 wherein the computer equipment is configured to provide the user with an opportunity to append content to the digital video file.

3. The system defined in claim 1 wherein the computer equipment is configured to provide the user with an opportunity to append images to the digital video file.

4. The system defined in claim 1 wherein the computer equipment is configured to provide the user with an opportunity to append titles and images to the digital video file and is configured to provide the user with an opportunity to edit video attributes of the digital video file.

5. The system defined in claim 1 wherein the computer equipment is configured to provide the user with an opportunity to append images to the digital video file and is configured to provide the user with an opportunity to edit video attributes of the digital video file, wherein the video attributes include color saturation and audio track volume.

6. The system defined in claim 1 wherein the computer equipment is configured to provide the user with an opportunity to purchase a DVD over the communication network onto which the digital video file has been placed.

7. The system defined in claim 1 wherein the computer equipment is configured to provide the user with an opportunity to direct the computer equipment to place the digital video file on a web site hosted by the computer equipment.

8. The system defined in claim 1 wherein the computer equipment receives at least one uploaded digital image over the communication network and is configured to present the user with an opportunity to order a print of the digital image.

9. The system defined in claim 1 wherein the computer equipment receives at least one uploaded digital image over the communication network and is configured to present the user with an opportunity to manipulate the digital image before a print of the digital image is ordered over the communication network.

10. The system defined in claim 1 wherein the computer equipment is configured to provide the user with an opportunity to direct the computer equipment to place the digital video file on a web site hosted by the computer equipment and wherein the computer equipment receives at least one uploaded digital image over the communication network and is configured to present the user with an opportunity to order a print of the digital image.

11. The system defined in claim 1 wherein the computer equipment is configured to provide the user with an opportunity to append titles and images to the digital video file and is configured to provide the user with an opportunity to edit video attributes of the digital video file, wherein the video attributes include color saturation and audio track volume and wherein the computer equipment receives at least one uploaded digital image over the communication network and is configured to present the user with an opportunity to order a print of the digital image.

12. The system defined in claim 1 wherein the computer equipment is configured to provide the user with an opportunity to append titles and images to the digital video file and is configured to provide the user with an opportunity to edit video attributes of the digital video file, wherein the video attributes include color saturation and audio track volume, wherein the computer equipment is configured to provide the user with an opportunity to purchase a DVD onto which the digital video file has been placed over the communication network, and wherein the computer equipment receives at least one uploaded digital image over the communication network and is configured to present the user with an opportunity to manipulate the digital image before a print of the digital image is ordered over the communication network.

13. A method of manipulating a digital video file via a communication network, the method comprising:

communicating, by computer equipment, with one or more user computers over the communication network;

providing, by the computer equipment, a user with a screen that includes a video upload option;

receiving a selection of the video upload option;

providing, by the computer equipment in response to the received video upload option, an opportunity to upload a digital video file to the computer equipment;

providing the user with an opportunity to edit the digital video file online over the communication network after the digital video file has been uploaded to the computer equipment over the communication network; and providing the user with an opportunity to allow the user to establish different rights levels for different parties other than the user according to a type of usage scenario.

14. The method of claim 13, further comprising:
uploading the digital video file from the one or more user computers to the user equipment.

15. The method of claim 13, wherein providing the opportunity to edit the digital video file includes providing the user with an opportunity to edit the digital video file at the one or more user computers.

* * * * *